United States Patent
Dömösi et al.

(10) Patent No.: US 12,328,384 B2
(45) Date of Patent: Jun. 10, 2025

(54) SCRAMBLER APPARATUS AND METHOD IN PARTICULAR FOR CRYPTOGRAPHIC APPLICATIONS, AND DESCRAMBLER APPARATUS AND METHOD THEREFOR

(71) Applicant: Intelligens Technológiák Kft., Debrecen (HU)

(72) Inventors: Pál Bëla Dömösi, Debrecen (HU); Géza Horváth, Debrecen (HU)

(73) Assignee: Intelligens Technologiak Kft., Debrecen (HU)

( * ) Notice: Subject to any disclaimer, the term of this patent is extended or adjusted under 35 U.S.C. 154(b) by 115 days.

(21) Appl. No.: 17/908,301

(22) PCT Filed: Mar. 5, 2021

(86) PCT No.: PCT/HU2021/050019
§ 371 (c)(1),
(2) Date: Aug. 31, 2022

(87) PCT Pub. No.: WO2021/176242
PCT Pub. Date: Sep. 10, 2021

(65) Prior Publication Data
US 2023/0093437 A1    Mar. 23, 2023

(30) Foreign Application Priority Data
Mar. 6, 2020   (HU) ..................... 2000086

(51) Int. Cl.
*H04L 9/00* (2022.01)
*H04L 9/06* (2006.01)

(52) U.S. Cl.
CPC .......... *H04L 9/0662* (2013.01); *H04L 9/0618* (2013.01)

(58) Field of Classification Search
CPC ..... H04L 9/0662; H04L 9/0618; H04L 9/001; G09C 5/00
See application file for complete search history.

(56) References Cited

U.S. PATENT DOCUMENTS

| | | | |
|---|---|---|---|
| 2017/0063530 A1* | 3/2017 | Fiske | H04L 9/0618 |
| 2017/0257212 A1* | 9/2017 | Domosi | H04L 9/06 |

FOREIGN PATENT DOCUMENTS

| | | | | |
|---|---|---|---|---|
| CN | 110225222 A | * | 9/2019 | H04L 9/001 |

OTHER PUBLICATIONS

Chai Xiuli et al. "Exploiting plaintext-related mechanism for secure color image encryption", Neuralcomputing and Applications, vol. 32, No. 12, Jun. 24, 2019 (Jun. 24, 2019). (Year: 2019).*

(Continued)

*Primary Examiner* — Jeffrey C Pwu
*Assistant Examiner* — Helai Salehi
(74) *Attorney, Agent, or Firm* — Wood Herron & Evans LLP

(57) ABSTRACT

The invention is a scrambler apparatus for scrambling a character block, in particular for cryptographic applications, which apparatus comprises a scrambler module (210) adapted for transforming a first character block (220a) consisting of first character components (225a) to a scrambled second character block (220b) consisting of second character components (225b), configured with a scrambler automaton (250), and each second character component (225b) is determined based on a first character component (225a) of the first character block (220a) having the position corresponding to the position of the given second character component (225b), at least one character component (225a, 225b) from the available character components (225a, 225b) of the first character block (220a) and the second character block (220b), and a single input signal character component (Continued)

(225c) of the input signal character block (220c). The invention is, furthermore, a scrambling method, a descrambler apparatus and a descrambling method.

20 Claims, 5 Drawing Sheets

(56) References Cited

OTHER PUBLICATIONS

Pal Domosi et al: "A novel cryptosystem based on abstract automata and Latin cubes", Studia Scientiarum Mathematicarum Hungarica,, vol. 52, No. 2, Jul. 1, 2015 (Jul. 1, 2015), pp. 1-11, XP055503968, HU ISSN: 0081-6906, DOI: 10.1556/012.2015.52.2.13 (Year: 2015).*
Chai Xiuli et al: "Medical image encryption algorithm based on Latin square and memristive chaotic system", Multimedia Tools and Applications, Kluwer Academic D3 Publishers, Boston, US, vol. 78, No. 24, Oct. 17, 2019 (Oct. 17, 2019), pp. 35419-35453 (Year: 2019).*
European Patent Office, International Search Report in PCT Application No. PCT/HU2021/050019, Jul. 9, 2021 (3 pgs.) and Written Opinion Of The international Searching Authority (8 pgs.).
Chai Xiuli et al, "Exploiting Plaintext-Related Mechanism For Secure Color Image Encryption," Neural Computing And Applications, XP037169531, ISSN: 0941-0643Springer London, London, Jun. 24, 2019.
Pal Domosi et al, "A Novel Cryptosystem Based on Abstract Automata And Latin Cubes," Studia Scientiarum Mathematicarum Hungarica, vol. 52, No. 2, Jul. 1, 2015, pp. 1-11, XP055503968, HU.
Chai Xiuli et al, "Medical Image Encryption Algorithm Based on Latin Square And Memristive Chaotic System," Multimedia Tools And Applications, Kluwer Academic Publishers, Boston, US, vol. 78, No. 24, Oct. 17, 2019, pp. 35419-35453, XP036935167.

* cited by examiner

SCRAMBLER APPARATUS AND METHOD IN PARTICULAR FOR CRYPTOGRAPHIC APPLICATIONS, AND DESCRAMBLER APPARATUS AND METHOD THEREFOR

This application claims priority, under Section 371, and/or as a continuation under Section 120, to PCT Application No. PCT/HU2021/050019, filed Mar. 5, 2021, which claims priority to Hungarian Application No. P2000086, filed Mar. 6, 2020, which is expressly incorporated by reference herein, in its entirety.

TECHNICAL FIELD

The invention relates to a scrambler apparatus and a scrambling method adapted for scrambling character blocks, and a descrambler apparatus and descrambling method therefor adapted for descrambling a character block, in particular for cryptographic applications.

DESCRIPTION OF PRIOR ART

The basic function of a scrambler, or a data transmission scrambler [https://en.wikipedia.org/wiki/Scrambler] is to prepare data signals for transmission. A scrambler transforms the signal's characteristics to resemble the characteristics of a random signal, so it is usually also called "a randomizer".

The Vernam-type one-time pad (based on one time [single use] password) encrypting system is known, it is based on scrambling. In many cases, the aim of scrambling is not encryption but secure data transmission. Because a scrambled signal is random, the probability that they include longer homogeneous bit strings (all zeros or all ones) is very low. Thereby, the occurrence of longer bit sequence consisting of identical bits can be prevented. This method improves the characteristics of the radio frequency spectrum of the signal, and thus makes its transmission easier.

Initially, a scrambler was a pseudorandom number generator implemented as a shift register having a fixed number of elements, usually 15 bits, which performs an exclusive or (XOR) operation between its output and the signal to be transmitted. The scrambled signal is obtained on the output of the (XOR) gate. The length of the pseudorandom sequence is given by the element count of the shift register. The signals transformed in such a way are then either transmitted by the sender to the receiver, or are broadcasted; and are recovered into their original form by the receiver (receivers) in the same way, utilizing the same type of shift register, i.e., the same pseudorandom number sequence that was used for the scrambling. The scrambling, in its traditional sense, also differs from encryption in that, in many cases, the random number sequence generated by the shift register (which can also be operated as a symmetric encryption key) is known publicly.

In case of symmetric key systems, the encryption and decryption keys are either identical, or one can be easily calculated from the other. Because of that, both the encryption and decryption keys have to be kept secret, and can be known only to the sender and the receiver of the secret message. The other main type of cryptosystems is constituted by asymmetric, or in an alternative term, public key cryptographic systems. In the case of asymmetric encryption systems, the decryption key can only be determined if the public key is known. In another type of classification, a distinction is made between stream ciphers and block ciphers. A stream cipher encrypts the plaintext (open text) in a character-by-character manner, while a block cipher decomposes the plaintext into blocks with a typical length of 8 or 16 characters, assigning a respective ciphertext block to each plaintext block.

Compared to most symmetric key cryptosystems, public key cryptographic systems are less effective as far as their speed is concerned (they are at least four times slower, see for example [B. Padmavathi, S. Ranjitha Kumari: A Survey on Performance Analysis of DES, AES and RSA Algorithm along with LSB Substitution Technique, IJSR, 2 (4) (2013), 170-174.]). Because of this, in practice, public key systems are usually used in combination with symmetric key systems. Therefore, the application of public key cryptosystems does not diminish the importance of symmetric key solutions.

Prior art stream encryption systems, being not automata theory based, operates so that in course of encryption they generate—utilizing a pseudorandom number generator—pseudorandom binary strings, which are then added mod 2 to the digitized plaintext (interpreted as a binary string) in a bit-by-bit fashion (i.e., an exclusive OR binary operation is applied); the ciphertext is obtained as the binary string resulting from the operation. In the course of deciphering, the original digitized plaintext is recovered by executing the same operation on the ciphertext utilizing the same pseudorandom bit sequence. The best-known of these stream encryption systems is the RC4 system that was published in 1987 by R. Rivest.

[G. Paul and S. Maitra: RC4 Stream Cipher and its Variants (Discrete Mathematics and its Applications). CRC Press, Boca Raton, 2011.]

A common drawback of these stream encryption systems is that they can be broken with a known-plaintext attack.

Four major sorts (groups) of encryption systems based on automata theory are known:
  systems based on Mealy automata [Rayward-Smith, V. J.: Mealy machines as coding devices. In: Beker, H. J. and Piper, F. C. eds., Cryptography and Coding. Claredon Press, Oxford, 1989; Tao, R.: Finite Automata and Application to Cryptography. Springer-Verlag, Berlin, 2009],
  systems based on automata without output signals [Dömösi, P. and Horváth, G.: A Novel Stream Cipher Based on Deterministic Finite Automaton. Ninth Workshop on Non-Classical Models of Automata and Applications (NCMA 2017), 11-16.; Dömösi, P.: A Novel Cryptosystem Based on Finite Automata without Outputs. In: Ito, Masami; Kobayashi, Yuji; Shoji, Kunitaka (eds.): AFLAS'08, Proc. Int. Conf. On Automata, Formal languages and Algebraic Systems, Kyoto, Japan, 20-22 Sep. 2008. World Scientific, New Jersey, London, Singapore, Beijing, Shanghai, Hong Kong, Taipei, Chennai, 2010, 23-32, 2010],
  cryptosystems based on cellular automata [S. Wolfram: Cryptography with Cellular Automata. In: C. W. Hugh, eds., Proc. Conf. Advances in Cryptology—CRYPTO '85, Santa Barbara, California, USA, Aug. 18-22, 1985, LNCS 218, Springer-Verlag, Berlin, 1986, 429-432],
  systems based on networks of automata [Dömösi, P. and Horváth, G.: A novel cryptosystem based on abstract automata and Latin cubes. Studia Scientiarum Mathematicarum Hungarica}, 52(2):221-232.].

The approaches included in the Hungarian patent descriptions No. 227,781 [Dömösi Pál: Symmetric key cryptographic apparatus and method for encryption and decryption of information, Hungarian patent, registration number: 227, 781, and No. 229,534 [Dömösi Pál: Apparatus and method for protecting limited accessible program and data distribution, Hungarian patent, registration number: 229,534, 2008] are encryption systems based on automata without output signal, wherein, like in stream encryption systems, encryption is performed in a character-by-character manner, with a variable-length ciphertext block (including one or more characters) being generated from each character of the plaintext. A serious disadvantage of these approaches is that the ciphertext is significantly longer than the plaintext. Namely, the ciphertext can even be multiple times longer than the plaintext.

The Hungarian patent application P1700499 [Dömösi Pál, Horváth Géza: Symmetric key stream cipher cryptographic method and apparatus, Hungarian patent application, file number: P1700499, 2017] discloses a stream encryption system based on automata without output signal. Furthermore, the approach disclosed in the application P1700499 utilizes a pseudorandom number generator for encryption and decryption. The disadvantages of this are given in the following paragraphs.

Based on the outputs of a pseudorandom number generator that is sufficiently secure cryptographically (or is said to be sufficiently secure) it cannot be easily decided if the pseudorandom number generator in question is operating correctly or has been hacked.

According to a number of reports, certain entities successfully intercept the communications of users of cryptographic apparatuses by hacking the pseudorandom number generators included therein [Adam L. Young and Moti Young: Kleptography: Using Cryptography Against Cryptography, Advances in Cryptology—EUROCRYPT '97. Lecture Notes in Computer Science. Springer, Berlin, Heidelberg. pp. 62-74, 1997.; Joseph Menn: Exclusive: Secret contact tied NSA and security industry pioneer. Reuters, Dec. 20, 2013; Peter Bright: Not so random numbers Report: NSA paid RSA to make flawed crypto algorithm the default. Ars Technica, Dec. 21, 2013; Greg Miller: The intelligence coup of the century, Washington Post, Feb. 11, 2020]. This is a clear disadvantage of utilizing pseudorandom numbers in the known approaches.

Besides that, in the case of cryptographic methods and apparatuses applying pseudorandom number generators it is also possible to gather information on the generated pseudorandom numbers by side-channel attacks, which information can also be used for unauthorised breaking of secret messages [Paul C. Kocher: Timing Attacks on Implementations of Diffie-Hellmann, RSA, DSS, and Other Systems. Advances in Cryptology, CRYPTO'96, LNCS, 1109, pp. 104-113, 1996.].

Among the automata theory-based cryptosystems, some of the cellular automata-based cryptosystems and the automata network-based cryptosystems are symmetric block ciphers. A common problem of symmetric cryptosystems based on cellular automata is that some of them can be easily broken [Bao, F.: Cryptoanalysis of partially known cellular automata. IEEE Trans. on Computers, 53: 1493-1497, 2004.; Biham, E.: Cryptoanalysis of the chaotic map cryptosystem suggested at Eurocrypt'91. In: Davies, D. W. ed., Proc. Conf. Advances in Cryptology, Workshop on the Theory and Application of Cryptographic Techniques, Brighton, UK, pages 532-534. EUROCRYPT'91, April 8-11 1991.], while other approaches, though secure, are not effective because of their high computation demand that results in slow operating speed (Guan, P.: Cellular automaton public key cryptosystem. In: Complex Systems, 1 (1987), 51-56; Kari, J.: Cryptosystems based on reversible cellular automata. Publ: University of Turku, Finland, April, 1992, preprint.).

The key automaton of the block encryption systems based on a network of automata is a composition of automata consisting of elementary (factor) automata. As the ciphertext block of the key automaton, the system assigns to each plaintext block that state of the key automaton into which the key automaton is taken from its state with a serial number identical to the plaintext block by a randomly selected input signal or input signal sequence. In case the randomly chosen input signals can be generated applying a pseudorandom number generator, the core of the pseudorandom number generator is also part of the secret key. [Dömösi, P. and Horváth, G.: A novel cryptosystem based on abstract automata and Latin cubes. Studia Scientiarum Mathematicarum Hungarica}, 52(2):221-2321; Dömösi, P. and Horváth, G.: A novel cryptosystem based on Glushkov product of automata. Acta Cybernetica, 22:359-371.; Pál Béla Dömösi, Géza Horváth, Marianna Salgáné-Medveczki, Péter Salga: Cryptographic apparatuses and methods for encrypting and decrypting data using automata, U.S. Pat. No. 10,419,207, 2019.].

A number of block ciphers not based on automata theory exist. Of these block ciphers the ones that were designated as AES (Advanced Encryption Standard) US standards in 2000 by the NIST (U.S. National Institute of Standards and Technology) will now be scrutinized.

1. MARS—IBM [C. Burwick, D. Coppersmith, E. D'Avignon, R. Gennaro, S. Halevi, C. Jutla, S. M. Matyas, L. O'Connor, M. Peyravian, D. Safford, and N. Zunic, "MARS—A Candidate Cipher for AES," NIST AES Proposal, June 1998.]
   It has turned out from MARS cipher that partial keys containing long sequences of 0-s or 1-s can allow successful attacks against MARS, so this system is not secure [B. Preneel; et al.: *Comments by the NESSIE Project on the AES Finalists*, Submitted to the Advanced Encryption Standard process, round 2 comments. National Institute of Standards and Technology (NIST), May 2000].
2. RC6—RSA [R. Rivest, M. Robshaw, R. Sidney, and Y. L. Yin, "The RC6 Block Cipher," NIST AES Proposal, June 1998.] It has been proven that the RC6 cipher is not secure against certain statistical attacks. [Gilbert H., Handschuh H., Joux A., Vaudenay S. (2001) A Statistical Attack on RC6. In: Goos G., Hartmanis J., van Leeuwen J., Schneier B. (eds) Fast Software Encryption. FSE 2000. Lecture Notes in Computer Science, vol 1978. Springer, Berlin, Heidelberg]
3. Rijndael—Joan Daemen and Vincent Rijmen [J. Daemen and V. Rijmen, AES Proposal: Rijndael, AES Algorithm Submission, Sep. 3, 1999] The 128-bit variant of this approach was selected as AES by the NIST.
4. Serpent—Ross Anderson, Eli Biham, Lars Knudsen [Ross Anderson, Eli Biham, Lars Knudsen: Serpent: A Flexible Block Cipher With Maximum Assurance. In: The First Advanced Encryption Standard Candidate Conference, Ventura, California, USA, 20-22 Aug. 1998.]
5. Twofish—Bruce Schneier, John Kelsey, Niels Ferguson, Doug Whiting, David Wagner, Chris Hall [Bruce Schneier, John Kelsey, Doug Whiting, David Wagner, Chris Hall, Niels Ferguson: Twofish: A 128-Bit Block Cipher. AES Round 1, Technical Evaluation CD-1: NIST, 1998.]

Because the first two block ciphers included in the above list have proven to be breakable, only the other three are included in our further comparisons. All of the other three block ciphers include S-box techniques, against which (disregarding the usually implementation-dependent side-channel attacks) there are two known types of attacks: the XSL attack [Nicolas Courtois; Josef Pieprzyk: Cryptanalysis of Block Ciphers with Overdefined Systems of Equations. LNCS. 2501. pp. 267-287, 2002.], and the boomerang attack. [David Wagner (March 1999). The Boomerang Attack. 6th International Workshop on Fast Software Encryption (FSE '99). Rome: Springer-Verlag. pp. 156-170, 2007]. The XSL attack makes use of the recognition that the AES (and in general, the Rijndael) and partially also the Serpent cryptosystems can also be described as a multivariable quadratic system of equations. S-boxes based on algebraically simple inverse functions are especially sensitive to such analyses. The XSL algorithm was designed for solving the systems of equations generated in such a way. According to the estimation of Courtois and Pieprzyk, an "optimistic evaluation shows that the XSL attack might be able to break Rijndael cipher with 256 bits and Serpent cipher with 192 and 256 bit length." However, their analysis has not been uniformly accepted. As of now, the method has not been implemented, and its applicability is widely disputed. Concerning Twofish no publication information is available about this question.

The boomerang attack is based on differential cryptoanalysis, i.e., it is an improved version thereof. Ultimately, the attacker makes use of the fact that the differences appearing in the ciphertext can be significantly affected by the differences existing in the plaintext. Effective boomerang attacks had been developed earlier against more or less limited variants of the Serpent cryptosystem. Among others, this included the successful breaking of the 10-round, 256-bit variant. [Eli Biham, Orr Dunkelman, and Nathan Keller: The Rectangle Attack—Rectangling the Serpent. Advances in Cryptology, Proceedings of EUROCRYPT 2001. Innsbruck: Springer-Verlag. pp. 340-357, 2001]. Boomerang attacks against AES (or more accurately, Rijndael) are effective only against the 10-round AES 256 and the complete AES-192 [Wang, H., and Peyrin, T. (2019). Boomerang switch in multiple rounds. Application to AES variants and deoxys. IACR Transactions on Symmetric Cryptology, 2019 (1), 142-169. doi:10.13154/tosc.v2019.i1.142-169, 2019.], while no publication information is available concerning Twofish.

Although according to the current state of the art, the above described three block encryption methods and apparatuses not based on automata theory are secure, the short analysis included above indicates that, in addition to the systems comprising S-boxes such secure block encryption systems are also viable that do not apply this approach.

In the following, we turn to the information on pseudorandom numbers.

The operation of pseudorandom number generators is based on the principle of generating a pseudorandom number sequence of limited length starting from a nonnegative number (called the "core") of limited length. The algorithm must be polynomial-time, that is, there must be such N, k natural numbers that, if the upper limit of the generated pseudorandom number is N, then the step count of the algorithm generating the subsequent pseudorandom number does not exceed $N^k$.

The sequence obtained as a result must be "random" in an exactly defined sense. To put it in another way, such a polynomial-time algorithm must not exist that could be able to distinguish it from a real random sequence. A requirement equivalent with this characteristic is that no bit of the sequence can be predicted from previous bits by a polynomial-time algorithm. [Niederreiter, H.: Random Number Generation and Quasi-Monte Carlo Methods. SIAM, Philadelphia, 1992.]

One of the earliest and most widely applied types of pseudorandom number generator is the linear congruence generator that was first proposed by D. H. Lehmer in 1951, [D. H. Lehmer. Mathematical methods in large-scale computing units. In Proc. 2nd Sympos. on Large-Scale Digital Calculating Machinery, Cambridge, MA, 1949, pages 141-146, Cambridge, MA, 1951. Harvard University Press.] with countless improved variants having been developed since [Karl Entacher: A collection of selected pseudorandom number generators with linear structures—advanced version. Technical report, Dept. of Mathematics, University Salzburg, Austria, 1999. Previous version: Austrian Sci. Found. FWF No P11143-MAT, Techn. Report 97-1, ACPC-Austrian Center for Parallel Computation, University of Vienna, Austria, 1997.].

A yet another improved variant of the linear congruence generator is the counter-based pseudorandom number generator [John K. Salmon, Mark A. Moraes, Ron O. Dror, and David E. Shaw. 2011. Parallel random numbers: as easy as 1, 2, 3. In Proceedings of 2011 International Conference for High Performance Computing, Networking, Storage and Analysis (SC '11). ACM, New York, NY, USA, Article 16, 12 pages.]. Counter-based random number generators comprise two component modules, the state transition module and the output module. The state transition module and the output module both have a single core. The first state is determined by the value of the core of the state transition module, with each successive state being determined by the previous state based on the state transition function. The core of the output module and the value of the state transition function determine—via the output function—a pseudorandom string that is fed to the output as partial strings having identical length. The subsequent (initially, the first) pseudorandom number sequence of the output function is constituted by these partial strings. It may also happen that this sequence has only one element, i.e., the pseudorandom string generated by the output module appears at the output as a single pseudorandom number.

In U.S. Pat. No. 10,419,207, such an initial automaton is (or can be) applied for generating pseudorandom numbers of which the state set and the input signal set are identical, with the core and the pseudorandom number being, respectively, a randomly selected input signal of the automaton, and that state of the automaton into which it is transferred from the (secret) initial state under the effect of this input signal. Moreover, the second pseudorandom number will be that state of the automaton into which the automaton transitions from a state identical to the core by an input signal that is identical to the initial state. The subsequent pseudorandom numbers will be those states into which the automaton is taken from its current state by the input signal that is identical to the state that precedes the current one. This approach has the significant disadvantage that it cannot be guaranteed that the pseudorandom number generator is a full-period one, i.e., it cannot be guaranteed that every possible state occurs within a single period (without repetitions). In the case of this particular known approach, in an edge case the period may have unit length, i.e., the one and the same pseudorandom number may be generated over and over again.

In the following, we turn to the information on cryptographic hash values.

The hash algorithm must handle fragment packages. The completion is usually done with a fixed value (for example, the filler byte 0X00) until the full package is obtained. Since it has very low probability that two different files have the same hash, hash functions are widely used for verifying the authenticity of files. The integrity of the file can thus be verified. The following three methods and apparatuses are most frequently applied:

1. The first version of the SHA (Secure Hash Algorithm) cryptographic hash algorithm was introduced in 1993 by the US National Institute of Standards and Technology (NIST). Its current version can generate a 512-bit hash value [Federal Information Processing Standards Publication 180-2. Secure Hash Standard, NIST, 2002.]. The first post-2010 version of the SHA-1 algorithm is not considered secure by the NIST, while the second variant of the algorithm, SHA-2, is considered to be secure. [National Institute on Standards and Technology Computer Security Resource Center, NIST's Policy on Hash Functions, accessed Mar. 29, 2009.]

2. The acronym MD (Message Digest) is a common designation of several different hash algorithms. The best-known of them (MD-2) was elaborated in 1982 at the MIT [R. Rivest: The MD5 Message-Digest Algorithm, MIT Laboratory for Computer Science and RSA Data Security, Inc., 1992], its latest version being the MD5 algorithm. The variants of the MD algorithm generate a 128-bit hash value from the input. As certain cryptographic vulnerabilities of the MD5 algorithm have since been discovered, its application is not recommended according to the literature [Xiaoyun Wang & Hongbo Yu: How to Break MD5 and Other Hash Functions. Advances in Cryptology—Lecture Notes in Computer Science (2005) pp. 19-35. Retrieved 21 Dec. 2009.].

3. The RIPEMD (Race Integrity Primitives Evaluation Message Digest; https://en.wikipedia.org/wiki/RIPEMD) hash function was created in 1996 by the RIPE consortium. It originally had a 128-bit hash value that was later increased to a 160-bit one, [H. Dobbertin, A. Bosselaers, B. Preneel: RIPEMD-160, a strengthened version of RIPEMD. Fast Software Encryption, LNCS 1039, D. Gollmann, Ed., Springer-Verlag, 1996, pp. 71-82.] because it was discovered that the original version of RIPEMD could not be considered secure [P. C. van Oorschot, M. J. Wiener, "Parallel collision search with application to hash functions and discrete logarithms," Proc. 2nd ACM Conference on Computer and Communications Security, A C M, 1994, pp. 210-218.].

These hash functions are obtained by applying bitwise Boolean operations (logical AND, logical OR, negation, exclusive OR), bitwise rotation, and (with the exception of the MD algorithms) mod $2^n$ addition (n=32, 64, 128, etc.) in multiple rounds, with the RIPEMD algorithm also comprising certain permutation operations.

In view of the known approaches, there is a demand for a scrambler, a cipher (encryption apparatus) and a decipher (decryption apparatus), a pseudorandom number generator and a cryptographic hash value generator that are more effective than the known approaches.

DISCLOSURE OF THE INVENTION

The primary object of the invention is to provide a scrambler apparatus, a scrambling method, a descrambler apparatus, and a descrambling method which are free of the disadvantages of prior art approaches to the greatest possible extent.

A further object of the invention is to provide a scrambler, a cipher (encryption apparatus) and a decipher (decryption apparatus), a pseudorandom number generator and a cryptographic hash value generator that are more effective than the know approaches. A further object of the invention is to provide a symmetric encryption and decryption apparatus that provide more effective key exchange than the existing approaches.

In an embodiment, the object of the invention is to provide block encryption and block decryption apparatuses and methods for encrypting and decrypting data that do not cause large-scale size inflation of the ciphertext with respect to the corresponding plaintext, and preferably have a key that is more secure than the keys applied in known methods and apparatuses for encryption and decryption.

In an embodiment, the object of the invention is to provide a cryptographic pseudorandom number generator that is full-cycle and fast, and, in addition to that, is cryptographically secure, that is it does not exhibit any pattern, within the full cycle, even partial strings do not exhibit periodicity, it takes on any value with equal probability, the subsequent value within a given cycle cannot be inferred even if all values preceding said value are known, it exhibits an avalanche effect, i.e., with a high probability, two successive random numbers are different in 50% of their characters (for example, bits).

In a yet another embodiment, an object of the invention is to provide a cryptographic hash value generator that, in addition to being faster than widely applied methods and apparatuses of a similar purpose, is also based on a completely different operating principle, so it is preferable not only for its speed, but, due to the different operating principle, widespread attack types are proven ineffective against the hash value generator according to the invention.

The objects of the invention can be achieved by the scrambler apparatus according to claim 1, the descrambler apparatus according to claim 16, the scrambling method according to claim 18, and the descrambling method according to the last claim. Preferred embodiments of the invention are defined in the dependent claims.

Like conventional scrambler apparatuses, the scrambler apparatus based on automata theory according to the invention could also be applied for improving the quality of radio frequency signal transmission; however, issues related to that are not addressed in this description, instead, our emphasis is placed on the cryptographic applications.

In sum, it can be assessed that the invention is a combination of scrambling (mixing) and automata technology. To our knowledge, this has not occurred in the prior art approaches—either in relation to scramblers, or in relation to utilizing automata.

The encryption method (system) provided utilizing the scrambler apparatus and method according to the invention based on block encryption exhibits an avalanche effect (a certain kind of avalanche effect is also exhibited by the scrambler apparatus and method according to invention, which is advantageous also for other functions). This means that if the encryption system in question is applied for processing two different plaintext blocks, then the ciphertext blocks obtained as a result of the encryption will be significantly different, even if the given plaintext blocks differ from each other to a very small extent (even in a single bit or character). Besides that, it is also noted that stream ciphers—which are therefore the alternative of the block ciphers applied in the invention—do not exhibit an avalanche effect.

Moreover, due to the avalanche effect, the security of the present invention is greatly improved compared to the stream encryption systems developed earlier.

As it was pointed out in the introduction, a common drawback of stream encryption systems is that they can be broken with the known-plaintext attack type. It is noted that the encryption solution described in this description cannot be broken by a known-plaintext attack.

In the introduction we also mentioned that the application of public key cryptosystems does not diminish the importance of symmetric key approaches. The invention, i.e., the apparatus and method composed by it, is a symmetric key one, so we do not include a comparison between the invention and public key systems; since a symmetric key block encryption cryptosystem is composed by the apparatus and method according to the invention (it is adapted for converting the original input message, applying the encryption and decryption means and the encryption and decryption keys, into a secret message, and for converting the incoming secret message back into the original message applying the encryption and decryption keys), for the above-described reasons, a comparison between the subject of this application and stream encryption systems not based on automata theory is not included.

As it was mentioned in the introduction, it cannot be decided applying simple means whether a pseudorandom number generator is operating correctly or has been hacked. In the case of a simple counter apparatus—that is also applied in certain embodiments of the invention—this can be checked much more simply, because after the first output (which is the core value), the subsequent outputs must be successive (i.e., if the starting value is not the maximum possible value, the subsequent output value is always greater than the current value by a fixed positive integer, while if the starting value is the maximum value, the subsequent output value must be zero) numbers (i.e. operates with a stepping principle).

In addition to allowing for improved speeds, therefore, the feature that in particular embodiments of the apparatus and method according to this specification pseudorandom number generators are not applied also has a role in strengthening the confidence in the applied apparatus and method. The characteristics of the scrambler automaton described in this description make it unnecessary to apply a pseudorandom number generator, i.e., even in embodiments related to encryption, applying a simple counter is sufficient. With this solution, the risk of successful side-channel attacks or other attacks targeted at compromising security is greatly reduced, i.e., the invention is immune to attacks against random number generators (this also holds true for the pseudorandom number generator disclosed in the application according to the invention). In addition to that, the invention does not comprise S-boxes, i.e., it is also immune to S-box-based attacks.

It is important to make a distinction that in an embodiment, anyhow, pseudorandom number is generated but that is different from the aspect mentioned here, since in that case the pseudorandom number is the result.

Thanks to the application of an appropriately structured scrambler automaton—while retaining the advantages of cryptosystems based on automata theory—the invention therefore renders it impossible to break the encrypted message without possessing the key, while at the same time it has simple structure, so the encryption and decryption operations can be performed quickly.

In certain embodiments, the apparatus and method according to the invention functions as a counter-based pseudorandom number generator, in which counter-based generator the value generated by the counter is received by a scrambler module (unit) as an input, and the generated pseudorandom number will be the signal sequence generated by this scrambler module (see also example 8 and other description parts). The counter apparatus applied according to the invention is obviously a full-cycle counter, i.e., any arbitrary s-th and s+t-th values generated by it are identical if and only if t is identical to the cycle length of the counter, which is preferably $2^{128}$ (16 bytes are 128 bits, so the number of all 16-bit binary strings is $2^{128}$; the applied counter preferably generates binary strings with a length of 16 bytes). This is important because if the cycle length would be allowed to be very small (for example, smaller than 10), then a longer ciphertext (for example, having a length of approximately 1000 characters) could be deciphered by a statistical attack (if the counter in question is applied for encryption purposes). This would also be the case if in a cryptosystem applying a pseudorandom number generator (for example, a cryptosystem based on a network of automata), the cycle of the random number generator was for some reason very short.

Scrambler automata generate a pseudorandom string such that they transmit, with a fixed input word, from a state identical to a constant received from the counter into another state, which latter state will be the random string. Because scrambler automata are preferably permutation automata, they generate two different pseudorandom strings as a result of any two different values that they receive from the counter. Thus, with regard to the fact that the counter is a full-cycle one, the pseudorandom number generator specified in such a manner will also be a full-cycle generator (in relation to that, see also further below).

Based on the pseudorandom number generators described in literature, in this description such a counter-based pseudorandom number generator is set forth that—unlike the generators described in literature—is based on automata, wherein the state transition module is implemented as a counter (i.e., it comprises a counter but in a different role than known approaches), with the output module being implemented as a scrambler automaton. As it was mentioned above, the pseudorandom number generator thus produced is a full-cycle generator, that is, the generated pseudorandom number sequences are periodical according to the number of elements of the set of pseudorandom number values (preferably $2^{128}$).

As it was mentioned above, in approach disclosed in U.S. Pat. No. 10,419,207, in an edge case the period may have unit length, i.e., the one and the same pseudorandom number is generated over and over again. According to the invention, pseudorandom numbers are obtained by such a solution that eliminates this serious disadvantage.

In a yet another embodiment, the apparatus and method according to the invention is adapted for generating a cryptographic hash value (i.e., it functions as a hash function generator). Applying apparatuses and methods for cryptographic hash generation, data pieces of any length can be mapped to a given length. The compressed data thus obtained is called cryptographic hash value. It is noted here that the cryptographic hash value of the document depends not only on the content of the given document but also on the method and apparatus applied for generating the cryptographic hash value. Thus, when the cryptographic hash value of a document is mentioned, it is meant to a hash value that corresponds to the document in question and is generated by a particular method and apparatus for generating a cryptographic hash value. The apparatus for generating a hash value comprises a module for reading in a document and retrieving its hash value, with a scrambler module for generating the hash value being connected to the input of this execution module.

Because all known hash functions are essentially based on the same elementary operations, it is expedient to apply the hash functions described in this application that have a completely different operating principle, and thus certain widespread attack types are ineffective against the present methods and apparatuses for generating a hash value.

A hash value will of course be shorter than the corresponding document (or text portion). Therefore, several different documents can have the same hash value. In the case of the hash generation process, everything is public (so for example the structure and the transition matrix of the automaton), while in the case of encryption and pseudorandom number generation, the automata are kept secret. It is a requirement, however, that the same hash value must be obtained every time for the same document, so hacking cannot be performed by generating a fake hash value.

Due to the invention the transition matrix of the base (elementary) automaton can be small (16×16 is enough, i.e., the transition matrix is preferably of this size, or smaller than that). Thereby, the size of the secret key is also smaller; it is not worth to apply base automaton transition matrices that are larger than that. It is not a problem if the manner of mixing is public, because due to the applied size it will still be sufficient for preventing breaking. If mixing (scrambling) were not applied, other encryption types utilizing base automata of this size could be broken by brute force attack because of the relatively low number of possible cases.

BRIEF DESCRIPTION OF THE DRAWINGS

Preferred embodiments of the invention are described below by way of example with reference to the following drawings, where.

MODES FOR CARRYING OUT THE INVENTION

Figure 1:
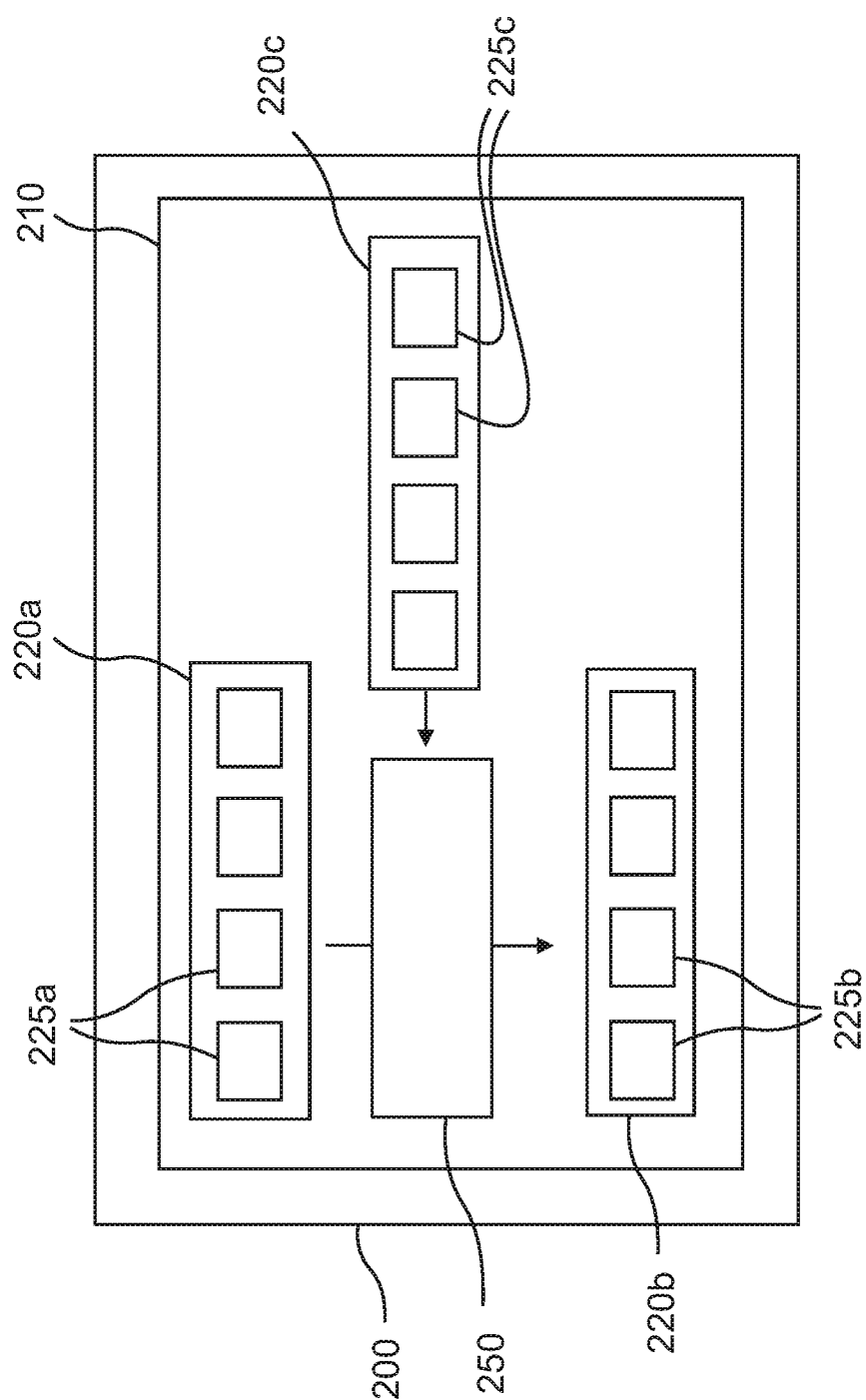
FIG. 1 is a block diagram of an embodiment of the invention.

In its several embodiments, the invention is related to a scrambler apparatus for scrambling a character block, in particular for cryptographic applications. Such a relatively generic embodiment is illustrated in FIG. 1 (in this figure, the aim of application of the scrambler is not specified, and thus it serves to hold together various embodiments with different application aims). Accordingly, the reference signs of FIG. 1 are applied widely in the general description of the invention.

The scrambler apparatus according to the invention (in FIG. 1, see a scrambler apparatus 200) comprises a scrambler module (in FIG. 1, a scrambler module 210; scrambler unit) adapted for generating, based on of a first character block (in FIG. 1, a first character block 220a) consisting of first character components (in FIG. 1, first character components 225a), a scrambled second character block (in FIG. 1, a second character block 220b) consisting of second character components (in FIG. 1, second character components 225b), i.e. for transmitting, transforming the first character block into the second character block, or assigning the second character block to the first character block.

In the scrambler apparatus according to the invention, the scrambler module is configured with (configured by; implemented by) a scrambler automaton (in FIG. 1, a scrambler automaton 250) without output signal (automaton without output signals, automaton without outputs), the scrambler automaton having a state set (set of states) comprising the first character block and the second character block, and an input signal set (set of input signals)—that is identical to the state set (as it is also shown by the character sets below)—comprising an input signal character block (in FIG. 1, an input signal character block 220c) consisting of input signal character components (in FIG. 1, input signal character components 225c), and (the scrambler automaton) transitioning (transiting, transferring, passing) from the first character block into the second character block under the effect of the input signal character block, wherein the first character block, the second character block, and the input signal character block each have a basic block size (i.e., their block size is identical, which is characterized by the basic block size; in FIG. 1, the basic block size is four, because the illustrated character blocks 220a, 220b and the input signal character block 220c comprise four character components), and each of the state set and the input signal set consist of blocks having a basic block size, (blocks) obtained from all possible combinations of an identical character set of the first character components and the second character components, as well as the input signal character components, respectively.

Naturally, there is nothing else in a character block but the character components i.e., everything that is contained in the character blocks are character components. We could also call these first and second character blocks first and second state character blocks, but the qualifiers "first" and "second" also distinguish them from the input signal character blocks that have also been introduced.

The order in which these features have been introduced illustrates why the automaton can transform (take) one character block into another, while also disclosing, on the one hand, that the sets contain character blocks, and, on the other, how the state set and the input signal set are built by (from) every possible combination of the character set. In the most general sense, the term "character set" refers to an ordered, nonempty, finite set (by way of example, in case of binary data, the numbers {0,1}, in case of a text, the letters of the alphabet, etc.). The value of the block length is preferably at least two since the term "block" can only be used in its classically in that case. The sets comprise all the possible combinations having such length (the block length), and do not contain any block of any other length. For each character component, the character set provides as many possibilities as the number of different characters, and each element of the block can be any member of the character set (in such a manner, every possible combination is obtained); this is illustrated well in the examples described in detail in the present application for blocks having a length of two (examples 7-9), and eight (example 10).

In the sections above, the first and second character components, as well as the input signal character components are separated by the conjunction "as well as" because this indicates which elements are the members of the particular sets (mutatis mutandis, in accordance with their introductions). At the same time, however, the listing above can also be understood as an ordinary listing, because all of the different character components have identical character sets. Also, in line with the above, both the state set and the input signal set consist of blocks having a basic block size, obtained from all possible combinations of the character set.

In the scrambler apparatus according to the invention, each second character component of the second character block is determined (the second character components of the second character block are determined one by one) based on a first character component of the first character block having the position corresponding to the position of the given second character component in the second character block (i.e. the original character component to which the index of the component currently being determined corresponds plays a role in the transferring (transition), this is always one of the utilized character components; that is, the qualifier "given" is included such that it can be seen which of the second character components is meant by the condition (phrase)), at least one first character component and/or second character component from the first character components of the first character block and, in case one or more second character component of the second character block is available (have already been calculated, i.e. these are the second character components that have already been determined), the one or more second character component (this at least one further character component can come from the original—first—character block, also not excluding repetitions, or from the calculated—second—character block, of course only in case it has already been determined; this clause can also be formulated as "at least one of the available character components of the first character block and the second character block", this is also expressed by the term "and/or": the at least one component can be selected from among the first or the second character components, but also from both types), and a single (sole) input signal character component of the input signal character block (i.e., in addition to the character components above, a given calculated—second—character component is determined utilizing strictly a single input signal character component).

Thus, these are utilized for determining each second character component. Due to the phrasing "at least" one of the above is open; however, other entities not included in the open list cannot be utilized, for example, exclusively a single input signal character component can be utilized.

Therefore, the above listed ones are the parameters that are exclusively utilized for the determination, which means that no other character component is utilized for determining each second character component, i.e., the scrambler automaton utilizes these parameters for determining each of the second character components.

Thus, FIG. 1 illustrates the scrambling operation applied according to the invention, carried out by means of a scrambler automaton in a schematic drawing. Scrambling is applied in several embodiments of the invention, even if the invention is in itself applied for scrambling. The embodiments implementing a cipher (encryption apparatus), pseudorandom number generator and cryptographic hash generator are also such embodiments (see further below in relation to FIGS. 2, 4, and 5); however, the embodiment implementing decryption is an exception, because therein a descrambler is utilized (see further below, although if the direction of the arrow crossing the scrambler automaton 250 is reversed, FIG. 1 could also be used for understanding the operation thereof).

FIG. 1 is therefore intended as a simple illustration of the scrambling (scrambling operation) applied in the scrambler apparatus according to the invention; accordingly, it is shown in FIG. 1 that in the scrambler apparatus according to the invention the applied scrambler automaton 250 without output signal it is fulfilled that it transitions—realizing a state transition—from the first character block 220a (from transformation initial state) into a second character block 220b (into transformation final state) under the effect of an input signal (an input signal character block 220c).

In FIG. 1 the hierarchical structure of the scrambler can be seen as illustrated by the block diagram, i.e., the scrambler apparatus 200 comprises a scrambler module 210, the implementation of which the scrambler automaton 250 is applied. However, this hierarchy observable in the illustration is explicitly not intended to exclude other components from the modules shown in the figure; as it is illustrated in FIGS. 2-5, in certain embodiments, other components are explicitly applied for performing the given functions.

In an embodiment, furthermore, for determining the second character components of the second character block, a respective transition sequence determined by a base automaton is assigned to each first character component of the first character block (this can also be formulated as the scrambler automaton is controlled by the base automaton), and a respective auxiliary first state, auxiliary second state, and auxiliary input signal is assigned to each transition of the transition sequence (these transitions—designated in the text with the δ symbol—constitute transitions between auxiliary states under the effect of an auxiliary input signal), and for the first transition of the transition sequence, the auxiliary input signal is the single input signal character component, and the auxiliary first state is one of (i.e. it is selected from group specified above, i.e., from at least one first character component and/or second character component) the at least one first character component and/or second character component from the first character components of the first character block, and, in case one or more second character component of the second character block is available, the one or more second character component, and for the last transition of the transition sequence, the auxiliary first state is the first character component of the first character block having the position corresponding to the position of the given second character component in the second character block, and for the one or more transitions of the transition sequence following the first transition, the auxiliary input signal is the auxiliary second state corresponding to the previous transition of the transition sequence.

In this embodiment, it is thus specified that the input signal of the first transition (first member; it preferably has as many members, i.e., there are as many elementary transitions, as the number of the first and second character components applied for determining each second character component) of the transition sequence between the first character block and the second character block is constituted by that single input signal character component that is utilized in the transition between the first character block and the second character block.

In addition to that, it is also specified in the first bullet point above that in the case of the first state, the auxiliary first state is the at least one additional character component (of the first character components and/or the second character components) introduced above. If the transition sequence has more than two members, then at least two such character components emerge here, in which case these components will have a place (because, according to the next point, the auxiliary first state of the last transition has already been specified): that of the at least two components which has not been used will be the auxiliary first state in one of the intermediate states of the chain. For example, if there are three transitions in the chain, then the "at least two" components are exactly two components, in which case this remaining state will be selected as the auxiliary first state of the middle transition.

The expression "a first character component of the first character block having the position corresponding to the position of the given second character component in the second character block" that was also identified above plays the role of the auxiliary first state in the case of the last transition of the transition sequence (see the second bullet point above).

It is emphasised that in the third bullet point above it is, furthermore, specified that after the first transition, for the one or more following transitions, the role of the auxiliary input signal will be performed by the previous auxiliary second state, i.e., such a transition sequence is formed wherein each obtained second auxiliary state is transferred to the following transition, wherein it will function as the auxiliary input signal.

In the Hungarian literature of the field, the term "bitmixing" is widely used for scrambling, so in this description it is also applied by us; moreover, at certain locations simply "mixing" is mentioned with the same meaning. However, the term "scrambler" (and "descrambler", etc.) is still primarily used because this have extra meaning compared to the term "mixing". In addition to that, the term "character mixer" could also be used as an alternative term instead of scrambler. A character can be represented utilizing one bit (binary number system) or more than one bits (other number systems).

Figure 2:
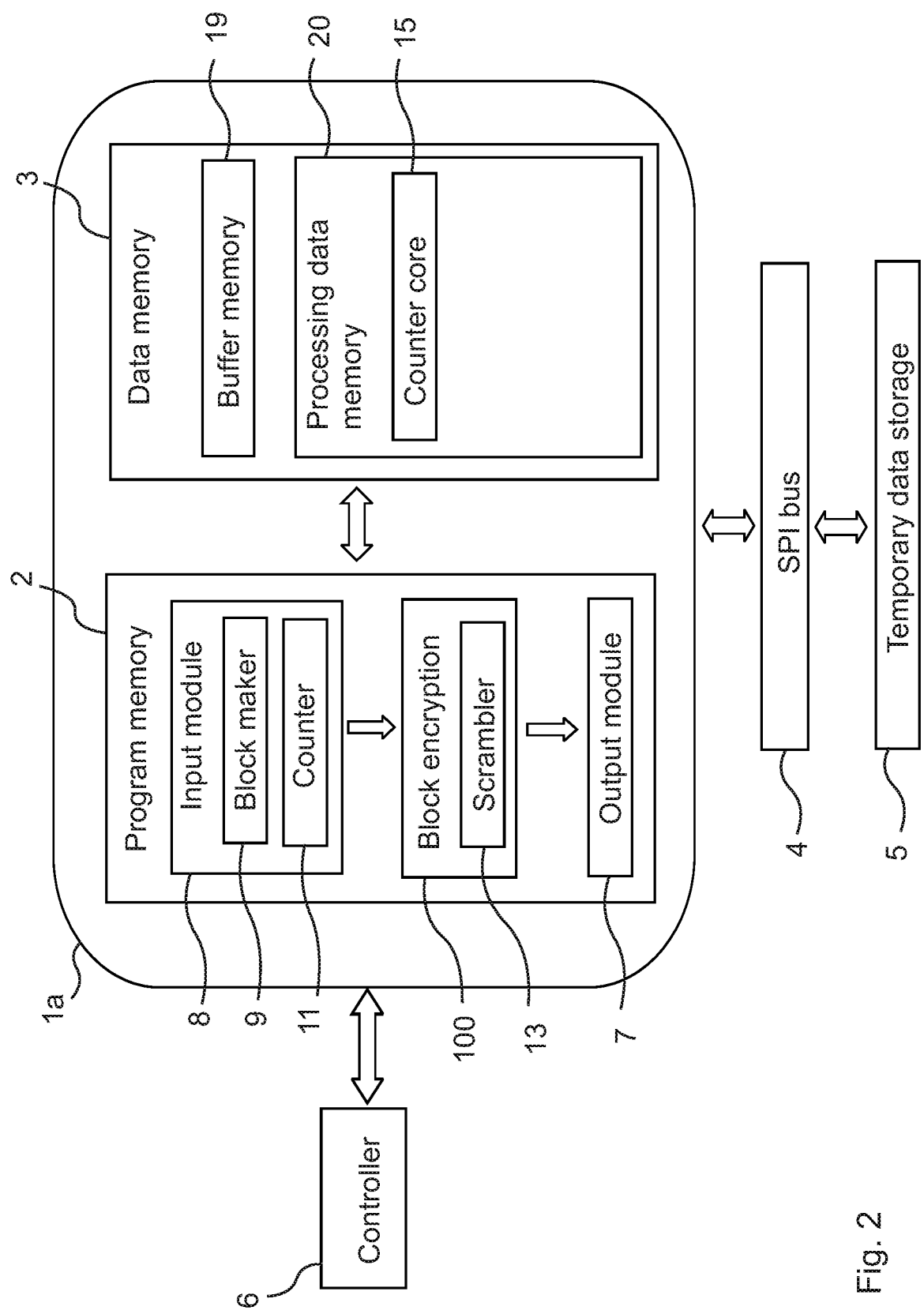
FIG. 2 is a block diagram illustrating an embodiment, adapted for encryption, of the scrambler apparatus (and thereby, the scrambling method) according to the invention.
Figure 4:
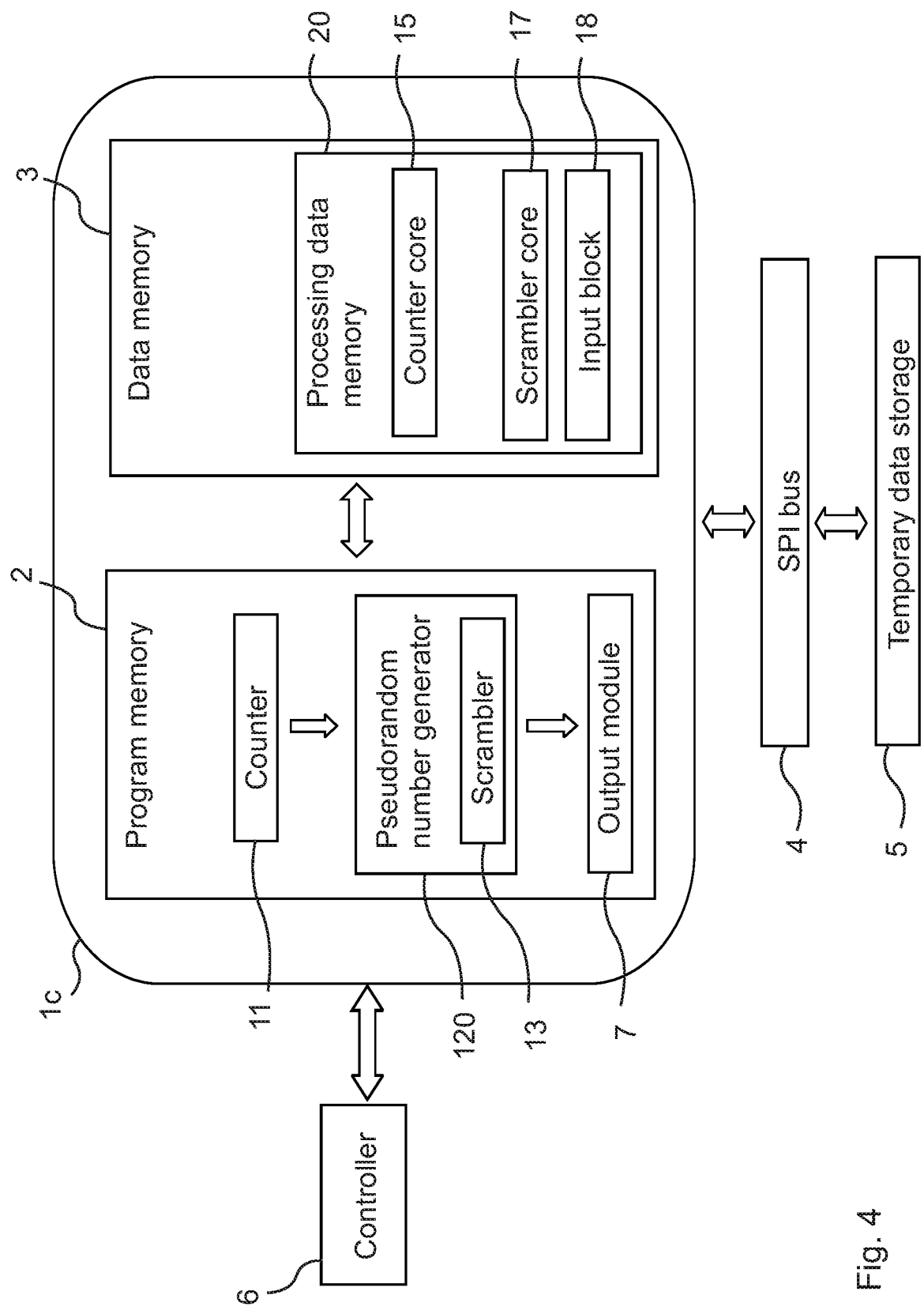
FIG. 4 is a block diagram illustrating an embodiment, adapted for generating pseudorandom numbers, of the scrambler apparatus (and thereby, the scrambling method) according to the invention.
Figure 5:
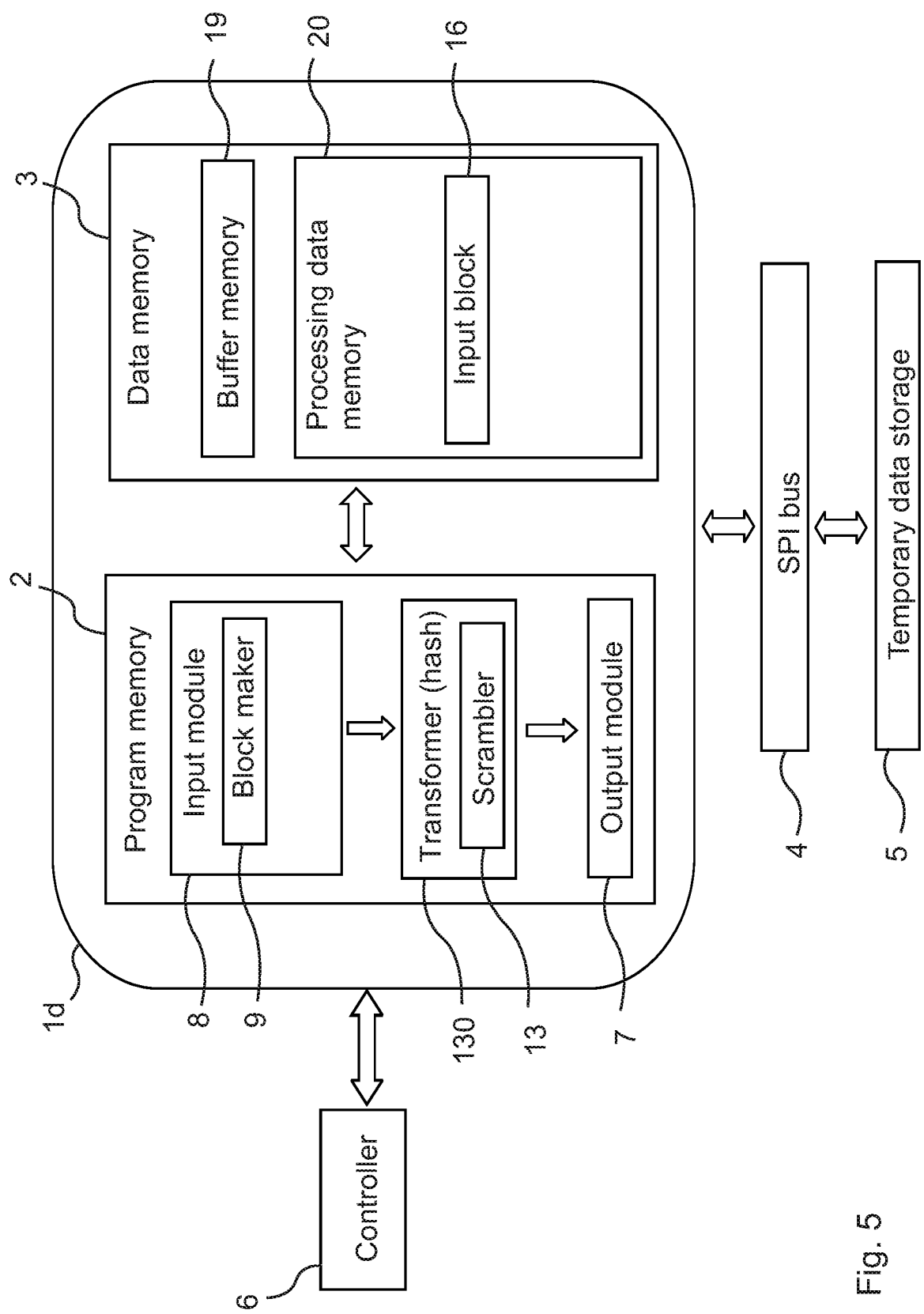
FIG. 5 is a block diagram illustrating an embodiment, adapted for generating a cryptographic hash value, of the scrambler apparatus (and thereby, the scrambling method) according to the invention.

As it was referred to above, FIGS. 2, 4, and 5 illustrate different embodiments of the scrambler apparatus according to the invention adapted for different purposes. In all of FIGS. 2, 4, and 5 there can be identified a scrambler module 13 that—according to the different purposes—forms a part of differently configured scrambler apparatuses; or, in other words, in the embodiments of FIGS. 2, 4, and 5 the scrambler apparatus—in accordance with the purpose of the given embodiment—also comprises other components in addition to the scrambler module 13 (see below for a detailed description of FIGS. 2, 4, and 5).

Accordingly, in an embodiment the scrambler apparatus according to the invention is adapted for encrypting (such type is a first scrambler apparatus 1a shown in FIG. 2; in this embodiment it is also specified that the scrambler automaton is defined as a permutation automaton so that making decryption possible) and comprises a counter module (in FIG. 1, a counter module 11; counter unit), and the input signal character block is generated by means of the counter module, and the second character block is an encrypted character block of the first character block (here a reference is made to the decryption applied above, wherein the role of the character blocks was also specified).

In the case of encryption (and also of pseudorandom number generation below) the treatment of a single character block is given; the treatment of other character blocks follows from that. Accordingly, a given state of the counter plays a role in the definition, while the fact that it is a counter is also included therein, because that indicates the way in which it will be able to handle character strings that are longer than one character block (and, in case of generating pseudorandom numbers, to generate further pseudorandom numbers).

Also, the phrasing that in this embodiment the scrambler apparatus is adapted for encrypting also expresses that certain parameters, especially the parameters of the scrambler automaton (e.g., its transition matrix, see also below) are kept secret, and thus an encrypted character block is obtained as the second character block. This is also specified in the definition above; like in the case of pseudorandom numbers and generating a cryptographic hash value the function (i.e., the purpose) is specified, together with the way of generating outputs.

In a further embodiment, the scrambler apparatus according to the invention is adapted for generating a pseudorandom number (such type is a second scrambler apparatus 1c shown in FIG. 4) and comprises a counter module, and the first character block is a counter core of the counter module (typically, in a first step of generating a first pseudorandom number, to which step the apparatus can always return when a new pseudorandom number sequence is being generated) or is generated from the counter core by means of the counter module (typically, when further members of a pseudorandom number sequence are generated), the input signal character block is a first predetermined input block (see the fixed input signal of example 8 and related aspects; such an input block is constituted also by an input block 18 of FIG. 4), and the pseudorandom number is the second character block.

Thus, the roles of the different character blocks and the input signal, i.e., the way the pseudorandom number can be obtained applying the scrambler apparatus, are specified also in this embodiment, and it is also specified that in this embodiment a predetermined input block is applied as the input signal character block.

In a still further embodiment, the scrambler apparatus (such type is a third scrambler apparatus 1d shown in FIG. 5) is adapted for generating a cryptographic hash value based on a text block having the identical character set of the first character components, the second character components, and the input signal character components (a text block can be decomposed into blocks with a size that can be used by the scrambler, i.e., blocks with sizes corresponding to the character block size; that is, some kind of mapping of the text block is performed, in other words, the cryptographic hash value is generated from the text block), and
   the first character block is a second predetermined input block (firstly, see example 9) or, in case a previous transformation completed applying the scrambler automaton is available, the second character block determined previously (this is when a second character block has already been determined),
   the input signal character block is a subsequent (i.e., for the first time the first, and then always the subsequent) block of the text block corresponding to the basic block size (the blocks of the text block corresponding to the basic block size are input in this manner, i.e., successively processing the blocks with this block size), and
   the cryptographic hash value is identical to the second character block, obtained by that transformation, wherein the input signal character block is that block of the text block corresponding to the basic block size read in last (which was read in last time; thereby the hash value finally corresponding to the text block is identified; this is usually the last one such that the text block reaches its end, to achieve that, it can also be filled up; in this manner, text blocks with a size which is not a multiple of the basic block size can also be handled).

The following comments are made on what has to be treated secretly (kept in secret) in case of the respective functions. Accordingly, the different scrambling functions attainable by the invention may differ in this respect.

In case of encryption, preferably the transition matrix (i.e., the transition matrix of the base automaton applied as a key; this makes the entire scrambler automaton to be a secret), the core of the counter, the current value of the counter, and the transition function and mapping ($\varphi$) applied in the scrambler automaton are kept secret. The fact itself that a block cipher is applied together with a counter need not be kept secret.

In case of pseudorandom number generation, the same things are kept secret as with encryption.

In case of cryptographic hash generation, of course, everything is public. Because the hash value is shorter than the document from which it is generated, identical hash values could theoretically be obtained for two different documents. It is, however, hopeless to generate an alternative document with the same hash value.

In an embodiment adapted for functioning as a pseudorandom number generator wherein a permutation automaton, especially a base automaton having a Latin square transition matrix therefor is applied as a scrambler automaton, this characteristic is preferable because thereby pseudorandom numbers with uniform distribution can be obtained. The situation is the same in the case of hash proofs: the above-described property ensures that the hashes have uniform distribution, i.e., that it is impossible to even assign a greater probability to any given hash belonging to a given document.

Because a base automaton with a Latin square transition matrix has a permutation not only in every column but also in every row, this is particularly preferable for defending against statistical attacks.

Certain further embodiments of the invention relate to a descrambler apparatus adapted for descrambling a scrambled character block, in particular for cryptographic applications. The descrambler apparatus is not required for all applications, it is applied for deciphering the encryption, but it is not applied in case of generating pseudorandom numbers or cryptographic hash.

Figure 3:
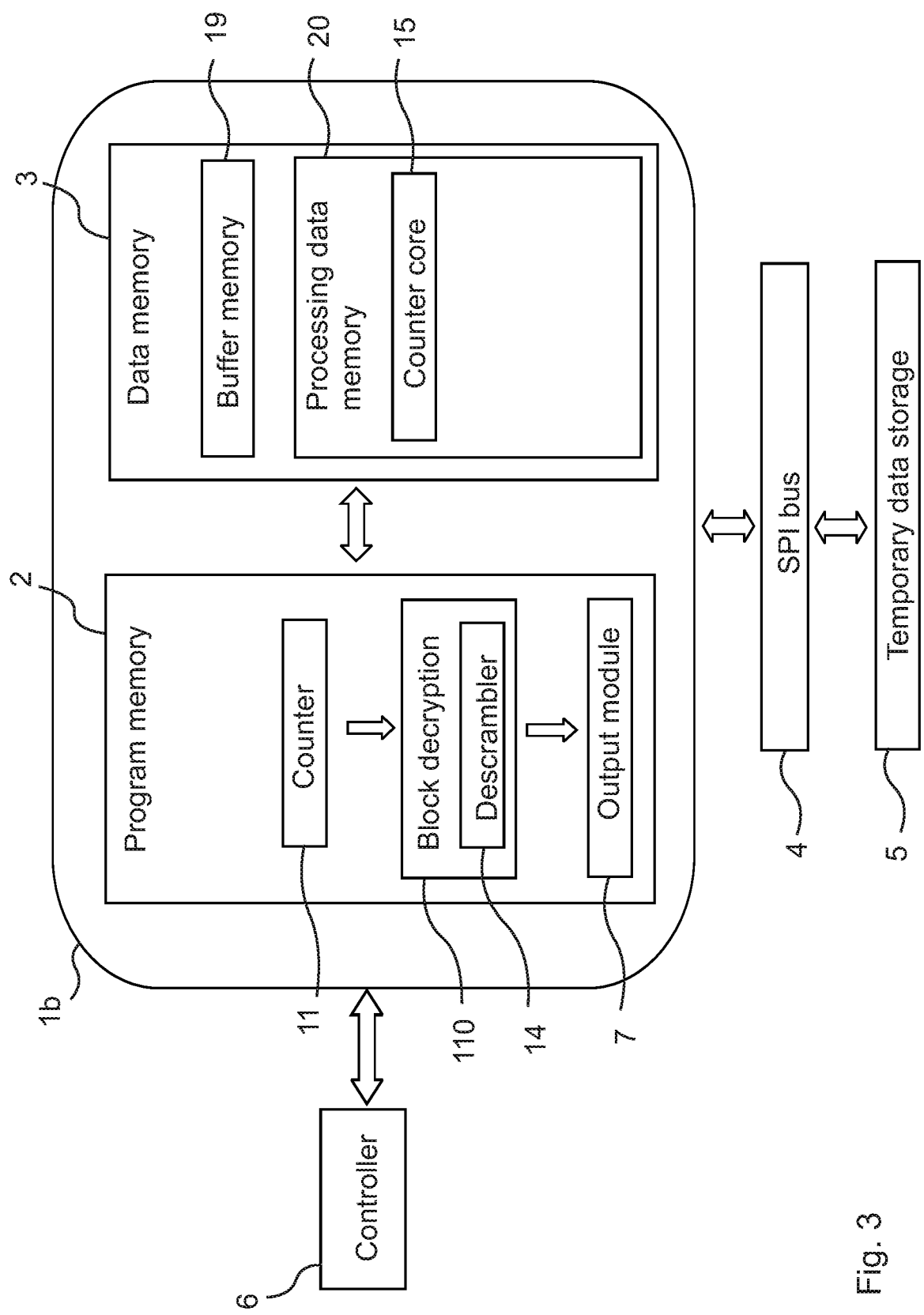
FIG. 3 is a block diagram illustrating an embodiment, adapted for decryption, of the descrambler apparatus (and thereby, the descrambling method) according to the invention.

The descrambler apparatus according to the invention comprises a descrambler module (descrambler unit) adapted for generating the first character block based on a scrambled second character block generated by a scrambler apparatus configured with a scrambler automaton defined as a permutation automaton (in an embodiment, a descrambler module 14 shown in FIG. 3; this generates from a second predetermined character block by descrambling, the first character block from which the scrambling operation was started). The descrambler module is configured with a descrambler automaton without output signal constituting (i.e. the descrambler automaton constituting) inverse automaton of the scrambler automaton (the term "inverse automaton" does not imply that its transition matrix is the inverse of the transition matrix of the automaton—this does not hold true even for the base automaton—but instead the inverse permutation of each row has to be calculated for generating the inverse; for a method of generating see further below in relation to Table 7, the appropriate inverse permutations of the particular rows can be determined in relation to the transition matrix), transitioning from the second character block into the first character block under the effect of the input signal character block.

It is therefore stipulated that descrambling is performed on a scrambled character block generated applying a scrambler automaton defined as a permutation automaton, because descrambling is possible if the scrambler automaton applied for scrambling was a permutation automaton; otherwise it is not possible to perform descrambling in an unambiguous manner. However, it is not a requirement that a scrambler automaton defined as a permutation automaton must be applied in the scrambler apparatus according to the invention, because descrambling is not needed for other applications (for example, for pseudorandom number generation and for generating a cryptographic hash value), so for such applications more generic scrambler automata can also be utilized.

The operation of the descrambler apparatus, and, accordingly, of the descrambling method, is determined by the scrambler apparatus and the scrambling method, while the descrambling method and apparatus utilizes the inverse automata thereof. The first character block (i.e., the character block on the basis of which the second character block was obtained by means of scrambling) is obtained from the generated second character block applying the inverse automaton. The descrambler automaton obtained as an inverse automaton "retrieves" the appropriate character components for the descrambling process in an appropriate manner, i.e., on the basis of the second character block and the input signal character block applied for scrambling, the first character block (from which the scrambling process started) can be determined applying the descrambler automaton. This process can be appropriately followed from start to end in examples 7 and 10; these examples also illustrate how the descrambling process is defined by the inverse automaton.

In relation to descrambling it is stipulated, on the one hand, that it is applied for a second character block generated by a scrambler automaton constituting a permutation automaton, because descrambling is possible only in such a case. In the case of scrambling in general, the condition that the scrambler automaton must be a permutation automaton can be waived, because if no deciphering is needed (i.e., for pseudorandom number generation and hash generation), then this condition is not a necessary one.

However, in scrambler apparatuses applied for both encryption and decryption, the scrambling and descrambler automata must both be permutation automata. If any one of them was not a permutation automaton, then it would have two different states from which it would transition to the same state under the effect of the same input signal. That would mean that there existed at least two different plaintext blocks for which the corresponding ciphertext blocks are identical. This is not a good thing because in such a case there existed a ciphertext with two different deciphered plaintexts.

In relation to descrambling, in an embodiment it can be stipulated, on the other hand, that the second character block is generated by means of a scrambler apparatus adapted for encrypting (the embodiment adapted for encrypting was defined above), the descrambler apparatus is adapted for decrypting, and comprises a counter module being identical to the counter module of the scrambler apparatus adapted for encrypting, and the input signal character block is generated by the counter module identically as by the scrambler apparatus adapted for encrypting, and the first character block is a decrypted character block of the second character block.

The definition set forth above includes a single first character block applied for scrambling, so the above definition describes the descrambling, as well as decryption of a single second character block in the course of descrambling and decryption, also because based on that, the apparatus and method can be extended, mutatis mutandis, to cover an arbitrary number of first character block-second character block pairs. This is also true for decryption: the individual first character block-second character block pairs must be treated separately, and must be descrambled (deciphered) in a manner defined in the scrambling and the encryption method.

The examples also illustrate the manner in which that is performed in the case of a longer text and with the successive application of different scrambling approaches. Reference is made at this point to examples 7 and 10; it can be maintained, as a summary of these examples, that for the decryption—as it was mentioned above—the character blocks must be treated separately (like with the encryption process).

In example 7, a character block has a length of two characters, and a permutation (inversion) approach and a chain approach mixing are performed on these character blocks with a length of two, thereby obtaining the encrypted block. In the case of deciphering, these approaches have to be reversed (they carry their appropriate input signals), so first the chain approach, and the permutation approach descrambling operation has to be applied (for an interpretation of these approaches, see further below). This, however, is consistent, because the encryption was performed in the opposite order, so for decryption the order has to be reversed.

In example 10, the block length of the character block is eight, and a more complex combination of the permutation and chain approaches is applied (multiple successive permutation scrambling operations, followed by a chain approach in accordance with example 3). Naturally, however, it holds true also in this example that all the operations are performed separately for the given character blocks (in this case it is easy because example 10 illustrates the encryption and decryption of a single character block), while in case of decryption the permutation approach and the chain approach must obviously be applied in a reverse order (and, within that, due to the multiple different permutation (inversion) sequence they also have to be applied in a reverse order).

Comparing examples 7 and 10, it can be established that in example 7 the steps to be performed during the decryption of multiple character blocks, i.e., that the individual character blocks must be treated separately, are also described.

Certain embodiments of the invention relate to methods analogous to the apparatuses according to the invention introduced above. Accordingly, the invention also relates to a scrambling method adapted for scrambling a character block, and a descrambling method adapted for descrambling a scrambled character block, in particular for cryptographic applications.

In course of the scrambling method according to the invention, based on a first character block consisting of first character components, a scrambled second character block consisting of second character components is generated by scrambling.

In the scrambling method according to the invention, scrambling is performed by means of a scrambler automaton without output signal, the scrambler automaton having a state set comprising the first character block and the second character block and an input signal set comprising an input signal character block consisting of input signal character components, and transitioning from the first character block into the second character block under the effect of the input signal character block, wherein the first character block, the second character block, and the input signal character block each have a basic block size each of the state set and the input signal set consist of blocks having a basic block size, obtained from all possible combinations of an identical character set of the first character components and the second character components, as well as the input signal character components, respectively, and each second character component of the second character block is determined based on a first character component of the first character block having the position corresponding to the position of the given second character component in the second character block, at least one first character component and/or a second character component from the first character components of the first character block, and, in case one or more second character components of the second character block is available, the one or more second character component, and a single input signal character component of the input signal character block.

In an embodiment of the scrambling method according to the invention, the scrambler automaton is defined as a permutation automaton.

In this embodiment, preferably, the scrambling method is adapted for encrypting, and a counter module is applied in the course of it, and the input signal character block is generated by the counter module, and the second character block is an encrypted character block of the first character block.

Furthermore, in the course of the descrambling method according to the invention the first character block is generated by descrambling based on a scrambled second character block generated by the scrambling method configured with a scrambler automaton defined as a permutation automaton, wherein descrambling is performed by means of a descrambler automaton without output signal constituting inverse automaton of the scrambler automaton, transitioning from the second character block into the first character block under the effect of the input signal character block.

Also, in an embodiment of the descrambling method the second character block is generated applying a scrambling method adapted for encrypting, the descrambling method is adapted for decrypting, and a counter module being identical to the counter module applied in the scrambling method adapted for encrypting, and the input signal character block is generated by the counter module identically as by the scrambling method adapted for encrypting, and the first character block is the decrypted character block of the second character block.

In the following, some definitions related to the invention are set forth.

The term "counter" is used to refer to a method and apparatus that is presumed to operate according to a discrete time scale such that at the start of its operation it is in a fixed state $s_0$, and in every subsequent time instant t its state is an element f(s) of the nonempty, finite state set S, where s denotes the state of the counter at the time instant immediately preceding the time instant t, while f: S→S is a function adapted to map the nonempty, finite set S to itself in a bijective manner. The triplet $S=(S, s_0, f)$ will hereinafter also be referred to as the base structure of the counter, set S will be called the state set of the counter, state $s_0 \in S$ the core of the counter, and function f: S→S the state transition function of the counter.

It is noted that, if n is the number of the elements of S, then the states of the counter at the first, second, . . . , (n−1)-th time instant are, respectively, $s_1=f(s_0)$, $s_2=f(s_1)$, . . . , $s_{n-1}=f(s_{n-2})$, while $s_n=s_0$. Based on this it is clear that for an arbitrary non-negative number pair $s_{in+j}=s_j$, that is, the state transitions are periodic in n.

In the following, it is assumed that the state transition functions f applied in this application are very simple, preferably $S=\{0, 1, \ldots 2^{128}-1\}$, and for each $k \in S$ $f(k)=k+m$, if $k+m<2^{128}-1$, and $f(k+m)=k+m-(2^{128}-1)$, if $k+m \geq 2^{128}-1$, where $m \in S$ is a fixed odd number (which can even be 1).

A method and apparatus (unit) B that, for a fixed natural number n and receiving a character string w having a length of n outputs a character string g(w) (where g: $\{0,1\}^n \to \{0,1\}^n$ is a function that maps the set of all possible character strings having a length of n to itself in a bijective manner) can be called a scrambler. The function g will hereinafter be referred to as a scrambler (bitmixer) function. An "avalanche effect" is identified if a small change of the input results in a large-scale change in the output of the scrambler. A strict avalanche effect (strict avalanche criterion, SAC) is identified if, upon changing one bit of the input, the value of each output bit changes with a probability of 0.5.

A matrix of which each row and each column is a permutation of the elements of H is a Latin square over the set H.

An automaton without output signal is an algebraic structure which is composed by two non-empty sets, namely, the state set and the input signal set, and a function named transition function that maps the Cartesian product of the state set and the input signal set onto the state set. Therefore, an automaton without outputs is usually described in the form $A=(A,X,\delta)$, where A is the state set, X is the input signal set, and $\delta: A \times X \to A$ is the transition function (which assigns a state to each pair having a state as its first element and an input signal as its second element).

The transition function may thus be characterised by that this type of function assigns a state to all such pairs of which the first element is a state and the other element is an input signal. An automaton without output signal is an initial automaton without output signal if there is defined a special element of the state set that is called the initial state. In the case of an initial automaton without output signal (a few times referred to below simply as 'automaton'), the definition $A=(A, a_0, X, \delta)$ is typically used, where $a_0$ denotes the initial state.

In the following it is assumed that the investigated automaton has a finite state set and a finite input signal set. It is also assumed that both the state set and the input signal set are ordered sets, and accordingly, reference shall be made below to the zeroth, first, second, . . . , last elements thereof (for technical reasons the elements are numbered starting from zero rather than one).

With finite state and input signal sets the transition function—which is an abstract in its general form—is typically written in form of a matrix that is called the transition matrix. The transition matrix has as many rows as the number of the input signals of the automaton, and as many columns as the number of the automaton's states. The element k in the i-th row (numbering started with zero) and j-th column (numbering started with zero) of the transition matrix will be the index number of the state which is assigned to the pair consisting of the j-th state and the i-th input signal by the transition function. Of this element k of the i-th row and j-th column of the transition matrix it is said that the i-th input signal takes the automaton from the j-th state to the k-th state (moreover, another typical phrasing for this is saying that under the effect of the i-th input signal the automaton transitions from the j-th state into the k-th state.)

Thereby, correspondence can be made between the rows of the transition matrix and the input signals of the automaton, between the columns and the states thereof, and between the transition matrix itself and the transition function of the automaton. Input signals are therefore denoted by the row numbers of the matrix, while states are denoted by the column numbers thereof. In the following—where it cannot be misunderstood—the input signals and the states are sometimes identified by their serial number.

For example, for the automaton $A=(\{a_0,a_1,a_2\}, \{x_0,x_1\}, \delta)$, with the function values $\delta(a_0, x_0)=a_2$, $\delta(a_0, x_1)=a_1$, $\delta(a_1, x_0)=a_0$, $\delta(a_1, x_1)=a_0$, $\delta(a_2, x_0)=a_1$, $\delta(a_2, x_1)=a_1$ the transition matrix is the following:

TABLE 1

| $\delta$ | $a_0$ | $a_1$ | $a_2$ |
|---|---|---|---|
| $x_0$ | $a_2$ | $a_0$ | $a_1$ |
| $x_1$ | $a_1$ | $a_0$ | $a_1$ |

In this example, the 0-th row of the transition matrix is labelled with $x_0$, the first row with $x_1$, the 0-th column is labelled with $a_0$, the first column with $a_1$, and the second column with $a_2$.

If each row of the transition matrix is a permutation of the state set, then the automaton is considered a permutation automaton. For an automaton $A=(A,X,\delta)$ this condition is fulfilled exactly for any a, $b \in A$, $a \neq b$, in case $x \in X$ $\delta(a,x) \neq \delta(b,x)$.

An important type of permutation automata are the automata with a transition matrix constituting a Latin square. The transition matrix of an automaton is said to constitute a Latin square if each row and column of its transition matrix forms a permutation of the state set.

According to the definition of a Latin square, the transition matrix of an automaton constitutes a Latin square exactly in case the permutations of the same character sequence are included in each row and each column thereof.

The transition matrix of such an automaton is included in the following table:

TABLE 2

| $\delta$ | $a_0$ | $a_1$ | $a_2$ |
|---|---|---|---|
| $x_0$ | $a_2$ | $a_0$ | $a_1$ |
| $x_1$ | $a_1$ | $a_2$ | $a_0$ |
| $x_2$ | $a_0$ | $a_1$ | $a_2$ |

In the context of this application, the phrasing "an automaton is configured as a permutation automaton" is taken to mean that the rows of its transition matrix are the permutations of the state set.

An inverse permutation automaton of a permutation automaton is meant for an automaton obtained such that the rows of the matrix of the inverse permutation automaton are generated by taking the inverse permutations of the permutations constituted by the rows of the original permutation automaton. Thus, the value of the matrix element at the j-th column and the i-th row of the original matrix is k exactly in case the k-th element of the i-th row of the matrix of the inverse permutation automaton is j (see the illustration of this in relation to Table 7 below).

A finite-length sequence consisting of the elements of the state set (which may contain repetitions) is called a state sequence, while a finite-length sequence consisting of the elements of the input signal set (also possibly containing repetitions) is called an input signal sequence (state sequences and input signal sequences having unitary length, i.e., consisting of a single element are also allowed). Signal sequences consisting of the (binary) elements 0 and 1 are called binary sequences or binary strings. In the following (as it is customary) the commas separating the elements are omitted for both state sequences and input signal sequences. If a state sequence $a_1 a_2 \ldots a_s$ has at least three elements, then the states $a_2, a_3, \ldots,$ and $a_{s-1}$ (also) called the interim states of the state sequence. One- and two-element state sequences therefore have no interim state.

The transition function of an automaton may be extended in such a way that to each state and input signal sequence a state sequence is assigned by the extended transition function as follows.

Let a be a state, and let $x_1 x_2 \ldots x_s$ be an input signal sequence (where $x_1, x_2, \ldots,$ and $x_s$ are input signals). Let $a_1$ denote the state into which the automaton is taken from state a by the input signal $x_1$, $a_2$ the state into which the automaton is taken from the state $a_1$ by the input signal $x_2$, $a_3$ the state into which the automaton is taken from the state $a_2$ by the input signal $x_3, \ldots,$ and as the state into which the automaton is taken from the state $a_{s-1}$ by the input signal $x_s$. In this case, according to the definition, the extended transition function assigns to the pair consisting of the state a and the input signal sequence $x_1 x_2 \ldots x_s$ the state sequence $a_1 a_2 \ldots a_s$. It can then be said that the automaton is transferred from the state a to the state as through the state sequence $a_1 a_2 \ldots a_{s-1}$ by the input signal sequence $x_1 x_2 \ldots x_s$, and also that the automaton transitions from the state a to the state as through the state sequence $a_1 a_2 \ldots a_{s-1}$ under the effect of the input signal sequence $x_1 x_2 \ldots x_s$, If it is not necessary, the qualifier "through the state sequence $a_1 a_2 \ldots a_{s-1}$" is omitted, and the statement is phrased as "the automaton is transferred from the state a into the state as by the input signal sequence $x_1 x_2 \ldots x_s$", or that "the automaton transitions from the state a into the state as under the effect of the input signal sequence $x_1 x_2 \ldots x_s$".

In the most general sense, the term "character set" refers to an ordered, nonempty, finite set (by way of example, in the case of binary data, the numbers $\{0,1\}$, in case of a text, the letters of the alphabet, etc.). The data to be encrypted or to be decrypted may generally be called also a "text"; in the following also this term shall be used frequently. Character sequences formed utilizing the character set of the non-encrypted text (plaintext) or the encrypted text (ciphertext) shall also be termed "character strings"

Let the mirror image of a character string consisting of the character sequence $x_1, x_2, \ldots, x_s$ be the character string $(x_1 x_2 \ldots x_s)^T = x_s x_{s-1} \ldots x_1$. The mirror image of a character sequence consisting of a single character is therefore itself.

For a nonempty finite set H let $H^+$ denote the finite-dimension vectors formed of the elements of the set H. For an arbitrary natural number n, an arbitrary mapping $\varphi: \{1, \ldots, n\} \to \{1, \ldots, n\}^+$, and for an arbitrary $j \in \{1, \ldots, n\}$ let $\varphi(i)[j]$ denote the j-th component of the vector $\varphi(i)$, and $|\varphi(i)|$ the dimension of the vector $\varphi(i)$. For example, let $\varphi: \{1,2,3\} \to \{1,2,3\}^+$ be specified such that $\varphi(1)=(1), \varphi(2)=(1,3,1), \varphi(3)=(3,2,1,2)$.

For example, let n=3, and let Then $\varphi(1)[1]=1, \varphi(2)[1]=1, \varphi(2)[2]=3, \varphi(2)[3]=1, \varphi(3)[1]=3, \varphi(3)[2]=2, \varphi(3)[3]=1, \varphi(3)[4]=2,$ and $|\varphi(1)|=1, |\varphi(2)|=3, |\varphi(3)|=4$. These are therefore exemplary values illustrative of the definition above.

Let $A=(A,X,\delta)$ be an automaton without output signal that has an identical state set and input signal set, i.e., A=X.

Let n be a natural number, and, with a mapping $\varphi: \{1, \ldots, n\} \to \{1, \ldots, n\}^+$ let $B=(A^n, X^n, \delta_B)$ be an automaton for which, for each $a_1, \ldots, a_n \in A$, $x_1, \ldots, x_n \in X$ $$\delta_B((a_1, \ldots, a_n), (x_1, \ldots, x_n)) = (a'_1, a'_2, \ldots, a'_n),$$

where $$a'_1 = \delta(a_{\varphi(1)[1]}, \delta(a_{\varphi(1)[2]}, \ldots, \delta(a_{\varphi(1)[|\varphi(1)|]}, x_i) \ldots )),$$

and for each following $i \in \{2, \ldots, n\}$
$a'_i = \delta(a''_{\varphi(i,)[1]}, \delta(a''_{\varphi(i)[2]}, \ldots, \delta(a''_{\varphi(i)[|\varphi(i)|]}, x_i) \ldots )),$ for which, for each $j \in \{1, \ldots, n\}$ $a''_{\varphi(i,)[j]} = a_{\varphi(i,)[j]}$ if $\varphi(i,)[j] \geq i$, and $a''_{\varphi(i,)[j]} = a'_{\varphi(i,)[j]},$ if $\varphi(i,)[j] < i$.

The automata B defined in such a manner are called single-component scrambler (or simply, mixer) automata determined by the automaton A.

For an exemplary mapping $\varphi: \{0,1,2\} \to \{0,1,2\}^+$, in case of the values $\varphi(0)=(0), \varphi(1)=(0,2,0), \varphi(2)=(2, 1, 0, 1), \varphi(0)[1]=0, \varphi(1)[1]=0, \varphi(1)[2]=2, \varphi(1)[3]=0, \varphi(2)[1]=2, \varphi(2)[2]=1, \varphi(2)[3]=0, \varphi(2)[4]=1$. Thus, an example is provided also for this construction.

If, for example, the transition table of the automaton A is as follows

TABLE 3

| δ | $a_0$ | $a_1$ | $a_2$ |
|---|---|---|---|
| $a_0$ | $a_2$ | $a_0$ | $a_1$ |
| $a_1$ | $a_1$ | $a_2$ | $a_0$ |
| $a_2$ | $a_0$ | $a_1$ | $a_2$ | and we would like to determine the state transitions $\delta_B((a_0,a_1,a_2), (a_0,a_1,a_2))$, and $\delta_B((a_1,a_1,a_2), (a_2,a_0,a_2))$ of the automaton B, then we get $\delta_B((a_0,a_1,a_2), (a_0,a_1,a_2))=(a_2,a_0,a_2),$ and $\delta_B((a_1,a_1,a_2), (a_2,a_0,a_2))=(a_0,a_0,a_0),$ because—introducing the notation $(a'_1, a'_2, a'_3)=\delta_B((a_1,a_1,a_2), (a_2,a_0,a_2))$—according to the definition of the transition function of a single-component scrambler automaton, and according to the transition table (Table 3) of the exemplary automaton A $a'_0 = \delta(a''_{\varphi(0)[1]},a_0) = \delta(a''_0,a_0) = \delta(a_0,a_0) = a_2, a'_1 = \delta(a''_{\varphi(1)[1]},\delta(a''_{\varphi(1)[2]},\delta(a''_{\varphi(1)[3]},a_1))) = \delta(a''_0,\delta(a''_2,\delta(a''_0,a_1))) = \delta(a'_0,\delta(a_2,\delta(a'_0,a_1))) = \delta(a_2,\delta(a_2,\delta(a_2,a_1))) = \delta(a_2,\delta(a_2,a_0)) = \delta(a_2,a_1) = a_0,$ $a'_2 = \delta(a''_{\varphi(2)[1]},\delta(a''_{\varphi(2)[2]},\delta(a''_{\varphi(2)[3]},\delta(a''_{\varphi(2)[4]},a_2)))) = \delta(a''_2,\delta(a''_1,\delta(a''_0,\delta(a''_1,a_2)))) = \delta(a_2,\delta(a'_1,\delta(a'_0,\delta(a'_1,a_2)))) = \delta(a_2,\delta(a_0,\delta(a_2,\delta(a_0,a_2)))) = \delta(a_2,\delta(a_0,\delta(a_2,\delta(a_0,\delta(a_1,a_2))))) = \delta(a_2,\delta(a_0,\delta(a_2,a_1))) = \delta(a_2,\delta(a_0,a_1)) = \delta(a_2,a_1) = a_0,$ and, for the other exemplary transition $\delta_B$ (($a_1,a_1,a_2$), ($a_2,a_0,a_2$)) denoted as ($a'_1,a'_2,a'_3$)

$$a'_0=\delta(a''_{\varphi(0)[1]},a_2)=\delta(a''_0,a_2)=\delta(a_0,a_2)=a_0,$$

$$a'_1=\delta(a''_{\varphi(1)[1]},\delta(a''_{\varphi(1)[2]},\delta(a''_{\varphi(1)[3]},a_0)=\delta(a''_0,\delta(a''_2,\delta(a''_0,a_0)=\delta(a_0,\delta(a_2,\delta(a'_0,a_0))))=\delta(a_2,\delta(a_2,\delta(a_0,a_0)))=\delta(a_0,\delta(a_2,a_2))=\delta(a_0,a_2)=a_0,$$

$$a'_2=\delta(a''_{\varphi(2)[1]},\delta(a''_{\varphi(2)[2]},\delta(a''_{\varphi(2)[3]},\delta(a''_{\varphi(2)[4]},a_2)))=\delta(a''_2,\delta(a''_1,\delta(a''_0,\delta(a''_1,a_2)))=\delta(a_2,\delta(a'_1,\delta(a'_0,\delta(a'_1,a_2))))=\delta(a_2,\delta(a_0,\delta(a_0,\delta(a_0,a_2))))=\delta(a_2,\delta(a_0,\delta(a_0,a_0)))=\delta(a_2,\delta(a_1,a_1))=\delta(a_2,a_1)=a_0,$$

Now, let B'=(A'', X'', $\delta'_B$) and B''=(A'', X'', $\delta''_B$) be single-component scrambler automata determined by the automaton A. Let us now define the automaton B=(A'', $X^{2n}$, $\delta_B$) such that for any $a_1, \ldots, a_n \in A$, $x_1, \ldots, x_{2n} \in X$ $$\delta_B((a_1,\ldots,a_n),(x_1,\ldots,x_{2n}))=\delta''_B((a'_1,\ldots,a'_n),(x_{n+1},\ldots,x_{2n})), \text{ where } (a'_1,\ldots,a'_n)=\delta'_B((a_1,\ldots,a_n),(x_1,\ldots,x_n)).$$

The automaton B defined this way is called a dual-component scrambler automaton determined by the automaton A, while the automaton A is called the base automaton of the dual-component scrambler automaton B. In a similar manner, for any m>2 let us also define an m-component scrambler automaton determined by the base automaton A. An automaton B is called a scrambler automaton if it can be obtained as a single- or multiple-component scrambler automaton of an automaton A. In this case it is also said that A is the base automaton of the scrambler automaton B (see further above the description of base automata and the transition sequence). In the formulae introduced in the examples, the symbol $\delta$, with two numeric arguments, always denotes a transition controlled by the base automaton.

In what follows below, preferred approaches are set forth for the types of automata that are preferably applicable in the framework according to the invention, i.e., in the scrambler (examples 1-3) and descrambler (examples 4-6) apparatus. The embodiments introduced below are called "examples", but it has to be noted that examples 1-6 are at a much more generic level, while examples 7-10 are calculation examples, wherein all the calculations associated with the given embodiments of the invention are carried out.

Furthermore, examples 1 and 2 below are emphasized that illustrate two different approaches (embodiments); in example 3 these approaches are combined (illustrating the possibilities for combination). The approach applied in example 1 can also be termed a "chain approach", because, according to this approach, the transitions between the components are generated applying a transition chain. In the approach according to example 2, permutation sequence are applied, and thus this approach can be termed the "permutation (inversion) approach".

It is noted in advance, however, that in the examples 1-6—and thus in examples 1 and 2 illustrating these approaches—such embodiments are described that are well suited for practical application, but are relatively specialized. Therefore, before discussing examples 1 and 2, embodiments applying the chain and the permutation approach are gradually introduced, of which embodiments the most specialized variants are constituted by the examples in question.

As it was put forward above in relation to the scrambler apparatus according to the invention, the basic requirement for the elementary transitions applied in the automata (in general, for generating each second character component and obviously for determining the character components in the opposite direction) is that for the transitions there are applied

- the initial state component (first character component) that has the same index as the final state (second character component) that is being searched for, i.e., for calculating the "with comma" (as it is typically denoted) character component the "without comma" (initial) character component with the same index (i.e., "itself without comma", or simply—logically—"itself", referred to hereinabove as "the first character component having the position corresponding to the position of the given second character component in the second character block"),
- at least one further character component of a first character block, or the already determined elements of the second character block, in relation to which there are no particular further constraints at the level of basic requirements (there are further constrains in certain embodiments, see below), so, there can even be repetitions, i.e., a given first character component can even be utilized for more than one second character components, that is, this at least one further character component is selected arbitrarily, and
- a single input signal character component of the input signal character block, i.e., strictly only one.

Compared to this, a next level of specialization may be the most generic chain approach embodiment, or an permutation approach that is described below (or even other combinations). In certain embodiments, second character components of the second character block are derived in a specialized manner within the above-described generic approach, i.e., not according to the generic approach above but (instead) in a manner defined in relation to the embodiments in question. However, it is important to stipulate that only specialization is made within the basic requirements, i.e. what are required that stay in place (i.e., in line with the hierarchy, the "itself without comma" and the strictly single input signal character component are kept in all embodiments); that is, only that is modified which is considered "open", i.e., the at least one further character component is subject to additional specialization.

In the most generic chain approach embodiment, i.e., in an embodiment of the scrambler apparatus it is defined that a position corresponding to a given second character component in the second character block is an investigated position of the given second character component, and for determining each second character component of the second character block

- a first character component of the first character block having the position corresponding to the investigated position of the given second character component, (according to the above, in the course of the transition this component and the single input signal character component referred to below are unchanged),
- furthermore, at least two character components (at least two of the character components; at least two first character component and/or second character component) from
  - the first character components of the first character block, and
  - in case one or more second character component of the second character block is available, the one or more second character component, and
- a single input signal character component of the input signal character block are utilized.

Regarding the "open" inputs in this embodiment, the options are also illustrated by the fragmentation of the preceding paragraph, i.e., the at least two character components can be selected from the first character block (even once again itself) and from the already determined character components of the second character block in any manner, that is, character components can even be selected from both character blocks, or only from the first or from the second character block.

By introduction with the phrasing "is/are utilized" it is intended to mean (also in the case of other similar definitions) that instead of the definition given above, the definitions given here are applied for determining each of the second character components of the second character block, i.e., they are determined according to this further manner (specialized compared to the generic case of the invention).

In a somewhat more specific embodiment of the scrambler apparatus than the previous (that is, at a next level of the chain approach) for determining each second character component of the second character block a first character component of the first character block having the position corresponding to the investigated position of the given second character component, (i.e., this component and the single input signal character component remain also in this case), furthermore, at least two character components from the first character components of the first character block having a position different from the position corresponding to the investigated position (i.e., such a further first character component that has an index different from the character component currently being transformed, which is considered above as "itself without comma") and in case one or more second character components of the second character block is available, the one or more second character component, and a single input signal character component of the input signal character block are utilized.

In this embodiment, therefore the selection of the at least two further "open" character components is constrained in that if another character component is selected from the first character block, then no repetitions are accepted, i.e., the "itself without comma" cannot be used again for the transition, while there is no constraint placed on making a selection from among the already determined character components of the second character block.

In a still more specific embodiment of the scrambler apparatus, i.e., in an embodiment that is somewhat more specialized than the previous one, determining of the second character components is performed sequentially, based on the respective positions corresponding thereto in the second character block (that is, logically, in the increasing order of the indices of the character components), and for determining each second character component of the second character block a first character component of the first character block having the position corresponding to the investigated position of the given second character component, each first character component of the first character block having a position with a serial number larger than that of the position corresponding to the investigated position in case the serial number of the investigated position is smaller than the basic block size, (that is, every such component of the first character block that has a serial number greater than the chain position will be utilized; this is practical because transformation is carried out in the order of the components; it is also stipulated that the serial number of the chain position is smaller than the basic block size, because when the last character component is being calculated there is no such "without comma" character component (except for the "itself without comma" that will be utilized anyway) that has not yet been utilized, and in this embodiment no repetition is allowed; but at the same time every character component described above will be utilized), and each (one or more) second character component of the second character block having a position with a serial number smaller than that of the position corresponding to the investigated position in case the investigated position is different from the first position of the character block, (every "with comma" component with an index smaller than that is utilized as they have already been determined because the process is performed in the increasing order of indices; this is why it must also be specified that such components can be utilized if the current position (chain position) is not the first), and a single input signal character component of the input signal character block are utilized.

In the chain approach embodiments—and also in the generic concept of the invention, because this choice can also be applied therein—furthermore, preferably for determining each second character component of the second character block the input signal character component of the input signal character block having the position corresponding to the investigated position is utilized (that is, the single input signal character component being applied is the one that corresponds to the chain position). Combining this option with the previous embodiment, example 1 included below is obtained; accordingly, example 1 illustrates such an embodiment.

Let $A=(A,X,\delta)$ be an automaton without output signal that has an identical state set and input signal set, i.e., $A=X$.

Example 1

Let us define the automaton $B=(A^n, X^n, \delta_B)$ in such a way that for any $a_1, \ldots, a_n \in A$, $x_1, \ldots, x_n \in X$ $$\delta_B(a_1, \ldots, a_n, x_1, \ldots, x_n) = (a'_1, a'_2, \ldots, a'_n), \text{ where}$$

$$a'_1 = \delta(a_1, \delta(a_2, \ldots, \delta(a_n, x_1) \ldots)),$$

$$a'_2 = \delta(a_2, \delta(a'_1, \delta(a_3, \ldots, \delta(a_n, x_2) \ldots))),$$

$$a'_3 = \delta(a_3, \delta(a'_1, \delta(a'_2, \delta(a_4, \ldots, \delta(a_n, x_3) \ldots)))),$$

$$\ldots,$$

$$a'_n = \delta(a_n, \delta(a'_1, \delta(a'_2, \ldots, \delta(a'_{n-1}, x_n) \ldots))).$$

The exemplary automaton B defined in such a manner is a single-component scrambler automaton determined by the automaton A, where the automaton A is the base automaton of the automaton B.

Thus, in the following, the permutation approach is illustrated by introducing hierarchic, gradually more and more specific embodiments; with example 2 itself constituting a certain level of specificity.

The basic requirement set forth above is also referenced in relation to these embodiments. Of course, the fixed features set forth in the basic requirement remain fixed also in the below-described permutation approach embodiments, while further special specification items are also formulated in the present approach in relation to the "open" character components.

Accordingly, in an embodiment corresponding to the permutation approach, in the scrambler apparatus based on the positions corresponding to each first character component and second character component in the first character block and the second character block, respectively, one or more transposition constituting a transposition sequence and each having a first transposition component and a second transposition component are defined from the first character components and the second character components according to an identical number of the first character components and the second character components in the first character block and in the second character block, respectively, and

- a position corresponding to a given second character component in the second character block is an investigated position of the given second character component, and for determining each second character component of the second character block a first character component of the first character block having the position corresponding to the investigated position of the given second character component (this will stay together with the input signal character component),
- a second transposition component of the first character block corresponding, as a transposition thereof in the given transposition sequence from the one or more transposition sequence, to the first character component, being a first transposition component, having the position corresponding to the investigated position in the given transposition sequence of the one or more transposition sequence as a transposition thereof (of the first transposition component), in case the given second character component of the second character block is not available, or, (a second transposition component) of the second character block, in case the given character component of the second character block is available, and
- a single input signal character component of the input signal character block are utilized, and in case a plurality of transposition sequences is defined, determining of the second character components of the second character block is performed with each transposition sequence one after the other, such that in the case of applying a subsequent transposition sequence, a second character block determined by a given transposition sequence is applied as a first character block.

Therefore, in addition to the fixed selections, in this embodiment the "open choice" character component is described in the second bullet point above. In this feature it is typically specified that a transposition (permutation) pair is chosen for the already selected first character component ("itself without comma"). Further notions are clarified in relation to this feature.

According to the above, one or more transposition sequence is formed of the transpositions (a transposition is a pair in itself, but it can still be called a transposition pair). Forming such a sequence is illustrated in detail in example 2; it is basically about specifying transpositions in a block, i.e., the index of the component that is the transposition of a component with a given index has to be found (transpositions are essentially formed based on the indices, that is, from the indices). For generating the transpositions, it is preferable if the basic block size is an even number (but it is not necessary: if the number is odd, then one of the indices corresponds to itself as a transposition), still more preferably it is a power of two.

As it is illustrated by example 2 below, the index of the transposition corresponding to the given first character component can be determined from the transposition sequence. This is taken from the first character block if the second character component with the given index has not yet been determined, while in case it has already been determined, then it is taken from the second character block.

This is the logical way, because in the case of the first transpositions the given second character component will not have been determined (as it is currently being determined), and then—when the transpositions are "turning" (because another index is brought in by the transposition, sooner or later such an index is reached for which the second character component has already been determined)—a component of the second character block is utilized (this approach can be understood from example 2, and is based solely on availability considerations).

According to the above, therefore, several possible transposition sequences can be defined. In addition to illustrating the inclusion of several transposition sequences, examples 2 and 10 also illustrate that defining several transposition sequences does not mean that all such sequences are included (with an increasing n value, it could become unfeasible to take into account all of them), but only the inclusion of multiple appropriately selected transposition sequence.

Preferably, in the below-described embodiment based on the permutation approach for determining each second character component of the second character block the input signal character component of the input signal character block having the position corresponding to the position that corresponding to the second permutation component in the first character block or in the second character block is utilized (that is, differently from the chain approach, in this option the input signal character component having the same index—i.e., the same place in the block—as the index of the second permutation component is utilized for determining said given second character component).

Let us now turn to example 2.

Example 2

Some concepts are introduced for example 2. Let n be a fixed positive integer power of 2, and let us define the following permutations that are specified as a product of transpositions (for example, for a permutation P the transposition (9,13)—which thus denotes such a pair—means that P(9)=13 and P(13)=9).

For specifying these permutations, let us execute the following algorithm for the vector $(1, \ldots, n)$:

If n=2, then let $P_1=(1, 2)$, and we are ready.

Else, let us consider the vectors $(1, \ldots, n/2)$ and $(n/2+1, \ldots, n)$, and let us generate the permutation $P_1$ such that $P_1$ is a product of such transpositions where for each $k \in \{1, \ldots, n/2\}$ the first component of the k-th factor of this transposition-product is the k-th component of the vector $(1, \ldots, n/2)$, while the second component thereof is the k-th component of the vector $(n/2+1, \ldots, n)$. Taken to an expression:

$$P_1=(1,n/2+1)(2,n/2+2) \ldots (n/2,n).$$

If n=4, then let $P_2=(1, 2)(3, 4)$, and we are ready.

Else, let us carry out the above process separately for the vector $(1, \ldots, n/2)$ and for the vector $(n/2+1, \ldots, n)$. The product of the two permutations $(1, n/4+1)(2, n/4+2) \ldots (n/4, 2n/4)$ and $(2n/4+1, 3n/4+1)(2n/4+2, 3n/4+2) \ldots (3n/4, 4n/4)$ thus obtained will be the permutation $P_2=(1,n/4+1)(2,n/4+2) \ldots (n/4,2n/4)(2n/4+1,3n/4+1)(2n/4+2,3n/4+2) \ldots (3n/4,4n/4)$ If n=8, then let $P_3$=(1, 2) (3, 4) (5,6) (7,8) and we are ready.

Else, like with the above, let us carry out the process separately for the vectors (1, ..., n/4), (n/4+1, ..., 2n/4), (2n/4+1, ..., 3n/4), (3n/4+1, ..., 4n/4). The product of the four permutations (1, n/8+1) (2, n/8+2) ... (n/8, 2n/8), (2n/8+1,3n/8+1)(2n/8+2,3n/8+2) (3n/8, 4n/8), (4n/8+1,5n/8+1)(4n/8+2,5n/8+2) ... (5n/8, 6n/8), (6n/8+1,7n/8+1)(6n/8+2,7n/8+2) ... (7n/8, 8n/8)

thereby obtained will be the permutation $P_3=(1,n/8+1)(2,n/8+2) \ldots (n/8,2n/8)(2n/8+1,3n/8+1)$
$(2n/8+2,3n/8+2) \ldots (3n/8,4n/8)(4n/8+1,5n/8+1)$
$(4n/8+2,5n/8+2) \ldots (5n/8,6n/8)(6n/8+1,7n/8+1)$
$(6n/8+2,7n/8+2) \ldots (7n/8,8n/8)$ If n=16, then let $P_4=(1,2)(3,4) \ldots (15,16)$.

Else, like with the above, let us carry out the process separately for the vectors (1, ..., n/8), (n/8+1, ..., 2n/8), (2n/8+1, ..., 3n/8), (3n/8+1, ... 4n/8), (4n/8+1, ... 5n/8), (5n/8+1, ... 6n/8), (6n/8+1, ... 7n/8), (7n/8+1, ... 8n/8) The product of the eight permutations (1, n/16+1) (2, n/16+2) ... (n/16, 2n/16), (2n/16+1,3n/16+1)(2n/16+2,3n/16+2) ... (3n/16, 4n/16), (4n/16+1, 5n/16+1)(4n/16+2,5n/16+2) ... (5n/16, 6n/16), (6n/16+1, 7n/16+1)(6n/16+2, 7n/16+2) ... (7n/16, 8n/16), (8n/16+1, 9n/16+1) (8n/16+2, 9n/16+2) ... (9n/16, 10n/16), (10n/16+1,11n/16+1) (10n/16+2,11n/16+2) ... (11n/16, 12n/16), (12n/16+1, 13n/16+1)(12n/16+2,13n/16+2) ... (13n/16, 14n/16), (14n/16+1, 15n/16+1)(14n/16+2,15n/16+2) ... (15n/16, 16n/16)

thus obtained will be the permutation $P_4=(1,n/16+1)(2,n/16+2) \ldots (n/16,2n/16)(2n/16+1,$
$3n/16+1)(2n/16+2,3n/16+2) \ldots (3n/16,4n/16)$
$(4n/16+1,5n/16+1)(4n/16+2,5n/16+2) \ldots (5n/16,6n/16)(6n/16+1,7n/16+1)(6n/16+2,7n/16+2) \ldots (7n/16,8n/16)(8n/16+1,9n/16+1)(8n/16+2,9n/16+2) \ldots (9n/16,10n/16)(10n/16+1,11n/16+1)(10n/16+2,11n/16+2) \ldots (11n/16,12n/16)(12n/16+1,13n/16+1)(12n/16+2,13n/16+2) \ldots (13n/16,14n/16)(14n/16+1,15n/16+1)(14n/16+2,15n/16+2) \ldots (15n/16,16n/16)$ If n=32, the let $P_5$=(1, 2) (3, 4) ... (31, 32) and we are ready.

Else, by continuing the process in an analogous manner, for each n>32 we get $P_1=(1,n/2+1)(2,n/2-12) \ldots (n/2,n)$, $P_2=(1,n/4+1)(2,n/4+2) \ldots (n/4,2n/4)(2n/4+1,3n/4+1)(2n/4+2,3n/4+2) \ldots (3n/4,4n/4)$, $P_3=(1,n/8+1)(2,n/8+2) \ldots (n/8,2n/8)(2n/8+1,3n/8+1)(2n/8+2,3n/8+2) \ldots (3n/8,4n/8)(4n/8+1,5n/8+1)(4n/8+2,5n/8+2) \ldots (5n/8,6n/8)(6n/8+1,7n/8+1)(6n/8+2,7n/8+2) \ldots (7n/8,8n/8)$, $P_4=(1,n/16+1)(2,n/16+2) \ldots (n/16,2n/16)(2n/16+1,3n/16+1)(2n/16+2,3n/16+2) \ldots (3n/16,4n/16)(4n/16+1,5n/16+1)(4n/16+2,5n/16+2) \ldots (5n/16,6n/16)(6n/16+1,7n/16+1)(6n/16+2,7n/16+2) \ldots (7n/16,8n/16)(8n/16+1,9n/16+1)(8n/16+2,9n/16+2) \ldots (9n/16,10n/16)(10n/16+1,11n/16+1)(10n/16+2,11n/16+2) \ldots (11n/16,12n/16)(12n/16+1,13n/16+1)(12n/16+2,13n/16+2) \ldots (13n/16,14n/16)(14n/16+1,15n/16+1)(14n/16+2,15n/16+2) \ldots (15n/16,16n/16) \ldots$ $P_{(\log 2n)-1}=(1,3)(2,4)(5,7)(6,8) \ldots (n-3,n-1)(n-2,n)$, $P_{\log 2n}=(1,2)(3,4) \ldots (n-1,n)$.

For example, if n=16, then $P_1=(1,9)(2,10)(3,11)(4,12)(5,13)(6,14)(7,15)(8,16)$, $P_2=(1,5)(2,6)(3,7)(4,8)(9,13)(10,14)(11,15)(12,16)$, $P_3=(1,3)(2,4)(5,7)(6,8)(9,11)(10,12)(13,15)(14,16)$, $P_4=(1,2)(3,4)(5,6)(7,8)(9,10)(11,12)(13,14)(15,16)$.

Let us define the automata $B_i=(A^n, X^n, \delta_{B,i})$ for each i∈ {1, ..., $\log_2 n$} such that for any (the definition formula below specifies what was referred to above as the calculation "turns": based on the index j a "with comma" or a "without comma" character component is used in the formula; the formula distinguishes the permutations according to indices, cf. the definitions set forth above)

$a_1, \ldots, a_n \in A, x_1, \ldots, x_n \in X$ $\delta_{B,i}((a_1, \ldots, a_n),(x_1, \ldots, x_n))=(a'_1, a'_n)$, where $a'_1=\delta(a_1, \delta(a_{Pi(1)}, x_{Pi(1)}))$,

..., $a'_j=\delta(a_j, \delta(a_{Pi(j)}, x_{Pi(j)}))$, ha $j<P_i(j)$, and $a'_j=\delta(a_j, \delta(a'_{Pi(j)}, x_{Pi(j)}))$, if $j \geq P_i(j)(j \in \{1, \ldots, n\})$,

...

$a'_n=\delta(a_n, \delta(a'_{Pi(n)}, x_{Pi(n)}))$.

For example, if i=1 and $P_1$=(1,9) (2,10) (3,11) (4,12) (5,13) (6,14) (7,15) (8,16), then $a'_1=\delta(a_1, \delta(x_9, x_9))$, because $P_1(1)$=9 and 1<$P_1(1)$=(9), $a'_2=\delta(a_2, \delta(a_{10}, x_{10}))$, because $P_1(2)$=10 and 2<$P_1(2)$=9,

...

$a'_8=\delta(a_8, \delta(a_{16}, x_{16}))$, because $P_1(8)$=16 and 8<$P_1(8)$=16, $a'_9=\delta(a_9, \delta(a'_1, x_1))$, because $P_1(9)$=16 and 9>$P_1(9)$=1, $a'_{10}=\delta(a_{10}, \delta(a'_2, x_2))$, because $P_1(10)$=2 and 10>$P_1(10)$=2,

...

$a'_{16}=\delta(a_{16}, \delta(a'_8, x_8))$, because $P_1(16)$=8 and 16>$P_1(16)$=8, For the example included below, let us define the above such that the automaton $B=(A^n, X^{n \log 2n}, \delta_B)$ is defined such that for any $a_1, \ldots, a_n \in A$, $(x_1, \ldots x_{n \log 2n}) \in X^{n \log 2n}$ the transition $\delta_B((a_1, \ldots, a_n),(x_1, \ldots, x_{n \log 2n}))$ is generated by first generating the state vector that can be obtained by applying the transition function $\delta_{B,1}$ for the vector $(a_1, \ldots, a_n)$ as a state, and for the vector $(x_1, \ldots, x_n)$ as an input signal. Taken to an expression: first the transitions $\delta_{B,1}((a_1, \ldots, a_n), (x_1, \ldots x_n))$ are generated. Thereafter, the transition function $\delta_{B,2}$ is applied for the result of this transition and the vector $(x_{n+1}, \ldots, x_{2n})$ as an input signal. Taken to an expression: the transition $\delta_{B,3}$ ($\delta_{B,2}$ ($\delta_{B,1}$ ($(a_1, \ldots, a_n), (x_1, \ldots, x_n)), (x_{n+1}, \ldots, x_{2n}))$, ($x_{2n+1}, \ldots, x_{3n}$)) is generated (therefore, in the permutation approach the steps of this process have to be implemented applying the above-described permutations).

This process is carried on in log $2n$ steps, wherein, in the last step, the transition function $\delta_{B,\log 2n}$ is applied for the state vector obtained, and for the vector ($x_{n(\log 2n-1)}, \ldots, x_{n\cdot\log 2n}$) as an input signal. Taken to an expression: the transition $\delta_{B,\log n}(\delta_{B,\log n-1} ( \ldots \delta_{B,2} (\delta_{B,1} ((a_1, \ldots, a_n), (x_1 \ldots, x_n)), (x_{n+1}, \ldots, x_{2n})) \ldots, (x_{n(\log n-1)+1}, \ldots, x_{n \log n}))$ is generated.

The automaton B defined in such a manner is a scrambler automaton having log $2n$ components that is determined by the automaton A, where the automaton A is the base automaton of the automaton B.

Example 3

Let $B'=(A^n, X^{n \log 2n}, \delta'_B)$ be a scrambler automaton according to the definition included above at the end of example 2, and $B''=(A^n, X^n, \delta''_B)$ a scrambler automaton determined by a base automaton A according to example 1. Let us define the automaton $B=(A^n, X^n, \delta_B)$ in such a way that for any $a_1, \ldots, a_n \in A$, ($x_1, \ldots, x_{n(\log 2n+1)}$)$\in X$ $\delta_B((a_1, \ldots, a_n),(x_1, \ldots, x_{n(\log 2n+1)}))=\delta''_B(\delta'_B$
$((a_1, \ldots, a_n),(x_1, \ldots, x_{n \log 2n})),$
$((x_{n\cdot\log 2n+1}, \ldots, x_{n(\log 2n+1)})))$.

The exemplary automaton B defined in such a manner is scrambler automaton with log n+1 components that is determined by the base automaton A.

An important characteristics of the scrambler automata described in the three examples included above is that in case the base automaton is a permutation automaton, then the scrambler automata will also be permutation automata; and that, in case that the transition matrix of the base automaton constitutes a Latin square, then two different input signals of the scrambler automata set forth in these examples will generate an identical permutation of the state set with a very low probability.

In the following, we confine ourselves to such scrambler automata that are permutation automata, and their base automaton is also a permutation automaton. The inverse permutation automata corresponding to the scrambler automata included in the above-described exemplary constructions can be determined easily; these automata will hereinafter be termed "recovery automata".

Let us now assume that the base automaton $A=(A, X, \delta)$ is a permutation automaton, of which the transition matrix preferably constitutes a Latin square. Let us consider the inverse automaton of the automaton A: $A^{-1}=(A, X, \delta^{-1})$. Then, for any a, b$\in$A, x$\in$X, the state c$\in$A for which $\delta(c,b)=a$ is denoted, by definition, with $\delta^{-1}(a,b)$. (Because A is a permutation automaton, there exists exactly one such state c.)

Example 4

Let us now define the function $\delta^{-1}_B: A^n \times X^n \to A^n$ such that for any ($a'_1, \ldots, a'_n$)$\in A^n$, ($x_1, \ldots, x_n$)$\in A^n$ $\delta^{-1}_B((a'_1, \ldots, a'_n),(x_1, \ldots, x_n))=(a_1, a_2, \ldots, a_n),$
where $a_n = \delta^{-1}(a'_n, \delta(a'_1, \delta(a'_2, \ldots, \delta(a'_{n-1}, x_n) \ldots ))),$ $a_{n-1} = \delta^{-1}(a'_{n-1}, \delta(a'_1, \delta(a'_2, \ldots, \delta(a'_{n-2}, \delta(a'_n, x_{n-1})) \ldots ))),$ $\ldots$ $a_3 = \delta^{-1}(a'_3, \delta(a'_1, \delta(a'_2, \delta(a_4, \ldots, \delta(a_n, x_3) \ldots )))),$ $a_2 = \delta^{-1}(a'_2, \delta(a'_1, \delta(a_3, \ldots, \delta(a_n, x_2) \ldots ))),$ $a_1 = \delta^{-1}(a'_1, \delta(a_2, \ldots, \delta(a_n, x_1) \ldots )).$ It can be clearly seen that in this case the automaton $B^{-1}=(A^n, X^n, \delta^{-1}_B)$ will be the inverse permutation automaton of the automaton B of example 1 (provided that A is a permutation automaton).

Example 5

Let n be a fixed positive integer power of 2, and let us define, for any i$\in\{1, \ldots, \log_2 n\}$, the automata $B^{-1}_i=(A^n, X^n, \delta^{-1}_{B,i})$ such that for any $a'_1, \ldots, a'_n \in A$, ($x_1, \ldots, x_n$)$\in X^n$ and for any j$\in\{1, \ldots, \log_2 n\}$ $\delta^{-1}_{B,i}((a'_1, \ldots, a'_n),(x_1, \ldots, x_n))=(a_1, \ldots, a_n),$
where $a_n = \delta^{-1}(a'_n, \delta(a'_{Pi(n)}, x_{Pi(n)})),$ $\ldots,$ $a'_j = \delta^{-1}(a_j, \delta(a_{Pi(j)}, x_{Pi(j)})),$ if $j<P_i(j)$, and $a'_j = \delta^{-1}(a_j, \delta(a'_{Pi(j)}, x_{Pi(j)})),$ if $j \geq P_i(j)(j \in \{1, \ldots, n\}),$ $\ldots$ $a_1 = \delta(a'_1, \delta(a_{Pi(1)}, x_{Pi(1)})),$ and let us define the automaton $B^{-1}=(A^n, X^{n \log 2n}, \delta^{-1}_B)$, such that for any ($a'_1, \ldots, a'_n$)$\in A^n$, ($x_1, \ldots, x_{n \log n}$)$\in X^{n \log 2n}$ $\delta^{-1}_B((a'_1, \ldots, a'_n),(x_1, \ldots, x_{n \log n}))=\delta^{-1}_{B,1}(\delta^{-1}_{B,2}$
$( \ldots (\delta_{B,\log 2n-1}(\delta^{-1}_{B,\log 2n}((a'_1, \ldots, a'_n),$
$((x_{n(\log n-1)+1}, \ldots, x_{n \log n})),$
$(x_{n(\log n-2)+1}, \ldots, x_{n(\log n-1)})), \ldots,$
$(x_{n+1}, \ldots, x_{2n})),(x_1, \ldots, x_n)) \ldots )).$ It can be proven that in this case the automaton $B^{-1}=(A^n, X^{n \log 2n}, \delta^{-1}_B)$ will be the inverse permutation automaton of the automaton B of example 2 (provided that A is a permutation automaton).

Example 6

Let $B'=(A^n, X^n, \delta'^{-1}_B)$ be a scrambler automaton according to example 5, and $B''=(A^n, X^n, \delta''^{-1}_B)$ a scrambler automaton according to example 4. Let us define the automaton $B^{-1}=(A^n, X^n, \delta^{-1}_B)$ such that for any $a'_1, \ldots, a'_n \in A$, $x_1, \ldots, x_{n(\log n+1)} \in X$ $\delta^{-1}_B((a'_1, \ldots, a'_n),(x_1, \ldots, x_{n(\log 2n+1)}))=\delta^{-1}_B(\delta''^{-1}_B$
$((a'_1, \ldots, a'_n),(x_1, \ldots, x_n)),(x_{n \log 2n+1}, \ldots,$
$x_{n(\log 2n+1)})).$ The automaton $B^{-1}$ defined this way will be the inverse permutation automaton of the automaton B of example 3 (provided that A is a permutation automaton).

In sum, the automaton pairs according to examples 1 and 4, and to examples 2 and 5, as well as the automaton pairs according to examples 3 and 6 form easily determinable scrambler-descrambler pairs.

In the case of pseudorandom number generators and apparatuses and methods adapted for generating a cryptographic hash value deciphering (recovery) is not needed. Therefore, for pseudorandom number generators and apparatuses and methods adapted for generating a cryptographic hash value, in the case of example 1

$\delta_B(a_1, \ldots, a_n, x_1, \ldots, x_n)=(a'_1, a'_2, \ldots, a'_n),$ where
instead of the formulas $a'_1=\delta(a_1,\delta(a_2,\ldots,\delta(a_n,x_1)\ldots)),$ $a'_2=\delta(a_2,\delta(a'_1,\delta(a_3,\ldots,\delta(a_n,x_2)\ldots))),$ $a'_3=\delta(a_3,\delta(a'_1,\delta(a'_2,\delta(a_4,\ldots,\delta(a_n,x_3)\ldots)))),$

...

$a'_n=\delta(a_n,\delta(a'_1,\delta(a'_2,\ldots,\delta(a'_{n-1},x_n)\ldots))).$ it is sufficient to apply the formula $\delta_B(a_1,\ldots,a_n,x_1,\ldots,x_n)=(a'_1,a'_2,\ldots,a'_n),$ where $a'_1=\delta(a_1,\delta(a_2,\ldots,\delta(a_n,x_1)\ldots)),$ $a'_2=\delta(a_2,\delta(a'_1,\delta(a_3,\ldots,\delta(a_n,x_2)\ldots))),$ $a'_3=\delta(a_3,\delta(a'_1,\delta(a'_2,\delta(a_4,\ldots,\delta(a_n,x_3)\ldots)))),$

...

$a'_n=\delta(a_n,\delta(a_1,\delta(a_2,\ldots,\delta(a_{n-1},x_n)\ldots))).$

While in example 2, instead of the formula $a'_j=\delta(a_j,\delta(a_{Pi(j)},x_{Pi(j)})),$ if $j<P_i(j),$ and $a'_j=\delta(a_j,\delta(a'_{Pi(j)},x_{Pi(j)})),$ if $j\geq P_i(j)(j\in\{1,\ldots,n\}),$ it is sufficient to apply the formula $a'_j=\delta(a_j,\delta(a_{Pi(j)},x_{Pi(j)})),(j\in\{1,\ldots,n\}),$ Thus, the generated states ("with comma" states) do not appear on the right side in the formulas, which simplifies the algorithms without deteriorating security. If the constructions according to example 1 or 2 form parts of the construction according to example 3, this simplification is of course also applicable to these parts.

It is not expedient to apply this simplification for encryption, because it does not allow for such a simple deciphering/decryption process that is suggested in this application (see also examples 7 and 10). By "discarding commas", a "mixing trick" is removed, so the chances of the breaker are decreased in such applications wherein descrambling is not required. In spite of "discarding commas", the scrambler automaton remains a permutation automaton, but the number of cases increases, so theoretically deciphering is possible, but is much more difficult. So, the above described "discarding commas" process is not recommended in such cases wherein descrambling is required, but it is optionally applicable (it is included in the field of the invention, because it is not a requirement that a second character component must be applied for determining the second character components).

It can be proven mathematically that in case the transition matrix of the base automaton constitutes a Latin square, the scrambler automaton defined this way (i.e., by "discarding commas") will also be a permutation automaton.

A scrambler provided with a counter is a method and apparatus that composed by a counter S and a scrambler B connected thereto. In the following it is assumed that for a given n the state set of the counter S is constituted by every binary string with a length n. If the counter is in a state w, when this w value is fed to the scrambler as an input, it generates and outputs the value g(w), where g is the scrambler function of the B scrambler method and apparatus.

The pseudorandom number values are either constituted by the values g(w) themselves, or the scrambler apparatus is complemented by an additional scheduler apparatus that is adapted for decomposing, for each k, the character string g(w) into k character strings of equal length, with the character strings $z_1,\ldots,z_k$ thus generated constituting the generated pseudorandom numbers (i.e., k of them). In the following it is also assumed that the scrambler preferably realizes a scrambler automaton.

Expressed formally, the pseudorandom number generator is a structure $G=(K, Z_J, S, f, U, g)$, where the nonempty, finite set K is the key space; for a positive integer J, $Z_J=\{0,\ldots,J-1\}$ is the output division; and the nonempty, finite set S is the state space, f: S→S is the state transition function, U is the output space, and g: $K\times Z_J\times S\to U$ is the output function. At the start of the operation of the apparatus and structure a value $s_0\in S$ is specified as the core of the transition function, with a value $k\in K$ being specified as the core of the output function.

By applying function f (implemented by a counter apparatus) the state sequence $s_1, s_2, \ldots$ is obtained, where $s_n=f(s_{n-1}), n=1, 2, \ldots,$ the pseudorandom number sequence $r_1, r_2, \ldots$ is obtained applying the function g (realized by a scrambler apparatus), where $r_{(n-1)\cdot J+j}=g(k,j,s_n)$, which is the j+1-th member of the n-th (i.e., initially the first) pseudorandom number group ($j\in\{0,\ldots,J-1\}$, with each pseudorandom number group consisting of J members). After generating a state $s_n$, therefore, a string consisting of the partial strings $g(k,0,s_n), g(k,1,s_n), g(k,J-1,s_n)$ is generated in the output module, with the next pseudorandom number sequence $g(k,0,s_n), g(k,1,s_n), \ldots, g(k,J-1,s_n)$ being generated at the output of the output module as a division of said string (generated by a scheduler apparatus).

As it was mentioned, it is possible that J=1. In such a case, the key k and the state $s_n$ determine a single pseudorandom number $g(k,0,s_n)$. G is termed to be "full-period" is f is bijective (in other words, it is both injective, i.e., for every pair s, s'∈S f(s)=f(s') if and only if s=s', and surjective, i.e., for every s∈S there exists such an s'∈S that f(s')=s), and if for each triplet k∈K, s, s'∈S the vector (g(k,0,s), g(k,1,s), . . . , g(k,J-1,s)) is identical to the vector (g(k,0,s'), g(k,1,s'), . . . , g(k,J-1,s')) if and only if s=s'. Thus, the length of the periods of G is J*|S|, where |S| denotes the number of elements of S. The origin of the term "counter-based" is that for a given n the set S is usually chosen to be $\{0,\ldots,n-1\}$, with the function f being a simple counter, i.e., for every s∈S f(s)=s+1 (mod n). (In this case, f is obviously bijective.) In this patent application the function f can be chosen to be a simple counter, while the function g will be defined with the help of the transition function of a scrambler permutation automaton.

Example 7: Simple Example for Encryption and Decryption a) Encryption

Let us consider the following automaton A with four states and four input signals (its transition matrix is shown in Table 4 below), which automaton will be the base automaton of the exemplary scrambler automaton (in the case of encryption, the base automaton can be called a "key automaton"):

TABLE 4

| δ | 0 | 1 | 2 | 3 |
|---|---|---|---|---|
| 0 | 1 | 2 | 3 | 0 |
| 1 | 3 | 0 | 1 | 2 |
| 2 | 2 | 3 | 0 | 1 |
| 3 | 0 | 1 | 2 | 3 |

In the 0-th row of the transition matrix specified in Table 4, the states are listed, with the 0-th column thereof containing the possible input signals. The condition that the state set and input signal set of the automaton are identical is fulfilled also in this example; however, in certain embodiments the state and input signal sets of the automaton may be different. According to the example shown in FIG. 3, the above transition matrix constitutes a Latin square. The state set of the automaton is {0123}, which is identical to the input signal set of the automaton, and to the character set of both the plaintext and the ciphertext.

The scrambling and the descrambling operations will now be illustrated applying this example. Let us consider the hexadecimal ASCII code of the word "OK", 4F4B (the non-encrypted data correspond to the word "OK"). Converting this hexadecimal value, 4F4B, into the quaternary number system, the character sequence 10331023 is obtained. This character sequence is the text to be scrambled. Let us assume that the block length is eight, i.e., the text to be scrambled composes a single block. Scrambling is illustrated applying the construction of example 3.

Let us assume that we have only one permutation, P=(1, 2), that is, n=2.

Let the message to be encrypted be the encoded form of the word "OK", i.e., 10331023. First, the first (two-element) block of the message 10331023, i.e., "10" is encrypted. Let us assume that the counter core is $s_0$=00, while the state of the counter is calculated applying the formula $s_t = s_{t-1} + 1$ (mod 16) (that is, when it attains 16 in the quaternary number system, it restarts), and the counter is adapted for passing on its states as two-digit quaternary numbers.

In this case, with $a_1 a_2$=10, $x_1 x_2$=01

$a'_1 = \delta(a_1, \delta(a_2, x_2)) = \delta(1, \delta(0,1)) = \delta(1,3) = 1$, $a'_2 = \delta(a_2, \delta(a'_1, x_1)) = \delta(0, \delta(1,0)) = \delta(0,2) = 2$, and, denoting $a'_1$ with $a_1$, and $a'_2$ with $a_2$, considering the next counter state $x_1 x_2$=02

$a'_1 = \delta(a_1, \delta(a_2, x_1)) = \delta(1, \delta(2,0)) = \delta(1,3) = 1$, $a'_2 = \delta(a_2, \delta(a'_1, x_2)) = \delta(2, \delta(1,2)) = \delta(2,3) = 2$, that is, the encrypted block corresponding to the first plaintext block, i.e., 10, is 12. The first of the two steps is carried out according to the permutations, with the index of the component $x_i$ being identical to the state component applied for the second time (i.e., not with "itself without comma"). The permutation, however, contains only one inversion, so it ends with the first combinations. The second "twist" is already a chain embodiment, wherein the index of the input signal character component $x_i$ corresponds to the index to be carried over, i.e., to the "itself without comma", for which the "itself with comma" is calculated.

The second block of the plaintext is $a_1 a_2$=33, while the subsequent state of the counter is $x_1 x_2$=03. Then $a'_1 = \delta(a_1, \delta(a_2, x_2)) = \delta(3, \delta(3,3)) = \delta(3,3) = 3$, $a'_2 = \delta(a_2, \delta(a'_1, x_1)) = \delta(3, \delta(3,0)) = \delta(3,0) = 0$, and, denoting $a'_1$ with $a_1$, and $a'_2$ with $a_2$, and considering the next counter state $x_1 x_2$=10 (in the quaternary number system, 03+1=10)

$a'_1 = \delta(a_1, \delta(a_2, x_1)) = \delta(3, \delta(0,1)) = \delta(3,3) = 3$, $a'_2 = \delta(a_2, \delta(a'_1, x_2)) = \delta(0, \delta(3,0)) = \delta(0,0) = 1$, that is, the encrypted block of the second plaintext block 33 is 31.

The third block of the plaintext is $a_1 a_2$=10, while the subsequent state of the counter is $x_1 x_2$=11. Then $a'_1 = \delta(a_1, \delta(a_2, x_2)) = \delta(1, \delta(0,1)) = \delta(1,3) = 1$, $a'_2 = \delta(a_2, \delta(a'_1, x_1)) = \delta(0, \delta(1,1)) = \delta(0,0) = 1$, and, denoting $a'_1$ with $a_1$, and $a'_2$ with $a_2$, considering the next counter state $x_1 x_2$=12

$a'_1 = \delta(a_1, \delta(a_2, x_1)) = \delta(1, \delta(1,1)) = \delta(1,0) = 1$, $a'_2 = \delta(a_2, \delta(a'_1, x_2)) = \delta(1, \delta(2,2)) = \delta(1,0) = 2$, that is, the encrypted block of the third plaintext block 10 is 22.

The fourth block of the plaintext is $a_1 a_2$=23, while the subsequent state of the counter is $x_1 x_2$=13. Then $a'_1 = \delta(a_1, \delta(a_2, x_2)) = \delta(2, \delta(3,3)) = \delta(2,3) = 2$, $a'_2 = \delta(a_2, \delta(a'_1, x_1)) = \delta(3, \delta(2,1)) = \delta(3,1) = 2$, and, denoting $a'_1$ with $a_1$, and $a'_2$ with $a_2$, and considering the next counter state $x_1 x_2$=20 (in the quaternary number system, 13+1=20)

$a'_1 = \delta(a_1, \delta(a_2, x_1)) = \delta(2, \delta(2,2)) = \delta(2,0) = 3$, $a'_2 = \delta(a_2, \delta(a'_1, x_2)) = \delta(2, \delta(3,0)) = \delta(2,0) = 3$, that is, the encrypted block of the fourth plaintext block 23 is 33.

The ciphertext is therefore 12312233.

As it is shown by this simple example, in this case the basic block size is two (the initial and the output character block, i.e., generally speaking, the first and the second character block—applied in a separate respective step—have the same length, as well as the applied input signal block; two characters already constitute a block), the character sequence to be encrypted being processed applying a step length corresponding to this basic block size; in this example, the character sequence to be encrypted consists of eight characters, so the encryption process includes four main steps. As it is illustrated above, a certain type of a "double mixing" is applied in each encryption step, i.e., the second character block obtained in a given "turn" is recycled into the role of the first character block.

b) Decryption

Now, the process of recovery is disclosed. The ciphertext to be recovered is therefore the following: 12312233. The inverse permutation automaton of the base automaton applied for scrambling (which base automaton is a permutation automaton) is the following (the corresponding transition matrix is illustrated in Table 5; for the process of generating the transition matrix of the inverse permutation automaton from the transition matrix see at Table 7):

TABLE 5

| $\delta^{-1}$ | 0 | 1 | 2 | 3 |
|---|---|---|---|---|
| 0 | 3 | 0 | 1 | 2 |
| 1 | 1 | 2 | 3 | 0 |
| 2 | 2 | 3 | 0 | 1 |
| 3 | 0 | 1 | 2 | 3 |

The first block of the ciphertext is 12, while the first and second generated counter states are 01 and 02. Then $a'_2 = \delta^{-1}(a_2, \delta(a_1, x_2)) = \delta^{-1}(2, \delta(1,2)) = \delta^{-1}(2,3) = 2$, $a'_1 = \delta^{-1}(a_1, \delta(a'_2, x_1)) = \delta^{-1}(1, \delta(2,0)) = \delta^{-1}(1,3) = 1$, and, denoting $a'_1$ with $a_1$, and $a'_2$ with $a_2$, considering the next counter state $x_1 x_2$=01

$a'_2=\delta^{-1}(a_2,\delta(a_1,x_1))=\delta^{-1}(2,\delta(1,0))=\delta^{-1}(2,2)=0,$ $a'_1=\delta^{-1}(a_1,\delta(a'_2,x_2))=\delta^{-1}(1,\delta(0,1))=\delta^{-1}(1,3)=1,$ that is, the deciphered block of the ciphertext block 12 is 10.

The second block of the ciphertext is 31, while the subsequent two generated counter states are 03 and 10. Then $a'_2=\delta^{-1}(a_2,\delta(a_1,x_2))=\delta^{-1}(1,\delta(3,0))=\delta^{-1}(1,0)=0,$ $a'_1=\delta^{-1}(a_1,\delta(a'_2,x_1))=\delta^{-1}(3,\delta(0,1))=\delta^{-1}(3,3)=3,$ and, denoting $a'_1$ with $a_1$, and $a'_2$ with $a_2$, considering the next counter state $x_1\ x_2=03$ $a'_2=\delta^{-1}(a_2,\delta(a_1,x_1))=\delta^{-1}(0,\delta(3,0))=\delta^{-1}(0,0)=3,$ $a'_1=\delta^{-1}(a_1,\delta(a'_2,x_2))=\delta^{-1}(3,\delta(3,3))=\delta^{-1}(3,3)=3,$ that is, the deciphered block of the second ciphertext block 23 is 33.

The third block of the ciphertext is 22, while the subsequent two generated counter states are 11 and 12. Then $a'_2=\delta^{-1}(a_2,\delta(a_1,x_2))=\delta^{-1}(2,\delta(2,2))=\delta^{-1}(2,0)=2,$ $a'_1=\delta^{-1}(a_1,\delta(a'_2,x_2))=\delta^{-1}(2,\delta(1,2))=\delta^{-1}(2,0)=1,$ and, denoting $a'_1$ with $a_1$, and $a'_2$ with $a_2$, considering the next counter state $x_1\ x_2=11$ $a'_2=\delta^{-1}(a_2,\delta(a_1,x_1))=\delta^{-1}(1,\delta(1,1))=\delta^{-1}(1,0)=0,$ $a'_1=\delta^{-1}(a_1,\delta(a'_2,x_2))=\delta^{-1}(1,\delta(0,1))=\delta^{-1}(1,3)=1,$ that is, the deciphered block of the third ciphertext block 12 is 10.

The fourth block of the ciphertext is 33, while the subsequent two generated counter states are 13 and 20. Then $a'_2=\delta^{-1}(a_2,\delta(a_1,x_2))=\delta^{-1}(3,\delta(3,0))=\delta^{-1}(3,0)=2,$ $a'_1=\delta^{-1}(a_1,\delta(a'_2,x_1))=\delta^{-1}(3,\delta(2,2))=\delta^{-1}(3,0)=2,$ and, denoting $a'_1$ with $a_1$, and $a'_2$ with $a_2$, considering the next counter state $x_1\ x_2=13$ $a'_2=\delta^{-1}(a_2,\delta(a_1,x_2))=\delta^{-1}(2,\delta(2,1))=\delta^{-1}(2,1)=3,$ $a'_1=\delta^{-1}(a_1,\delta(a'_2,x_2))=\delta^{-1}(2,\delta(3,3))=\delta^{-1}(2,3)=2,$ that is, the deciphered block of the fourth ciphertext block 22 is 23.

Combining the deciphered blocks, the plaintext 10331023 is obtained. Converting this back into hexadecimal form, the ASCII-coded version of the text "OK" is obtained.

In the case of both the cryptographic apparatus for block-encrypting plaintext data and the cryptographic apparatus for decrypting block-encrypted ciphertext data according to the invention the scrambler/descrambler apparatus is a scrambler/descrambler automaton.

The invention also relates to a counter-based full-cycle pseudorandom number generator method and apparatus, in which apparatus a counter passes on its state values to a scrambler automaton, with the string obtained as a result of the scrambling process is represented by the method and apparatus either as a single pseudorandom character string, or—dividing this character string into equal-length portions—as a sequence of pseudorandom character strings.

Example 8: Simple Example for Pseudorandom Number Generation

The counter and the scrambler automaton of the pseudorandom number generator can be identical to the counter and scrambler automaton of an appropriate encryption apparatus and method. One of the important differences is that the current state of the scrambler automaton of the pseudorandom number generator is not a subsequent block of an external plaintext, but the current state of the counter. The other difference is that, for generating each pseudorandom number, the scrambler automaton of the pseudorandom number generator applies one and the same fixed input signal sequence, while in each step the input signal sequence of the encryption apparatus and method is the subsequent pseudorandom number.

For example, let us once again consider the four-state base automaton with four input signals that was applied above in the previous encryption example, and let us assume that the structure of the scrambler automaton of the exemplary pseudorandom number generator is completely identical to the scrambler automaton for encryption in the example.

Again, let us consider the counter applied in the encryption example above, and let us assume that the subsequent states of the counter are again determined applying the formula $s_{t+1}=s_t+1 \pmod{16}$ such that the generated values are obtained as two-digit quaternary number system numbers.

Let the current value of the counter be identical to the two characters of the plaintext block applied in the encryption example, that is, 10. Let us assume that before generating the subsequent pseudorandom number the state of the counter is 03 (which is identical to the core state, i.e., the state $s_0$ at the first time instant). Therefore, in this case (applying the quaternary number system for calculations) $s_{t+1}=s_t+1 \pmod{16}$, i.e., 03+1=10 (in the quaternary number system). Let a fixed input signal of the scrambler automaton of the exemplary pseudorandom number generator be the character sequence obtained by concatenating two consecutive pseudorandom numbers applied in the encryption example, i.e., let a fixed input signal of the scrambler automaton of the pseudorandom number generator the character sequence 0102 that stays identical during each generation of pseudorandom numbers. Let the apparatus start the scrambler automaton applied in the encryption example from the state 10 (which is identical to the state of the counter).

In that case, with $a_1\ a_2=10$, $x_1\ x_2=01$ $a'_1=\delta(a_1,\delta(a_2,x_2))=\delta(1,\delta(0,1))=\delta(1,3)=1,$ $a'_2=\delta(a_2,\delta(a'_1,x_1))=\delta(0,\delta(1,0))=\delta(0,2)=2,$ and, denoting $a'_1$ with $a_1$, and $a'_2$ with $a_2$, considering the next counter state $x_1\ x_2=02$ $a'_1=\delta(a_1,\delta(a_2,x_1))=\delta(1,\delta(2,0))=\delta(1,3)=1,$ $a'_2=\delta(a_2,\delta(a'_1,x_2))=\delta(2,\delta(2,2))=\delta(2,0)=3,$ that is, the first pseudorandom number is 13.

Between the two transformations, it is applied that $a'_1$ is denoted with $a_1$, and $a'_2$ with $a_2$. This was also done in example 7 and will be done also in example 9, applying a kind of "double mixing" (i.e., a permutation and a chain approach).

Thereby, the option according to an embodiment (formulated applying generic terms) is realized that determining of the second character components of the second character block are successively performed several times, in the same (a single) way (or optionally: in different ways, see example 10), such that in case of a subsequent determination a given determined second character block is applied as a first character block.

Analysing the exemplary encryption process it can be noticed that in the course of determining the generated pseudorandom number—due the selection of the state of the counter of the pseudorandom number generator and of the fixed input signal of the scrambler automaton thereof—formally the same sequence of calculations is executed as in the course of the exemplary encryption process.

The value 13 thus obtained will either be the subsequent pseudorandom number, or—if, for example, the pseudorandom number generator is applied for generating two single-digit quaternary pseudorandom numbers—the sequence 1, 3 appears at the output of the pseudorandom number generator in two consecutive steps as two consecutive pseudorandom numbers.

The next counter state value—in the quaternary number system—is 10+1=11 (that is, the previous pseudorandom number is not "return fed"—this is basically also because an independent pseudorandom number is to be generated—but a new initial state is obtained by incrementing the counter; "return feeding" is a method that is widely applied in known approaches, the corresponding embodiment of the invention operates differently, in order that in the case of pseudorandom number generation a so-called full-cycle pseudorandom number can be obtained). Repeating the algorithm with $a_1\ a_2 = 11$, $x_1\ x_2 = 01$, $$a'_1 = \delta(a_1, \delta(a_2, x_2)) = \delta(1, \delta(1,1)) = \delta(1,0) = 2,$$

$$a'_2 = \delta(a_2, \delta(a'_1, x_1)) = \delta(1, \delta(2,0)) = \delta(1,3) = 1,$$

and, denoting $a'_1$ with $a_1$, and $a'_2$ with $a_2$, considering the next counter state $x_1\ x_2 = 02$ $$a'_1 = \delta(a_1, \delta(a_2, x_1)) = \delta(2, \delta(1,0)) = \delta(2,2) = 0,$$

$$a'_2 = \delta(a_2, \delta(a'_1, x_2)) = \delta(1, \delta(2,2)) = \delta(1,0) = 2,$$

that is, the second pseudorandom number will be 02, or—if, for example, the pseudorandom number generator is applied for generating two single-digit quaternary pseudorandom numbers—the sequence 0, 2 will appear at the output of the pseudorandom number generator in two consecutive steps as two consecutive pseudorandom numbers. Pseudorandom number generation is carried on until the pseudorandom number generator apparatus is halted.

As it is illustrated further below in a following example and was also mentioned above, the invention also relates to a cryptographic apparatus and method adapted for generating a cryptographic hash value, wherein the cryptographic hash value of an input document is also determined applying a scrambler automaton, utilizing its functionality in a specific manner.

For generating the cryptographic hash value of a document, it is assumed that the document is divided (hashed) into portions having a length of n bytes, where and is a power of two (n=16, 32, or 64). In case the length of the document (plaintext, input data) is not divisible by n, the document is complemented applying filler characters (e.g. 0X00 bytes customarily applied in information technology, or a character string having an all-zero value) such that it is divisible by n.

The plaintext is therefore divided into blocks with a length of n (preferably n=16), and the method is carried out prior to performing this type of "encryption"—that is, one that results in a hash value—on each (initially, the first) of the partial texts of the plaintext that have a length of n. As already mentioned, the cryptographic hash value of the document depends not only on the contents of the document but also on the method and apparatus applied for generating the cryptographic hash value. In other words, the term "cryptographic hash value" of a document is always taken to mean a specific cryptographic hash value associated with the document in relation to a given cryptographic hash value generation method and apparatus.

It is assumed that a scrambler automaton is available for generating the cryptographic hash value, which automaton can also be termed the "transformer automaton", with a given state $(a_1, \ldots, a_n)$ of this automaton (the core) always remaining the same—i.e., in the course of the separate hash generation processes for different documents (optionally, this core can be changed for each hash generation process, or from time to time). The following step is carried out until we reach the end of the document.

The subsequent (i.e., initially, the first) starting "slice" $x_1 \ldots x_n$, having a length of n, of the document is taken, and then the state $(a'_1, \ldots, a'_n)$ of the transformer automaton is generated into which state the transformer automaton is taken from the state $(a_1, \ldots, a_n)$ under the effect of the input signal $(x_1, \ldots, x_n)$. In case we have reached the end of the document, the hash value will be the character string $a'_1 \ldots a'_n$. If the end of the document has not yet been reached, the process is repeated such that the state $(a_1, \ldots, a_n)$ is replaced with the state $(a'_1, \ldots a'_n)$—like in example 8, the "commas are discarded" from the components —, and then the input signal $(x_1, \ldots, x_n)$ is substituted with the input signal $(x'_1, \ldots, x'_n)$ that is generated from the subsequent block $x'_1 \ldots x'_n$, of a length n, of the text to be hashed.

The method and apparatus for generating a hash value is conspicuously similar to the counter-based pseudorandom number generator methods and apparatuses described above, and also to the block cipher and block deciphering methods and apparatuses described above. The essential difference is that in the hash value generator the scrambler part of the method and apparatus receives as an input (input signal) the uniform-length blocks of the plaintext instead of the counter states.

Example 9: Simple Example for Generating a Cryptographic Hash Value

Let us assume also in this case that the configuration of the scrambler automaton of the exemplary method and apparatus for generating a cryptographic hash value is identical to the configuration of the scrambler automaton applied in the encryption process according to example 7.

Therefore, let our scrambler automaton be identical to the one applied for the encryption process according to example 7. Let us assume also in this case that we have only one permutation, $$P=(1,2), \text{ that is, } n=2.$$

Now, let us consider once again the quaternary transformed form 10331023 of the character sequence "OK" as described in relation to the encryption of example 7.

Let the fixed initial state of the exemplary scrambler automaton be for example 13 (this is the above mentioned second predetermined input block).

First, the portion 10 (having a length of n=2) of the document to be authenticated is read in, and the scrambler automaton is started from the initial state 13.

Then, with $a_1\ a_2 = 13$, $x_1\ x_2 = 10$, $$a'_1 = \delta(a_1, \delta(a_2, x_2)) = \delta(1, \delta(3,0)) = \delta(1,0) = 2,$$

$$a'_2 = \delta(a_2, \delta(a'_1, x_1)) = \delta(3, \delta(2,1)) = \delta(3,2) = 2,$$

and, denoting $a'_1$ with $a_1$, and $a'_2$ with $a_2$, (that is, in such a case, $a_1 a_2=22$) and reading in the next block $x_1 x_2=33$ of the document, we obtain $$a'_1=\delta(a_1,\delta(a_2,x_1))=\delta(2,\delta(2,3))=\delta(2,2)=0,$$

$$a'_2=\delta(a_2,\delta(a'_1,x_2))=\delta(2,\delta(0,3))=\delta(2,0)=3,$$

that is, the cryptographic hash value of the prefix 1033 of the document is 03 (it is noted that for the sake of a uniform notation the order in which the input signals are read in are changed in every second step in the same manner as in example 7).

Carrying out now this process on the next two characters $x_1 x_2=10$ of the document and on the cryptographic hash value $a_1 a_2=03$ we get $$a'_1=\delta(a_1,\delta(a_2,x_2))=\delta(0,\delta(3,0))=\delta(0,0)=1,$$

$$a'_2=\delta(a_2,\delta(a'_1,x_1))=\delta(3,\delta(1,1))=\delta(3,0)=0,$$

and, denoting $a'_1$ with $a_1$, and $a'_2$ with $a_2$, (that is, in such a case, $a_1 a_2=10$) and reading in the last block $x_1 x_2=23$ of the document, we obtain $$a'_1=\delta(a_1,\delta(a_2,x_1))=\delta(1,\delta(0,2))=\delta(1,2)=3,$$

$$a'_2=\delta(a_2,\delta(a'_1,x_2))=\delta(0,\delta(2,3))=\delta(0,2)=2,$$

that is, the cryptographic hash value of the document 10331023 (according to the applied apparatus and method adapted for generating a cryptographic hash value) is 32.

If the document in question has further blocks, then, by continuing this algorithm in the order of the blocks of course be, the cryptographic hash value, i.e., the certified hash of the document of the desired length can determined (it is noted here that if the last block of the document is smaller than the block size, then it has to be complemented in a manner customary in information technology, for example filling it up with 0X00 filler bytes).

It is apparent that the conditions for the first, last, and intermediate transitions in the transition sequence, specified in relation to the embodiments applying base automata, are fulfilled also in the examples, in accordance with the illustrated constructions (which construction illustrates well how the obtained auxiliary second states are transferred into the next transition as an auxiliary input signal). The transition matrices applied in examples 7-9 also illustrate such an embodiment wherein the transition matrix of the base automaton constitutes a Latin square. These findings also apply for example 10 following below; however, this example has a more complex construction than the examples included above.

In the following, an example that is more complex than the ones hitherto described is disclosed, wherein both the permutation approach and the chain approach are included (that is it includes a combination thereof).

Example 10 (and optionally, its generalizations) is related to such an embodiment wherein—using the generic terms introduced above—determining of the second character components of the second character block is successively performed several times in the same way (the same type of scrambling operation can be carried out, as it was mentioned in connection with examples 7-9) or in different ways (scrambling operations of different types may also follow each other) such that in the case of a subsequent determination (that is, if such a subsequent determining exists), a given determined second character block is applied as a first character block.

In other words, in case a combination of different scrambling methods is applied (i.e., not only in the case of combining the different approaches), their combination is carried out such that the obtained second character block is "return fed" into the scrambler, and the character block is scrambled again. The different types of scrambling operation can be performed differently than in example 10, wherein there is a switch from the permutation approach to the chain approach; however, it also be carried out differently in such a way, that for example different transposition sequence within the permutation approach are applied. In example 10, both types of "switching" are included.

Example 10

The scrambling and descrambling methods according to the invention are now illustrated with another simplified example for better understanding. Let us consider once again the scrambler automaton A with four states and four input signals that was applied also in example 7 and has the following transition matrix:

TABLE 6

| δ | 0 | 1 | 2 | 3 |
|---|---|---|---|---|
| 0 | 1 | 2 | 3 | 0 |
| 1 | 3 | 0 | 1 | 2 |
| 2 | 2 | 3 | 0 | 1 |
| 3 | 0 | 1 | 2 | 3 |

Let us consider once again the hexadecimal ASCII code of the word "OK", 4F4B (the non-encrypted data correspond to the word "OK"). Converting this hexadecimal value, 4F4B, into the quaternary system, the string 10331023 is obtained. This string is the text to be scrambled. Let us assume that the block length is eight, i.e., the text to be scrambled constitutes a single block. Scrambling is illustrated applying the construction of example 3.

Let us assume that in the case of the automaton B included in example 3, n=8. The state set of the counter therefore contains every character string in $\{0,1,2,3\}$ with a length of 8. These character strings can also be interpreted as quaternary number system numbers with a length of 8. Accordingly, for the sake of simplicity, let us assume that the subsequent state of our counter apparatus is calculated at a t-th time instant as $s_{t+1}=s_t+1 \pmod{2^{16}}$ (t=1, 2, ... ), that is, $s_{t+1}=s_t+1$ if $s_t<33333333$ (of which the decimal number system value is $2^{16}-1$), while $s_{t+1}=00000000$ if $s_t=33333333$. Let us assume that the value of the counter core is, for example, $s_0=21032102$. Then, in the first step $s_1=21032103$.

Let $a_i$, i=1, ... ,8 denote the i-th letter of the plaintext $a_1a_2a_3a_4a_5a_6a_7a_8=10331023$ (that is, a character component of the input—first—character block that has a length of n). Also, in each step t=1, 2, ... let $x_i$, i=1, ... ,8 denote the i-th letter of the current counter state $s_t$ (i.e., the input signal character component of the input signal character block according to the present embodiment).

In the first step, therefore, the characters of the generated counter state Si are the following: $x_1=2$, $x_2=1$, $x_3=0$, $x_4=3$, $x_5=2$, $x_6=1$, $x_7=0$, $x_8=3$.

The text 21302103 is first modified according to the structure of the permutation $P_1=(1, 5)(2, 6)(3, 7)(4, 8)$. Then (see example 2)

$$\delta_{B,1}((a_1, \ldots ,a_8),(x_1, \ldots ,x_8))=(a'_1, \ldots ,a'_8), \text{ where}$$

$$a'_1=\delta(a_1,\delta(a_5,x_5))=\delta(1,\delta(1,2))=\delta(1,3)=1,$$

$$a'_2=\delta(a_2,\delta(a_6,x_6))=\delta(0,\delta(0,1))=\delta(0,3)=0,$$

$a'_3=\delta(a_3,\delta(a_7,x_7))=\delta(3,\delta(2,0))=\delta(3,3)=3,$ $a'_4=\delta(a_4,\delta(a_8,x_8))=\delta(3,\delta(3,3))=\delta(3,3)=3,$ $a'_5=\delta(a_5,\delta(a'_1,x_1))=\delta(1,\delta(1,2))=\delta(1,3)=1,$ $a'_6=\delta(a_6,\delta(a'_2,x_2))=\delta(0,\delta(0,1))=\delta(0,3)=0,$ $a'_7=\delta(a_7,\delta(a'_3,x_3))=\delta(2,\delta(3,0))=\delta(2,0)=3,$ $a'_8=\delta(a_8,\delta(a'_4,x_4))=\delta(3,\delta(3,3))=\delta(3,3)=3.$ Let us now choose the values $a'_1, \ldots, a'_8$ thus obtained to be as, and let us modify the text $a_1a_2a_3a_4a_5a_6a_7a_8$ (=10331033) according to the structure of the permutation $P_2=(1, 3)(2, 4)(5, 7)(6, 8)$ and according to the next counter state $s_2=s_1+1 \pmod{2^{16}}=21032103+1=21032110$ (calculated in the quaternary number system) as follows:

First of all, the characters of the generated counter state $s_2$ are the following: $x_1=2, x_2=1, x_3=0, x_4=3, x_5=2, x_6=1, x_7=1, x_8=0$. Then $\delta_{B,2}((a_1,\ldots,a_8),(x_1,\ldots,x_8))=(a'_1,\ldots,a'_8)$, where $a'_1=\delta(a_1,\delta(a_3,x_3))=\delta(1,\delta(3,0))=\delta(1,0)=1,$ $a'_2=\delta(a_2,\delta(a_4,x_4))=\delta(0,\delta(3,3))=\delta(0,3)=0,$ $a'_3=\delta(a_3,\delta(a'_1,x_1))=\delta(3,\delta(2,2))=\delta(3,0)=0,$ $a'_4=\delta(a_4,\delta(a'_2,x_2))=\delta(3,\delta(0,1))=\delta(3,3)=3,$ $a'_5=\delta(a_5,\delta(a_7,x_7))=\delta(1,\delta(3,1))=\delta(1,2)=3,$ $a'_6=\delta(a_6,\delta(a_8,x_8))=\delta(0,\delta(3,0))=\delta(0,0)=1,$ $a'_7=\delta(a_7,\delta(a'_5,x_5))=\delta(3,\delta(3,2))=\delta(3,1)=2,$ $a'_8=\delta(a_8,\delta(a'_6,x_6))=\delta(3,\delta(1,1))=\delta(3,0)=2.$ Then, once again choosing the obtained values $a'_1, \ldots, a'_8$ to be $a_1, \ldots, a_8$, the text $a_1a_2a_3a_4a_5a_6a_7a_8=20033120$ is modified according to the structure of the permutation $P_3=(1, 2)(3, 4)(5, \delta)(7, 8)$, and according to the counter state $s_3=s_2+1 \pmod{2^{16}}=21032110+1=21032111$. Then $x_1=2, x_2=1, x_3=0, x_4=3, x_5=2, x_6=1, x_7=1, x_8=1$.

$\delta_{B,3}((a_1,\ldots,a_8),(x_1,\ldots,x_8))=(a'_1,\ldots,a'_8)$, where $a'_1=\delta(a_1,\delta(a_2,x_2))=\delta(2,\delta(0,1))=\delta(2,3)=2,$ $a'_2=\delta(a_2,\delta(a'_1,x_1))=\delta(0,\delta(2,2))=\delta(0,0)=1,$ $a'_3=\delta(a_3,\delta(a_4,x_4))=\delta(0,\delta(3,3))=\delta(0,3)=0,$ $a'_4=\delta(a_4,\delta(a'_3,x_3))=\delta(3,\delta(0,0))=\delta(3,1)=2,$ $a'_5=\delta(a_5,\delta(a_6,x_6))=\delta(3,\delta(1,1))=\delta^-(3,0)=0,$ $a'_6=\delta(a_6,\delta(a'_5,x_5))=\delta(1,\delta(0,2))=\delta(1,2)=3,$ $a'_7=\delta(a_7,\delta(a_8,x_8))=\delta(2,\delta(0,1))=\delta(2,3)=2,$ $a'_8=\delta(a_8,\delta(a'_7,x_7))=\delta(0,\delta(2,1))=\delta(0,1)=3.$ Let us choose the obtained values $a'_1, \ldots, a'_8$ to be $a_1, \ldots, a_8$, and modify the text $a_1a_2a_3a_4a_5a_6a_7a_8=21020323$ according to $s_4=s_3+1 \pmod{2^{16}}=21032111+1=21032112$ (interpreted as a quaternary number system counter state). Then $x_1=2, x_2=1, x_3=0, x_4=3, x_5=2, x_6=1, x_7=1, x_8=2$. Let us determine the subsequent values as follows (see example 1):

Let us define the automaton $B=(A^8, X^8, \delta_B)$ (see example 1) such that for any $(a_1, \ldots, a_8) \in A^8$, $(X'_1, \ldots, x'_8) \in X^8$ $\delta_B((a_1, \ldots, a_8),(x_1, \ldots, x_8))=(a'_1, \ldots, a'_8)$, where $a'_1=\delta(a_1,\delta(a_2,\ldots,\delta(a_8,x_1)\ldots)),$ $a'_2=\delta(a_2,\delta(a'_1,\delta(a_3,\ldots,\delta(a_8,x_2)\ldots))),$ $a'_3=\delta(a_3,\delta(a'_1,\delta(a'_2,\delta(a_4,\ldots,\delta(a_8,x_3)\ldots)))),$ $\ldots,$ $a'_8=\delta(a_8,\delta(a'_1,\delta(a'_2,\ldots,\delta(a'_7,x_8)\ldots))).$ Then (with $a_1 a_2a_3a_4a_5a_6a_7a_8=21020323$ and $x_1 x_2 x_3 x_4 x_5 x_6 x_7 x_8=21032112$)

$a'_1=\delta(a_2,\delta(a_3,\delta(a_4,\delta(a_5,\delta(a_6,\delta(a_7,\delta(a_8,x_1)))))))=\delta(2,\delta(1,\delta(0,\delta(2,\delta(0,\delta(3,\delta(2,\delta(3,2))))))))=\delta(2,\delta(1,\delta(0,\delta(2,\delta(0,\delta(3,\delta(2,1)))))))=\delta(2,\delta(1,\delta(0,\delta(2,\delta(0,\delta(3,1))))))=\delta(2,\delta(1,\delta(0,\delta(2,\delta(0,2)))))=\delta(2,\delta(1,\delta(0,\delta(2,2))))=6(2,\delta(1,\delta(0,0)))=\delta(2,\delta(1,1))=\delta(2,0)=3,$ $a'_2=\delta(a_2,\delta(a'_1,\delta(a_3,\delta(a_4,\delta(a_5,\delta(a_6,\delta(a_7,\delta(a_8,x_2)))))))) = \delta(1,\delta(3,\delta(0,\delta(2,\delta(0,\delta(3,\delta(2,\delta(3,1)))))))) = \delta(1,\delta(3, \delta(0,\delta(2,\delta(0,\delta(3,\delta(2,2))))))) = \delta(1,\delta(3,\delta(0,\delta(2,\delta(0,\delta(3,(3,0)))))))=\delta(1,\delta(3,\delta(0,\delta(2,\delta(0,0)))))=\delta(1,\delta(3,\delta(0,\delta(2,1))))=\delta(1,\delta(3,\delta(0,1)))=\delta(1,\delta(3,3))=\delta(1,3)=1,$ $a'_3=\delta(a_3,\delta(a'_1,\delta(a'_2,\delta(a_4,\delta(a_5,\delta(a_6,\delta(a_7,\delta(a_8,x_3)))))))) = \delta(0,\delta(3,\delta(1,\delta(2,\delta(0,\delta(3,\delta(2,\delta(3,0))))))))=\delta(0,\delta(3,\delta(1,\delta(2,\delta(0,\delta(3,\delta(2,0)))))))=\delta(0,\delta(3,\delta(1,\delta(2,\delta(0,\delta(3,3))))))=\delta(0,\delta(3,\delta(1,\delta(2,\delta(0,3)))))=\delta(0,\delta(3,\delta(1,\delta(2,0))))=\delta(0,\delta(3,\delta(1,3)))=\delta(0,\delta(3,1))=\delta(0,2)=2,$ $a'_4=\delta(a_4,\delta(a'_1,\delta(a'_2,\delta(a'_3,\delta(a_5,\delta(a_6,\delta(a_7,\delta(a_8,x_4))))))))= \delta(2,\delta(3,\delta(1,\delta(2,\delta(0,\delta(3,\delta(2,\delta(3,3)))))))) = \delta(2,\delta(3,\delta(1,\delta(2,\delta(0,\delta(3,\delta(2,3)))))))=\delta(2,\delta(3,\delta(1,\delta(2,\delta(0,\delta(3,2))))))=\delta(2,\delta(3,\delta(1,\delta(2,\delta(0,1)))))=\delta(2,\delta(3,\delta(1,\delta(2,3))))=\delta(2,\delta(3,\delta(1,2)))=\delta(2,\delta(3,3))=\delta(2,3)=2,$ $a'_5=\delta(a_5,\delta(a'_1,\delta(a'_2,\delta(a'_3,\delta(a'_4,\delta(a_6,\delta(a_7,\delta(a_8,x_5))))))))= \delta(0,\delta(3,\delta(1,\delta(2,\delta(2,\delta(3,\delta(2,\delta(3,2))))))))=\delta(0,\delta(3,\delta(1,\delta(2,\delta(2,\delta(3,\delta(2,1)))))))=\delta(0,\delta(3,\delta(1,\delta(2,\delta(2,\delta(3,1))))))=\delta(0,\delta(3,\delta(1,\delta(2,\delta(2,2)))))=\delta(0,\delta(3,\delta(1,\delta(2,0))))=\delta(0,\delta(3,\delta(1,3)))=\delta(0,\delta(3,1))=\delta(0,2)=2$ $a'_6=\delta(a_6,\delta(a'_1,\delta(a'_2,\delta(a'_3,\delta(a'_4,\delta(a'_5,\delta(a_7,\delta(a_8,x_6))))))))=\delta(3,\delta(3,\delta(1,\delta(2,\delta(2,\delta(2,\delta(2,\delta(3,1))))))))= \delta(3,\delta(3,\delta(1,\delta(2,\delta(2,\delta(2,\delta(2,2)))))))=\delta(3,\delta(3,\delta(1,\delta(2,\delta(2,\delta(2,0))))))=\delta(3,\delta(3,\delta(1,\delta(2,\delta(2,(2,3)))))=\delta(3,\delta(3,\delta(1,\delta(2,\delta(2,2))))=\delta(3,\delta(3,\delta(1,\delta(2,0))))=\delta(3,\delta(3,\delta(1,0)))=\delta(3,\delta(3,2))=\delta(3,1)=2$ $a'_7=\delta(a_7,\delta(a'_1,\delta(a'_2,\delta(a'_3,\delta(a'_4,\delta(a'_6,\delta(a'_6,\delta(a_8,x_7))))))))=\delta(2,\delta(3,\delta(1,\delta(2,\delta(2,\delta(2,\delta(2,\delta(3,1))))))))= \delta(2,\delta(3,\delta(1,\delta(2,\delta(2,\delta(2,\delta(2,2))))))))=\delta(2,\delta(3,\delta(1,\delta(2,\delta(2,\delta(2,0))))))=\delta(2,\delta(3,\delta(1,\delta(2,\delta(2,3)))))=\delta(2,\delta(3,\delta(1,\delta(2,2))))=\delta(2,\delta(3,\delta(1,0)))=\delta(2,\delta(3,2))=\delta(2,1)=1,$ $a'_8=\delta(a_8,\delta(a'_1,\delta(a'_2,\delta(a'_3,\delta(a'_4,\delta(a'_6,\delta(a'_6,\delta(a'_7,x_7))))))\delta(3,\delta(3,\delta(1,\delta(2,\delta(2,\delta(2,\delta(2,\delta(1,2))))))))=\delta(3,\delta(3,\delta(1,\delta(2,\delta(2,\delta(2,\delta(2,3))))))=\delta(3,\delta(3,\delta(1,\delta(2,\delta(2,\delta(2,2)))))=\delta(3,\delta(3,\delta(1,\delta(2,\delta(2,0))))=\delta(3,\delta(3,\delta(1,\delta(2,3))))=\delta(3,\delta(3,\delta(1,2)))=\delta(3,\delta(3,3))=\delta(3,3)=3.$ The scrambled value of the text 10331023 according to example 10 is therefore 31222213. Thus, this sequence will be the ciphertext (the encrypted text).

Now, let us consider the process of descrambling. The ciphertext to be descrambled will therefore be the following: 31222213. The inverse permutation automaton of the permutation automaton applied for scrambling is the following:

TABLE 7

| $\delta^{-1}$ | 0 | 1 | 2 | 3 |
|---|---|---|---|---|
| 0 | 3 | 0 | 1 | 2 |
| 1 | 1 | 2 | 3 | 0 |
| 2 | 2 | 3 | 0 | 1 |
| 3 | 0 | 1 | 2 | 3 |

In the automaton defined above, and also in the present inverse automaton, every row is a permutation of the set $\{0,1,2,3\}$. The rows of the inverse automaton can be obtained as follows:

in the header row of the $\delta$ table (Table 6) there is included the following: 0 1 2 3; and under that, the first row: 1 2 3 0 for the inverse automaton, the header row of the $\delta^{-1}$ table (Table 7) also contains the following: 0,1,2,3; and under that, in the first row of the table:

3 is shown under 0 because in the original 0 was shown under 3 in the $\delta$ table, 0 is shown under 1 because in the original 1 was shown under 0

1 is shown under 2 because in the original 2 was shown under 1

2 is shown under 3 because in the original 3 was shown under 2.

Further rows of Table 7 can be calculated based on the subsequent row of Table 6 in the same manner.

The successive states of the counter are again determined applying the formula $s_{t+1}=s_t+1 \pmod{2^{16}}$ (where the generated values are obtained as eight-digit quaternary number system numbers), and let us assume that the value of the core is identical to the value applied for scrambling, i.e., $s_0$=21032102. Counter states within the same block (that at the same time constitute a single block) are applied in a reverse order, so first the state $s_4$=21032112 is applied. Using our previous notation, $x_1$=2, $x_2$=1, $x_3$=0, $x_4$=3, $x_5$=2, $x_6$=1, $x_7$=1, $x_8$=2. Let us carry out the following calculations (in the last step, the $\delta^{-1}$ transition table—Table 7—is utilized, in the other steps, the $\delta$ transition table—Table 6—is applied). Let $a_1$=3, $a_2$=1 $a_3$=2, $a_4$=2, $a_5$=2, $a_6$=2, $a_7$=1, 1$a_8$=3 denote the last letters of the text 31222213 that was obtained as a result of the encryption process (i.e., in the last step thereof).

Then, in a manner of example 4, let us calculate the following values:

$a'_8=\delta^{-1}(a_8,\delta(a_1,\delta(a_2,\delta(a_3,\delta(a_4,\delta(a_5,\delta(a_6,\delta(a_7, x_8))))))))= \delta^{-1}(3,\delta(3,\delta(1,\delta(2,\delta(2,\delta(2,\delta(2,\delta(2,\delta(1, 2))))))))) = \delta^{-1}(3,\delta(3,\delta(1,\delta(2,\delta(2,\delta(2,\delta(2,\delta(2,3)))))))) = \delta^{-1}(3,\delta(3,\delta(1,\delta(2,\delta(2,\delta(2,2)))))) = \delta^{-1}(3,\delta(3,\delta(1,\delta(2,\delta(2,0))))) = \delta^{-1}(3,\delta(3,\delta(1,\delta(2,3)))) = \delta^{-1}(3,\delta(3,\delta(1,2))) = \delta^{-1}(3,\delta(3,3)) = \delta^{-1}(3,3)=3,$ $a'_7=\delta^{-1}(a_7,\delta(a_1,\delta(a_2,\delta(a_3,\delta(a_4,\delta(a_5,\delta(a_6,\delta(a'_8, x_7))))))))=\delta^{-1}(1,\delta(3,\delta(1,\delta(2,\delta(2,\delta(2,\delta(2,\delta(3, 1))))))))=\delta^{-1}(1,\delta(3,\delta(1,\delta(2,\delta(2,\delta(2,\delta(2,\delta(2,2))))))))= \delta^{-1}(1,\delta(3,\delta(1,\delta(2,\delta(2,\delta(2,0))))))=\delta^{-1}(1,\delta(3,\delta(1, \delta(2,\delta(2,3)))))=\delta^{-1}(1,\delta(3,\delta(1,\delta(2,2))))=\delta^{-1}(1,\delta(3,\delta (1,0)))=\delta^{-1}(1,\delta(3,2))=\delta^{-1}(1,1)=2,$ $a'_6=\delta^{-1}(a_6,\delta(a_1,\delta(a_2,\delta(a_3,\delta(a_4,\delta(a_5,\delta(a'_7,\delta(a'_8, x_6))))))))=\delta^{-1}(2,\delta(3,\delta(1,\delta(2,\delta(2,\delta(2,\delta(2,\delta(3, 1))))))))=\delta^{-1}(2,\delta(3,\delta(1,\delta(2,\delta(2,\delta(2,\delta(2,2))))))) = \delta^{-1}(2,\delta(3,\delta(1,\delta(2,\delta(2,\delta(2,0)))))) = \delta^{-1}(2,\delta(3,\delta(1, \delta(2,\delta(2,3))))) = \delta^{-1}(2,\delta(3,\delta(1,\delta(2,2)))) = \delta^{-1}(2,\delta(3,\delta (1,0))) = \delta^{-1}(2,\delta(3,2)) = \delta^{-1}(2,1)=3,$ $a'_5=\delta^{-1}(a_5,\delta(a_1,\delta(a_2,\delta(a_3,\delta(a_4,\delta(a'_6,\delta(a'_7,\delta(a'_8, x_5))))))))=\delta^{-1}(2,\delta(3,\delta(1,\delta(2,\delta(2,\delta(3,\delta(2,\delta(3, 2))))))))=\delta^{-1}(2,\delta(3,\delta(1,\delta(2,\delta(2,\delta(3,\delta(2,\delta(3,2,1))))))))=$
$\delta^{-1}(2,\delta(3,\delta(1,\delta(2,\delta(2,\delta(3,1))))))=\delta^{-1}(2,\delta(3,\delta(1,\delta (2,\delta(2,2)))))=\delta^{-1}(2,\delta(3,\delta(1,\delta(2,0))))=\delta^{-1}(2,\delta(3,\delta (1,3)))=\delta^{-1}(2,\delta(3,1))=\delta^{-1}(2,2)=0,$ $a'_4=\delta^{-1}(a_4,\delta(a_1,\delta(a_2,\delta(a_3,\delta(a'_5,\delta(a'_6,\delta(a'_7,\delta(a'_8, x_4))))))))=\delta^{-1}(2,\delta(3,\delta(1,\delta(2,\delta(0,\delta(3,\delta(2,\delta(3, 3))))))))=\delta^{-1}(2,\delta(3,\delta(1,\delta(2,\delta(0,\delta(3,\delta(2,3)))))))= \delta^{-1}(2,\delta(3,\delta(1,\delta(2,\delta(0,\delta(3,2))))))=\delta^{-1}(2,\delta(3,\delta(1, \delta(2,\delta(0,1)))))=\delta^{-1}(2,\delta(3,\delta(1,\delta(2,3))))=\delta^{-1}(2,\delta(3,\delta (1,2)))=\delta^{-1}(2,\delta(3,3))=\delta^{-1}(2,3)=2,$ $a'_3=\delta^{-1}(a_3,\delta(a_1,\delta(a_2,\delta(a'_4,\delta(a'_5,\delta(a'_6,\delta(a'_7,\delta(a'_8, x_3))))))))=\delta^{-1}(2,\delta(3,\delta(1,\delta(2,\delta(0,\delta(3,\delta(2,\delta(3, 0))))))))=\delta^{-1}(2,\delta(3,\delta(1,\delta(2,\delta(0,\delta(3,\delta(2,0))))))) = \delta^{-1}(2,\delta(3,\delta(1,\delta(2,\delta(0,\delta(3,3))))))=\delta^{-1}(2,\delta(3,\delta(1, \delta(2,\delta(0,3)))))=\delta^{-1}(2,\delta(3,\delta(1,\delta(2,0))))=\delta^{-1}(2,\delta(3,\delta (1,3)))=\delta^{-1}(2,\delta(3,1))=\delta^{-1}(2,2)=0,$ $a'_2=\delta^{-1}(a_2,\delta(a_1,\delta(a'_3,\delta(a'_4,\delta(a'_5,\delta(a'_6,\delta(a'_7,\delta(a'_8, x_2))))))))=\delta^{-1}(1,\delta(3,\delta(0,\delta(2,\delta(0,\delta(2,\delta(2,\delta(0,\delta(3, 1))))))))=\delta^{-1}(1,\delta(3,\delta(0,\delta(2,\delta(0,\delta(2,\delta(0,2)))))))= \delta^{-1}(1,\delta(3,\delta(0,\delta(2,\delta(0,\delta(2,2))))))=\delta^{-1}(1,\delta(3,\delta(0, \delta(2,\delta(0,0)))))=\delta^{-1}(1,\delta(3,\delta(0,\delta(2,1))))=\delta^{-1}(1,\delta(3,\delta (0,1)))=\delta^{-1}(1,\delta(3,3))=\delta^{-1}(1,3)=1,$ $a'_1=\delta^{-1}(a_1,\delta(a'_2,\delta(a'_3,\delta(a'_4,\delta(a'_5,\delta(a'_6,\delta(a'_7,\delta(a'_8, x_1))))))))=\delta^{-1}(3,\delta(1,\delta(0,\delta(2,\delta(0,\delta(3,\delta(2,\delta(3, 2))))))))=\delta^{-1}(3,\delta(1,\delta(0,\delta(2,\delta(0,\delta(3,\delta(2,1)))))))= \delta^{-1}(3,\delta(1,\delta(0,\delta(2,\delta(0,\delta(3,1))))))=\delta^{-1}(3,\delta(1,\delta(0, \delta(2,\delta(0,2)))))=\delta^{-1}(3,\delta(1,\delta(0,\delta(2,2))))=\delta^{-1}(3,\delta(1,\delta (0,0)))=\delta^{-1}(3,\delta(1,1))=\delta^{-1}(3,0)=2.$ As a result of this process (as in example 4) first the text 21020323 is obtained, which like before, will be denoted with $a_1 a_2 a_3 a_4 a_5 a_6 a_7 a_8$.

Thereafter, we proceed in accordance with the structure of the permutation $P_3$=(1, 2)(3, 4)(5, 6)(7, 8) and the (quaternary) counter state $s_3=s_4-1 \pmod{2^{16}}$=21032112−1=21032111 as follows: The process according to example 5 is applied to the text $a_1 a_2 a_3 a_4 a_5 a_6 a_7 a_8$=21020323 with the input signal sequence $x_1 \ldots x_8$. Let us carry out the following calculations: $((a_1, \ldots, a_8), (x_8, \ldots, x_1))=(a'_1, \ldots, a'_n)$, where $a'_2=\delta^{-1}(a_2,\delta(a_1,x_1))=\delta^{-1}(1,\delta(2,2))=\delta^{-1}(1,0)=0$ $a'_1=\delta^{-1}(a_1,\delta(a'_2,x_2))=\delta^{-1}(2,\delta(0,1))=\delta^{-1}(2,3)=2,$ $a'_4=\delta^{-1}(a_4,\delta(a_3,x_3))=\delta^{-1}(2,\delta(0,0))=\delta^{-1}(3,1)=3,$ $a'_3=\delta^{-1}(a_3,\delta(a'_4,x_4))=\delta^{-1}(0,\delta(3,3))=\delta^{-1}(0,3)=0,$ $a'_6=\delta^{-1}(a_6,\delta(a_5,x_5))=\delta^{-1}(3,\delta(0,2))=\delta^{-1}(3,2)=1,$ $a'_5=\delta^{-1}(a_5,\delta(a'_6,x_6))=\delta^{-1}(0,\delta(1,1))=\delta^{-1}(0,0)=3,$ $a'_8=\delta^{-1}(a_8,\delta(a_7,x_7))=\delta^{-1}(3,\delta(2,1))=\delta^{-1}(3,1)=0,$ $a'_7=\delta^{-1}(a_7,\delta(a'_8,x_8))=\delta^{-1}(2,\delta(0,1))=\delta^{-1}(2,3)=2.$ By concatenating the new states obtained as a result of the state transitions, the following $a_1 a_2 a_3 a_4 a_5 a_6 a_7 a_8$ string is obtained: 20033120.

Let us now choose the values $a'_1, \ldots, a'_8$ thus obtained to be $a_1, \ldots, a_8$, and let us modify the text $a_1 a_2 a_3 a_4 a_5 a_6 a_7 a_8$=20033120 according to the structure of the permutation $P_2$=(1, 3)(2, 4)(5, 7)(6, 8) and according to the next counter state $s_2=s_3-1 \pmod{2^{16}}$=21032111−1=21032110 (calculated in the quaternary number system) as follows:

First of all, the characters of the generated counter state 52 are the following: $x_1$=2, $x_2$=1, $x_3$=0, $x_4$=3, $x_5$=2, $x_6$=1, $x_7$=1, $x_8$=0. Then $\delta_{B,2}((a_1, \ldots, a_8), (x_1, \ldots, x_8))=(a'_1, \ldots, a'_8)$, where $a'_3=\delta^{-1}(a_3,\delta(a_1,x_1))=\delta^{-1}(0,\delta(2,2))=\delta^{-1}(0,0)=3,$ $a'_1=\delta^{-1}(a_1,\delta(a'_3,x_3))=\delta^{-1}(2,\delta(3,0))=\delta^{-1}(2,0)=1,$ $a'_4=\delta^{-1}(a_4,\delta(a_2,x_2))=\delta^{-1}(3,\delta(0,1))=\delta^{-1}(3,3)=3,$ $a'_2=\delta^{-1}(a_2,\delta(a'_4,x_4))=\delta^{-1}(0,\delta(3,3))=\delta^{-1}(0,3)=0,$ $a'_7=\delta^{-1}(a_7,\delta(a_5,x_5))=\delta^{-1}(2,\delta(3,2))=\delta^{-1}(2,1)=3,$ $a'_5=\delta^{-1}(a_5,\delta(a'_7,x_7))=\delta^{-1}(3,\delta(3,1))=\delta^{-1}(3,2)=1,$ $a'_8=\delta^{-1}(a_8,\delta(a_6,x_6))=\delta^{-1}(0,\delta(1,1))=\delta^{-1}(0,0)=3,$ $a'_6=\delta^{-1}(a_6,\delta(a'_8,x_8))=\delta^{-1}(1,\delta(3,0))=\delta^{-1}(1,0)=0.$ By concatenating the new states obtained as a result of the state transitions, the following $a_1a_2a_3a_4a_5a_6a_7a_8$ string is obtained: 10331033. Finally, as with the above, the obtained text 10331033 is modified according to the structure of the permutation $P_1=(1, 5)(2, 6)(3, 7)(4, 8)$, and according to the counter state $s_1=s_2-1 \pmod{2^{16}}=21032110-1=21032103$ (calculated in the quaternary system).

First of all, the characters of the generated counter state Si are the following: $x_1=2, x_2=1, x_3=0, x_4=3, x_5\times2, x_6=1, x_7=0, x_8=3$. Then $a'_5=\delta^{-1}(a_5,\delta(a_1,x_1))=\delta^{-1}(1,\delta(1,2))=\delta^{-1}(1,3)=1,$ $a'_6=\delta^{-1}(a_6,\delta(a_2,x_2))=\delta^{-1}(0,\delta(0,1))=\delta^{-1}(0,3)=0,$ $a'_7=\delta^{-1}(a_7,\delta(a_3,x_3))=\delta^{-1}(3,\delta(3,0))=\delta^{-1}(3,0)=2,$ $a'_8=\delta^{-1}(a_8,\delta(a_4,x_4))=\delta^{-1}(3,\delta(3,3))=\delta^1(3,3)=3,$ $a'_1=\delta^{-1}(a_1,\delta(a'_5,x_5))=\delta(1,\delta(1,2))=\delta(1,3)=1,$ $a'_2=\delta^{-1}(a_2,\delta(a'_6,x_6))=\delta^{-1}(0,\delta(0,1))=\delta^{-1}(0,3)=0,$ $a'_3=\delta^{-1}(a_3,\delta(a'_7,x_7))=\delta^{-1}(3,\delta(2,0))=\delta^{-1}(3,3)=3,$ $a'_4=\delta^{-1}(a_4,\delta(a'_8,x_8))=\delta^{-1}(3,\delta(3,3))=\delta^{-1}(3,3)=3.$ By concatenating the new states obtained as a result of the state transitions, the following $a_1a_2a_3a_4a_5a_6a_7a_8$ string is obtained: 10331023. The original text has thus been restored.

Converting this text, as a quaternary string value, into the hexadecimal system, the value 4F4B, the ASCII code of the word "OK", is obtained. The starting text "OK" has thereby been restored.

In the following, a comparison of the invention with certain approaches included in the prior art is disclosed.

Due to its structure based on stream encryption—namely, the text to be encrypted is transformed applying strings obtained as pseudorandom numbers—, the cryptosystem mentioned in the Hungarian patent application P1700499 described in the introduction differs to a great extent from the structure of the block encryption solution (and solutions with other purpose) provided according to the invention. According to the character-based encryption, blocks of the text to be encrypted are not considered, so the requirement that itself and at least one further character component are needed for transforming each character (cf. the basic requirement of the invention, see above) cannot be fulfilled in any case. This, and also that—accordingly—scrambling is not applied in this prior art solution, is due to the applied stream encryption method.

Furthermore, a significant difference of the approach of P1700499 from the solution according to the invention is that for encryption and decryption it applies pseudorandom numbers, and utilizes a pseudorandom number generator for the input signal.

One of the technical improvements of the invention with respect to cryptosystems based on automata systems is that the solution included in the present description involves generating only a single true random or pseudorandom number that is needed for randomly setting the core of the counter method and apparatus (i.e., such a number is not applied regularly in the course of the scrambling steps, but exclusively for generating the core). Further advantages related to this have already been addressed referring to the document P1700499.

In an embodiment, therefore, the input signal character block is not a cryptographically secure pseudorandom character block (typically a pseudorandom number; but by generalization this is stated in respect of any character set) generated by a pseudorandom character block generator (typically, pseudorandom number generator). This is to mean that it can be anything else than pseudorandom numbers.

Number sequences generated by a counter cannot be considered pseudorandom, because the difference between two successive members of such a number sequence is constant (with very few exceptions), these very few exceptions occurring cyclically (periodically, at the end of a cycle). Therefore, the number sequence generated by the counter cannot be considered pseudorandom; the difference between successive members of the number sequence provided by the counter is constant, typically one (although other constants are also possible, i.e., the counter can be stepped with a positive integer greater than one, and any numeric system can be applied).

Thus, by this requirement preferably applied according to the invention is used to express that the character sequence in question is not generated by a pseudorandom character block generator, but by a much simpler counter apparatus that has the same operating principle as for example the odometer of a car.

By excluding pseudorandom number generators, a well-defined type of character strings is excluded; naturally, the term "pseudorandom number" here refers to any and all pseudorandom block generated in a pseudorandom manner.

The reason of the above phrasing in this preferable feature (i.e., it is not a pseudorandom character block generated by a pseudorandom character block generator) is that thereby the range (coverage) of the excluded character blocks is defined. For the sake of simplicity, the explanation included below involves pseudorandom numbers, however, it can be generalized to an arbitrary pseudorandom character block.

Whether a given character block (character sequence) is a pseudorandom number generated by a pseudorandom number generator can be verified by means of a number of test methods. These tests are typically based on retrieving a larger-sized number sequence (thus, the tests also require retrieving further character blocks in addition to the character block being tested, because pseudorandomness cannot be verified if only a single character block is available, but can naturally be established for a sequence of character blocks (a single character sequence can be anything)).

The most frequently applied one of these testing methods is the so-called NIST test (see Andrew Rukhin et al.: A Statistical Test Suite for Random and Pseudorandom Number Generators for Cryptographic Applications. National Institute of Standards and Technology Special Publication 800-22 revision 1 a Natl. Inst. Stand. Technol. Spec. Publ. 800-22rev1a, 131 pages (April 2010)), which applies various mathematical tests for deciding whether or not the number sequence received as input can be mathematically (in a mathematical-statistical sense) regarded as a cryptographically secure pseudorandom number sequence (pseudorandom character sequence). This can also be tested applying other similar tests that are also aimed at assessing whether the members of a number sequence are cryptographically secure pseudorandom numbers. In the present patent description, hereinafter those number sequences are called pseudorandom character blocks (or, in several places, pseudorandom numbers) that pass these types of tests. So, such cryptographically secure pseudorandom character blocks (cryptographically secure pseudorandom numbers) are preferably not applied, i.e., in an embodiment the use of such blocks is excluded.

In the NIST test and similar tests, therefore multiple presumed pseudorandom number sequences obtained from the same generator are tested; the minimum number of such sequences checked in a given test is expediently a predetermined value. If, therefore, the pseudorandom nature of a character block is to be verified, other character blocks generated by the same generator must also be retrieved (this is feasible because a generator always corresponds to such blocks), and the entire number sequence must be tested.

As it is also shown by the examples, the input signal character block can be generated by a counter (example 7) a fixed character sequence that is preferably explicitly not a pseudorandom number (this value is typically not secret, so it would not make sense to apply stepping or pseudorandom numbers, example 8) or the text itself that is utilized for hash generation (example 9).

By excluding pseudorandom numbers from the input signal character block in such a manner, it is made sure that pseudorandom numbers do not enter the scrambling operation at the utilization of input signal character blocks, i.e., pseudorandom numbers are not applied regularly (i.e., in every cycle). Thereby, according to this embodiment, there is a protection against attacks based on pseudorandom numbers. The cores can be generated applying pseudorandom numbers (this is not excluded in the present embodiment).

In relation to U.S. Pat. No. 10,419,207 that was also referenced in the introduction it is noted that—in addition to its different operating principle—the composition of automata included therein is also different from the structure applied in the present application in that it comprises a pseudorandom number generator, the input signals are pseudorandom numbers generated by the pseudorandom number generator, like in the patent description P1700499. Expediently, in case of the apparatus according to the invention it is not necessary to generate pseudorandom numbers in the cycles of the encryption process, and therefore the invention is preferably immune to attacks against pseudorandom number generators.

A comparison between the approach taken by U.S. Pat. No. 10,419,207 and the present invention is summarized in the following main points: U.S. Pat. No. 10,419,207 does not apply scrambling in the sense it is applied in the present invention, while—also in accordance with the applied compositions of automata—in the document different operations are applied also on the elementary level, i.e., XOR operations are applied for a transition in one of the states. It can be determined that in U.S. Pat. No. 10,419,207 at least two input signal character components are involved in each elementary transition (in the present invention strictly a single one), while, in line with the different approach also including XOR operations, there are also differences in the structure of the state components taken into account. From the aspect of the invention, this different approach has the benefit—also according to the compositions of automata applied in U.S. Pat. No. 10,419,207—that in the approach taken by the invention it is sufficient to apply a much smaller key size in order to attain the desired level of security. This aspect is also highlighted by the comparison included below.

It is noted that, in addition to this great advantage, in the cited patent description U.S. Pat. No. 10,419,207 the transition tables of the component automata constitute Latin cubes, while the base automata controlling the scrambler automata included in the present application are preferably permutation automata, or their transition matrices preferably constitute Latin squares. Compared to the approach involving Latin cubes, this solution is advantageous in that it has much lower storage demand (depending on the design, 65 kilobytes or only 256 bytes as opposed to 16 megabytes). This has the direct consequence that in the case of the present solution the time required for key exchange and the storage demand of a typical asymmetrical key exchange operation is one or two orders of magnitude smaller than in the approach of the patent description U.S. Pat. No. 10,419,207.

Storage of large-sized keys (a few megabytes or even a few hundreds of megabytes) does not really pose a problem for modern information technology devices. What poses a problem, though, is that key exchange is typically implemented utilizing an asymmetric cryptosystem, and such systems are much slower (even by a factor of 250, in the example below, by a factor of 272) than symmetric systems (in our case, the key is the transition table of the key automaton plus the counter core, i.e., the initial state of the counter).

In the case of the RSA-1024 asymmetric cryptosystem, according to the performance of an average-speed laptop as many as 200 RSA signatures per second can be done (see for example: https://developers.cloudflare.com/ssl/keyless-ssl/scaling-and-benchmarking).

If a small 16×16×16 Latin cube were to be transmitted at a speed of 200 RSA-1024 signatures per second (Rivest-Shamir-Adleman process: an open key encryption algorithm), then it would take approximately 0.16 second (in a not-compressed form), while transmitting a 16×16 matrix (like the one applied in the preferred Latin square case according to the invention) would only take 0.01 second (or, if a piece of data is stored in half-byte, then the transmission would take only 0.08 or 0.005 seconds, respectively).

$$16\times16\times16\times8/(1024\times200)=0.16\ 0.16/16=0.01$$

In the first formula, the factor $16^3$ is included because of the Latin cube (the factor 8 is included because bits are counted), while in the second formula the division by 16 is included because therein a Latin square is applied.

With a larger Latin cube having a size of 256×256×256, it would take 655 seconds and 2.5 seconds, respectively.

$$256\times256\times256\times8/(1024\times200)=655\ 655/256=2.5$$

In case of mobile phone communication, a key exchange process that is longer than 4-5 seconds is not realistic. Accordingly, the invention can be preferably applied for implementing such a key exchange that can be suitable for such (and of course similar) applications even with particularly large key sizes.

In relation to U.S. Pat. No. 10,419,207 it is also important to note that in the invention the states of the base automaton are changed to be further input signals of a base automaton without any transformations. Such a feature is not included in the U.S. Pat. No. 10,419,207. Namely, in that document the following state transition is included:

$$a'_i = \delta(a_i, \varphi_i(a_1, a_2, \ldots, a_n, (x_1, \ldots, x_n)),$$

where $\varphi_i$ is the so-called feedback function that is adapted to transform the vector $(a_1, a_2, \ldots, a_n, (x_1, \ldots, x_n))$ into an input signal of the base automaton, wherein each of the first n components of this vector $(a_1, a_2, \ldots, a_n, (x_1, \ldots, x_n))$ is a base automaton state, and the last component thereof is an input signal vector with n components that is an input signal of the entire composition of automata. In U.S. Pat. No. 10,419,207 such types of feedback function are applied that depend on two state components and two input signal components, namely, functions that can be written as $((a_j \oplus x_j), x_i)$, where $a_j$ is a component of a state vector $(a_1, a_2, \ldots, a_n)$, with $x_i$ and $x_j$ being two components of an input signal vector $(x_1, \ldots, x_n)$.

Suggested realizations of the apparatuses implementing the above-described methods, i.e., their embodiments and examples thereof are described hereinafter referring to FIGS. 2-5 (these are, therefore, embodiments as well as examples according to their introduction even where it is not explicitly indicated). In relation to FIGS. 2-5 it is noted that the illustrations of the particular embodiments are harmonized, with their common components being located at the same place in all figures.

FIG. 2 shows a block cipher (encryption apparatus; implemented applying a first scrambler apparatus 1a that preferably has a microcontroller as its main component, see also below), with a counter module 11 (or simply: counter) in a program memory 2 thereof as an input module 8 (external apparatus), the counter module is adapted for generating counter values when being started from a counter core 15 stored in a data memory 3 (for example, being started from a random number, the values are incremented by one, modulo the cycle length of the counter, see also above)

The scrambler module 13 is (i.e., comprises, is implemented by) a scrambler automaton that forms a part of a block encryption module 100. The scrambler module 13 and the descrambler module 14 are shown such that they form parts of a larger module—for example, in FIG. 2, of the block encryption module 100. This is to illustrate that such an entity takes part in processing the data arriving from the input module 8, passing them on to the scrambler module 13, and preparing the data fed to the output module 7 which entity is adapted for serving the scrambler module 13, preparing it to compile the data according to the given task and to output the appropriate data (for example, in the case of a hash this involves a specific task of assigning a single output data to a longer text). Other illustration is also conceivable for this.

During operation, the plaintext is received by the scrambler module 13 divided into blocks of a given length by a block maker module 9 (in alternative terms: block generating device, module, or apparatus; these terms can also be used for other components), with the scrambler module 13 setting the plaintext blocks thus produced as states of the scrambler automaton. The scrambler module 13 passes on to the output module 7 the state into which its scrambler automaton transitions under the effect of the counter state sequence arriving from the counter from the state with a value that is identical to the value of the subsequent plaintext block (i.e., the block it has just received from the block maker module 9).

In FIG. 3, a block decipher (decryption apparatus; that is realized utilizing a descrambler apparatus 1b preferably implemented by a microcontroller) is shown, in which apparatus—unlike the configuration of the apparatus of FIG. 2—the descrambler module 14 (bit recovery module) provides the input of an output module 7 (output generator module) performing the role of an external apparatus. The included descrambler module 14 is (i.e. is implemented by) a descrambling/bit recovery automaton. Of course, the input module 8 and the block maker module 9 are implemented much like in FIG. 2, because the block decipher receives the blocks to be deciphered also in this case.

During the operation of the apparatus the block-encrypted ciphertext received as input is converted into plaintext blocks by a recovery automaton of the descrambler module 14 of a block recovery module 110, and passes it on to the output module 7 such that the subsequent (i.e., initially, the first) plaintext block will be that state of the recovery automaton into which state the recovery automaton is taken from the state corresponding to the encrypted block under the effect of the signal sequence received from the counter.

FIG. 4 shows a counter-based pseudorandom number generator (realized utilizing a second scrambler apparatus 1c that is preferably implemented by a microcontroller), comprising a counter module 11 that generates counter values starting from a counter core 15 (that are values incremented by one, modulo the cycle length of the counter). As with the cipher (encryption apparatus), the counter core 15 is also included in this example related to pseudorandom number generation, however, in a different role (in line with the role performed by the counter; in the case of encryption, the counter provides the input signal, while in pseudorandom number generation it is applied for incrementing the core).

Also, the scrambler module 13 of a pseudorandom number generator module 120 operates (is implemented) as a generator automaton. The data memory 3 is connected to this generator module 120, with the data memory being adapted for providing a first predetermined input block sequence 18 of the generator automaton to the generator module.

During the operation, simultaneously with reading in the subsequent (i.e., initially, the first) value of the counter module 11, the generator module 120 reads in the value of a scrambler core 17 from the data memory 3, and passes on to the output module 7 the state thereof into which it transitions from the state identical to the read-in counter value under the effect of the scrambler core 17 as an input signal. The scrambler core is preferably fixed ("factory fixed", i.e., is predetermined for each operation session), and is characteristic of the apparatus; it can even be public. The counter core is preferably secret.

FIG. 5 shows a cryptographic hash value generator (this is implemented by a third scrambler apparatus 1d that is preferably also implemented by a microcontroller), in which generator the input text is divided into blocks by the external apparatus 8, and is passed on block-by-block to a transformer (hash generator) module 130, with the scrambler module 13 of the transformer module 130 being operated (i.e., implemented) as a transformer automaton.

This apparatus operates such that the transformer module 130, starting from a fixed, second predetermined input block 16 (initial state), transitions into the state into which the subsequent (i.e., initially, the first) data block arriving from the external apparatus 8 as an input signal takes it. At the end of this process, the result of the state transition occurring after reading in the last data block (arriving as an input signal) is fed to the output module 7 as the hash value of the document.

Finally, it has to be noted that in the case of the automata applied in the block encryption module 100, the block recovery module 110, the generator module 120, and the transformer module 130, the size of the transition matrix of the base automaton is preferably 16×16 or 256×256. Thus, the storage space required for storing each state (and the input signal) of the base automaton is half a byte and one byte in the first and the second case, respectively. Therefore, the storage space required for storing the transition matrix of the base automaton is 128 bytes and 64 kilobytes in the first and the second case, respectively.

The implementation of the apparatus and method according to the invention is illustrated below by an example. Basically, the invention can be implemented on a computer that has sufficient computing and storage capacity. Storage of input data, intermediate values, and, optionally, output data is required, and the calculations related to the transitions have to be carried out, for which the values stored in memory have to be modified.

For illustration purposes, a distinction is made below between a program memory 2 (this function can be performed by the computer's RAM [random access memory]) and a data memory 3 (this can be any—conventional—storage module). Other terms could also be used to refer to these memory modules, i.e., they could also even be called "first" and "second" memory.

Particular blocks of the embodiments illustrated in FIGS. 2-5 can for example be implemented applying the following products.

In an example, the block encryption module 100, the block recovery module 110, the (pseudorandom number) generator module 120, and the transformer module 130 (i.e., the automata thereof) are operated by a Microchip PIC32MX795F512L microcontroller (see in the figure where these modules are shown on the microcontroller, on which the scrambler and descrambler apparatuses are implemented, i.e., the outermost box with rounded corners; of course, other type microcontroller can also be applied).

The microcontroller has 512 kilobytes of integrated flash program memory 2 equipped with 3 kilobytes of boot flash memory (or other type of program memory), and 128 kilobytes of SRAM data memory 3 (or other type of data memory).

A buffer memory 19 adapted for storing the plaintext and ciphertext components (it typically stores the cryptographic hash value of the partial document that has been read in) and a processing data memory 20 (processing working data memory) required for storing processing data are arranged in the data memory 3.

In an example, a controller 6 with a trade name FullSpeed USB (controlled via the USB input; other types of controller can also be applied), integrated in the microcontroller can be included; utilizing this peripheral module a communications channel compliant to the USB HID (Human Interface Devices) standard can be set up. For buffering input and output data, in an example two 1 Mbit SRAM memory modules of the type 23LC1024 (data buffer 5) are connected to the microcontroller via 4 SPI buses.

This configuration is similar to the approach applied in the patent description U.S. Pat. No. 10,419,207 and in the patent application P1700499, because the present apparatus can also be realized on a similar platform. Like in approach of the patent application P1700499, in an example, a member of the PIC32MX microcontroller family with higher memory capacity, the microcontroller PIC32MX795F512L (512 kilobytes of program memory and 128 kilobytes of data memory) is applied as a microcontroller. Thereby, such an apparatus is obtained that has higher operating speed, yet can be implemented easily. A significant difference is that according to this configuration, the role and operation of the built-in components is significantly different from both the approach applied in the patent description U.S. Pat. No. 10,419,207 and the one included in the patent application P1700499.

As it was mentioned previously, it is also advantageous if the transition matrix of the base automaton of the scrambler automaton according to the present application constitutes a Latin square, because thereby the systems utilizing it will become highly immune against statistical attacks. It can be proven that in case the base automaton is a permutation automaton, then the scrambler automata and the inverse automata thereof will also be permutation automata. However, to provide protection against statistical attacks it is expedient to assume that the transition matrix of the base automaton constitutes a Latin square, or at least that the base automaton is a permutation automaton.

In the various embodiments (cf. FIGS. 2-5), the execution module implemented by a microcontroller interprets the operation of the following apparatuses:

1. For block encryption—see FIG. 2—a scrambler module 13 utilizing a scrambler automaton is connected to the output of the block maker module 9, with the text (converted to blocks) received as an input being transformed into the block encrypted ciphertext utilizing the scrambler automaton, which is followed by feeding the result to the output module 8. The block length of both the plaintext (divided into blocks) and the ciphertext is preferably 16 bytes (these have identical length).

2. In case of block deciphering—see FIG. 3—the block encrypted ciphertext is received directly by the recovery automaton of the descrambler module 14 (i.e., the so-called descrambler automaton) and is converted back into plaintext by said automaton.

3. For an application of a counter-based pseudorandom number generator—see FIG. 4—the following preferred solution is expediently applied: Let us consider for a suitable n, with preferably $n \in \{16, 32, 64, 128, 256, 512, 1024, 2048\}$ a suitable generator automaton $B=(A^n, A^n, \delta_B)$, with a counter-based pseudorandom number generator being configured as follows (in relation to this, we refer to the formal introduction of the counter-based pseudorandom number generator included above, where the meaning of the notations and the functions are specified).

In the following, a pseudorandom number generator is presented; the corresponding introduction is included in the part above example 7. Let $G=(K, Z_J, S, f, U, g)$ be a counter-based pseudorandom number generator, where $K=S=U=\{0, \ldots, 255\}^n$, that is, K, S, U are n-dimension vectors with component values between 0 and 256, and n is the counter size in bytes, where the value of n is one of the following: 16, 32, 64, 128, 256; and J is a divisor of n ($Z_J=\{0, \ldots, J-1\}$), $f(0, \ldots, 0)=(0, \ldots, 0, 1), \ldots, f(0, \ldots, 0, 254)=(0, \ldots, 0, 255), f(0, \ldots, 255)=(0, \ldots, 0, 1, 0), f(0, \ldots, 0, 1, 0)=(0, \ldots, 1, 1), f(0, \ldots, 0, 1, 1)=(0, \ldots, 2), \ldots, f(0, \ldots, 0, 255, 254)=(0, \ldots, 0, 255, 255), f(0, \ldots, 0, 255, 255)=(0, \ldots, 0, 1, 0, 0), \ldots, f(255, \ldots, 255, 254)=(255, \ldots, 255), f(255, \ldots, 255)=(0, \ldots, 0)$, and for any $(a_1, \ldots, a_n) \in S$, $(x_1, \ldots, x_n) \in K$, $j \in Z_J$ $g((x_1, \ldots, x_n), j, (a_1, \ldots, a_n))=\delta_{Bj}((a_1, \ldots, a_n), (x_1, \ldots x_n))$, where $\delta_{Bj}((a_1, \ldots, a_n), (x_1, \ldots, x_n))$, is the j-the partial vector, of a dimension n/(8J), of the state vector $\delta_B((a_1, \ldots, a_n), (x_1, \ldots, x_n))$. (If J=1, then $Z_J=\{0\}$, and in such a case it is clear that with (j=0) $\delta_{B,j}((a_1, \ldots, a_n), (x_1, \ldots, x_n)) = \delta_B((a_1, \ldots, a_n), (x_1, \ldots, x_n))$.

The generator automaton is therefore preferably a scrambler automaton. At the start of the operation of the apparatus and structure, a value $s_0 \in S$ is specified as the core of the transition function, with a value $k \in K$ being specified as the core of the output function. By applying the function f, the state sequence $s_1, s_2, \ldots$ is obtained, where $s_n = f(s_{n-1})$, $n = 1, 2, \ldots$, while the pseudorandom number sequence $r_1, r_2, \ldots$ can be obtained with the help of the function g, where $r_{(n-1) \cdot J + j} = g(k, j, s_n)$. After generating a state $s_n$, therefore, a string consisting of the partial strings $g(k, 0, s_n), g(k, 1, s_n), \ldots, g(k, J-1, s_n)$ is generated in the output module, with the next pseudorandom number sequence $g(k, 0, s_n), g(k, 1, s_n), \ldots, g(k, J-1, s_n)$ being generated at the output of the output module as a division of said string. As it was mentioned, it is possible that J=1. In such a case, the key k and the state $s_n$ determine a single pseudorandom number $g(k, 0, s_n)$. A counter-based pseudorandom number generator constructed applying a scrambler automaton as a generator automaton is shown in FIG. 4.

Using the fact that the scrambler automaton constituted by the generator automaton is a permutation automaton it can be proven that the disclosed counter-based random number generator is a full-period generator. In this case, therefore, the period length of the counter-based pseudorandom number generator discussed in the present application is identical to the product of the storage demand (in bytes) of a single state of the scrambler automaton and the number of states, which length, if a scrambler automaton of a suitable size is applied, can be $16 \cdot 2^{128} = 2^{132}$, or $32 \cdot 2^{256} = 2^{261}$, or $64 \cdot 2^{512} = 2^{518}$, or $128 \cdot 2^{1024} = 2^{1031}$, or even longer than that.

4. For generating a cryptographic hash value scrambler automaton of a similar type is applied as for generating a pseudorandom number. The exemplary cryptographic apparatus (and method) for generating a cryptographic hash value that is illustrated in FIG. 5 can be utilized for determining the cryptographic hash values of documents. A document is read in by the input module 8 of the cryptographic apparatus in question one block (wordpart) at a time having a given length, with the cryptographic hash value of the document appearing at the output module 7 after the completion of the cryptographic hash generation method. Because the literature on the prior art shows that there are no methods and apparatuses for generating a cryptographic hash value that are based on automata theory, we cannot compare the present apparatus with such apparatuses. A clear advantage of the present method and apparatus for generating a cryptographic hash value with respect to other methods and apparatuses for generating a cryptographic hash value is that it has a different operating principle, so attacks of the usual types are ineffective against it.

For characterising the invention, the following points are given that define further embodiments. Paragraph 1 below is to be taken to include other features of the invention that are not explicitly mentioned therein, while certain features given in Paragraph 1 can be made to correspond to certain features of the invention. Further subpoints add other optional features to the embodiments according to the cross-references between the paragraphs.

1. An automaton-based scrambler (bitmixer) method for preparing the transmission of a data signal block, and for transforming the characteristics thereof such that they resemble the characteristics of a random signal block, wherein the scrambler (bitmixer) automaton is set to the state thereof that is identical to the data signal block, with an input signal sequence identical to the scrambling signal block being fed to the automaton in this state, and the scrambled data signal block will be a signal block identical to that state of the scrambler automaton into which the scrambler automaton transitions from a predetermined state under the effect of the predetermined input signal sequence.

2. An automaton-based descrambler method for recovering a scrambled (bitmixed) data signal block, wherein the descrambler (bit recovery) automaton is set to the state thereof that is identical to the scrambled (bitmixed) data signal block, and an input signal sequence of which the mirror image is identical to the scrambler (bitmixer) signal block is fed to the descrambler automaton in this state, the scrambled data signal block being generated utilizing the method according to paragraph 1, and the scrambler signal block applied therefor being the same as the scrambler signal block applied in paragraph 1, and the restored signal block is a signal block identical to that state of the descrambler automaton into which the descrambler automaton transitions from a adjusted state under the effect of the adjusted input signal sequence.

3. A symmetric key block encryption cryptographic method for encrypting a plaintext, consisting of the steps of reading in the plaintext to be encrypted via an input-output data buffer (temporary data storage 5), and performing encryption utilizing a scrambler automaton, wherein the counter module 11 (apparatus) is applied for sending, as an input signal sequence, a subsequent number sequence of a given length determined by a counter core 15 to the subsequent plaintext block, the transition matrix of the base automaton of the scrambler automaton, constituting a Latin square, is stored in the data memory 3, and the scrambler automaton is a permutation automaton without output signal, furthermore, in the course of the encryption of the subsequent block of the plaintext the number sequence generated by the counter is passed on to the scrambler automaton 13 as an input signal sequence, the scrambler automaton is applied for generating the subsequent block of the ciphertext that will be identical to the last element of that state sequence of the scrambler automaton into which the scrambler automaton transitions under the effect of the number sequence—as an input signal sequence—that is generated by the counter module 11 (counter), starting from the state that is identical to the subsequent plaintext block read in from the input-output data buffer.

4. A symmetric key block encryption cryptographic method for deciphering a ciphertext, said ciphertext being encrypted applying the method according to paragraph 3, the method consisting of the steps of reading in the ciphertext to be deciphered via an input-output data buffer, and performing deciphering utilizing a recovery automaton wherein the counter module 11 is applied for sending, as an input signal sequence, the mirror image of a subsequent number sequence of a given length determined by a counter core 15 to the subsequent ciphertext block, the transition matrix of the base automaton of the recovery automaton, constituting a Latin square, is stored in the data memory 3, and the recovery automaton is a permutation automaton without output signal, while in the course of the encryption of the subsequent block of the plaintext the number sequence generated by the counter is passed on to the recovery automaton as an input signal sequence, the deciphering automaton is applied for generating the subsequent block of the deciphered text that will be identical to the last element of that state sequence of the deciphering automaton into which the deciphering automaton transitions under the effect of the mirror image of the number sequence—as an input signal sequence—that is generated by the counter, starting from the state that is identical to the subsequent ciphertext block read in from the input-output data buffer.

5. A counter-based cryptographic method for generating pseudorandom numbers, consisting of the steps of performing pseudorandom number generation applying a generator automaton, wherein the counter module 11 is applied for sending, as a generator automaton starting state, a subsequent number determined by the counter core 15 to the input block sequence 18 stored in the data memory 3 as a generator automaton input signal sequence, the transition matrix of the base automaton of the generator automaton, which constitutes a Latin square, is stored in the data memory 3, and the generator automaton is a permutation automaton without output signal, and, in the course of generating the subsequent pseudorandom number, the number generated by the counter is passed on to the generator automaton as a starting signal sequence, the generator automaton is applied for generating the subsequent pseudorandom number that will be identical to the last element of that state sequence of the generator automaton into which the generator automaton transitions under the effect of the input block—as an input signal sequence—stored in the data memory 3, starting from the state that is identical to its state that is identical to the number generated by the counter.

6. A cryptographic method for applying a hash function, consisting of the steps of reading in, for generating a cryptographic hash value, the subsequent block of the document via an input-output data buffer, and utilizing a transformer automaton, carrying out the next step of generating the cryptographic hash value of the document wherein the input document block is passed on to the transformer automaton as an input signal sequence, the transition matrix of the base automaton of the transformer automaton, which constitutes a Latin square, the initial state and the current state of the transformer automaton are stored in the data memory 3, and the transformer automaton is a permutation automaton without output signal, and, in the course of the next step of generating the cryptographic hash value of the document the subsequent input document block is passed on to the transformer automaton as a read-in input signal, the transformer automaton is applied for generating the subsequent cryptographic hash value of the document that will be identical to that state of the scrambler automaton into which the scrambler automaton transitions under the effect of the subsequent document block—as an input signal—from the current state, where in the first step the current state will be an initial state retrieved from the data memory 3, every other current state to follow will be identical to the hash value of the read-in partial input document (the result of the last hash generation operation), and the cryptographic hash value of the document will be the current state occurring after the last read-in operation.

7. The method according to paragraph 3 or 4, characterised in that the block length is 16 or 32 bytes, with the number sequences generated by the counter having 4, 8, or 16 elements.

8. The method according to paragraph 5, characterised in that the size of the generated pseudorandom numbers is 16 bytes.

9. The method according to paragraph 6, characterised in that the block length is 16, 32, or 64 bytes.

10. A device for carrying out the methods according to paragraph 3 or 4, the device consisting of an input-output data buffer, an apparatus adapted to implement a counter (a counter module 11) and the core thereof (the counter core 15), and a scrambler or descrambler automaton.

11. A device for carrying out the method according to paragraph 5, the device consisting of an input-output data buffer, an apparatus adapted to implement a counter and the core thereof, and a generator automaton.

12. A device for carrying out the method according to paragraph 6, the device consisting of an input-output data buffer, a transformer automaton, and the initial state thereof.

13. The device according to any of paragraphs 7-12, characterised in that the transition table of the base automaton corresponding to the applied automata is a 16×16 or 256×256 Latin square.

The cryptographic apparatuses and methods disclosed in the present description are related—among others—preferably to an apparatus and method that is based on automata theory, and is adapted for block encryption and block decryption. According to the invention we have realized that in case, for the application of scramblers based on automata theory that are preferably equipped with counters, our focus is on cryptographic applications instead of the "classic" application of scramblers for providing secure data transmission, we can obtain such cryptographic primitives that are more preferable compared to other similar applications.

The present invention is not limited to the preferred embodiments presented above, and further variants, modifications, changes, and improvements may also be conceived within the scope defined by the claims.

The invention claimed is:

1. A scrambler apparatus for scrambling a character block, in particular for cryptographic applications, the scrambler apparatus comprising a scrambler module adapted for generating, based on a first character block consisting of first character components, a scrambled second character block consisting of second character components, characterized in that the scrambler module is configured with a scrambler automaton without output signal, the scrambler automaton having a state set comprising the first character block and the second character block and an input signal set comprising an input signal character block consisting of input signal character components, and transitioning from the first character block into the second character block under the effect of the input signal character block, wherein the first character block, the second character block and the input signal character block each have a basic block size, each of the state set and the input signal set consist of blocks having a basic block size, obtained from all possible combinations of an identical character set of the first character components and the second character components, as well as the input signal character components, respectively, and each second character component of the second character block is determined based on a first character component of the first character block having the position corresponding to the position of the given second character component in the second character block, at least one first character component and/or second character component from the first character components of the first character block and, in case one or more second character component of the second character block is available, the one or more second character component, and a single input signal character component of the input signal character block.

2. The scrambler apparatus according to claim 1, characterized in that, for determining the second character components of the second character block, a respective transition sequence determined by a base automaton is assigned to each first character component of the first character block by means of the scrambler automaton, and a respective auxiliary first state, auxiliary second state, and auxiliary input signal is assigned to each transition of the transition sequence, and for the first transition of the transition sequence, the auxiliary input signal is the single input signal character component, and the auxiliary first state is one of the at least one first character component and/or second character component from the first character components of the first character block and, in case one or more second character component of the second character block is available, the one or more second character component, and for the last transition of the transition sequence, the auxiliary first state is the first character component of the first character block having the position corresponding to the position of the given second character component in the second character block, and for the one or more transitions of the transition sequence following the first transition, the auxiliary input signal is the auxiliary second state corresponding to the previous transition of the transition sequence.

3. The scrambler apparatus according to claim 1, characterized in that the input signal character block is not a cryptographically secure pseudorandom character block generated by a pseudorandom character block generator.

4. The scrambler apparatus according to claim 1, characterized in that a position corresponding to a given second character component in the second character block is an investigated position of the given second character component, and for determining each second character component of the second character block a first character component of the first character block having the position corresponding to the investigated position of the given second character component, at least two first character component and/or second character component from the first character components of the first character block and, in case one or more second character component of the second character block is available, the one or more second character component, and a single input signal character component of the input signal character block are utilized.

5. The scrambler apparatus according claim 1, characterized in that for determining each second character component of the second character block the input signal character component of the input signal character block having the position corresponding to the investigated position is utilized.

6. The scrambler apparatus according to claim 1, characterized in that-based on the positions corresponding to each first character component and second character component in the first character block and the second character block, respectively, one or more transposition constituting a transposition sequence and each having a first transposition component and a second transposition component are defined from the first character components and the second character components according to an identical number of the first character components and the second character components in the first character block and in the second character block, respectively, and-a position corresponding to a given second character component in the second character block is an investigated position of the given second character component, and for determining each second character component of the second character block a first character component of the first character block having the position corresponding to the investigated position of the given second character component, a second transposition component of the first character block corresponding, as a transposition thereof in the given transposition sequence from the one or more transposition sequence, to the first character component, being a first transposition component, having the position corresponding to the investigated position, in case the given second character component of the second character block is not available, or, of the second character block, in case the given character component of the second character block is available, and a single input signal character component of the input signal character block are utilized, in case a plurality of transposition sequences is defined, determining of the second character components of the second character block is performed with each transposition sequence one after the other, such that in case of applying a subsequent transposition sequence, a second character block determined by a given transposition sequence is applied as a first character block.

7. The scrambler apparatus according to claim 1, characterized in that determining of the second character components of the second character block is successively performed several times, in the same way or in different ways, such that in case of a subsequent determination a given definite second character block is applied as a first character block.

8. The scrambler apparatus according to claim 1, characterized in that the scrambler automaton is defined as a permutation automaton.

9. The scrambler apparatus according to claim 1, characterized in that-the scrambler apparatus is adapted for generating a pseudorandom number and comprises a counter module, and-the first character block is a counter core of the counter module, or is generated from the counter core by means of the counter module, the input signal character block is a first predetermined input block, and the pseudorandom number is the second character block.

10. The scrambler apparatus according to claim 1, characterized in that the scrambler apparatus is adapted for generating a cryptographic hash value based on a text block having the identical character set of the first character components, the second character components and the input signal character components, and the first character block is a second predetermined input block or, in case a previous transformation completed applying the scrambler automaton is available, the second character block determined previously, the input signal character block is a subsequent block of the text block corresponding to the basic block size, and the cryptographic hash value is identical to the second character block, obtained by that transformation, wherein the input signal character block is that block of the text block corresponding to the basic block size read in last.

11. The scrambler apparatus according to claim 2, characterized in that the transition matrix of the base automaton constitutes a Latin square.

12. The scrambler apparatus according to claim 4, characterized in that for determining each second character component of the second character block a first character component of the first character block having the position corresponding to the investigated position of the given second character component, at least two first character component and/or second character component from the first character components of the first character block having a position different from the position corresponding to the investigated position and, in case one or more second character component of the second character block is available, the one or more second character component, and a single input signal character component of the input signal character block are utilized.

13. The scrambler apparatus according to claim 6, characterized in that for determining each second character component of the second character block the input signal character component of the input signal character block having the position corresponding to the position corresponding to the second transposition component in the first character block or in the second character block is utilized.

14. The scrambler apparatus according to claim 8, characterized in that the scrambler apparatus is adapted for encrypting and comprises a counter module, and the input signal character block is generated by means of the counter module, and the second character block is an encrypted character block of the first character block.

15. The scrambler apparatus according to claim 12, characterized in that determining of the second character components is performed sequentially, based on the respective positions corresponding thereto in the second character block, and for determining each second character component of the second character block a first character component of the first character block having the position corresponding to the investigated position of the given second character component, each first character component of the first character block having a position with a serial number larger than that of the position corresponding to the investigated position in case the serial number of the investigated position is smaller than the basic block size, and each second character component of the second character block having a position with a serial number smaller than that of the position corresponding to the investigated position in case the serial number of the investigated position is different from the first position of the character block, and a single input signal character component of the input signal character block are utilized.

16. A descrambler apparatus for descrambling a scrambled character block, in particular for cryptographic applications, the descrambler apparatus comprising: a descrambler module adapted for generating a first character block based on a scrambled second character block generated by a scrambler apparatus, the scrambler apparatus having a scrambler module adapted for generating, based on the first character block consisting of first character components, the scrambled second character block consisting of second character components, characterized in that the scrambler module is configured with a scrambler automaton that is defined as a permutation that is without output signal, the scrambler automaton having a state set comprising the first character block and the second character block and an input signal set comprising an input signal character block, and transitioning from the first character block into the second character block under the effect of the input signal character block, wherein the first character block, the second character block and the input signal character block each have a basic block size, each of the state set and the input signal set consist of blocks having a basic block size, obtained from all possible combinations of an identical character set of the first character components and the second character components, as well as the input signal character components, respectively, and each second character component of the second character block is determined based on a first character component of the first character block having the position corresponding to the position of the given second character component in the second character block, at least one first character component and/or second character component from the first character components of the first character block and, in case one or more second character component of the second character block is available, the one or more second character component, and a single input signal character component of the input signal character block, wherein the descrambler apparatus is characterized in that the descrambler module is configured with a descrambler automaton without output signal constituting inverse automaton of the scrambler automaton, transitioning from the second character block into the first character block under the effect of the input signal character block.

17. The descrambler apparatus according to claim 16, characterized in that the second character block is generated by means of the scrambler apparatus, wherein the scrambler apparatus is adapted for encrypting and comprises a counter module, and wherein the input signal character block is generated by means of the counter module, and the second character block is an encrypted character block of the first character block, the descrambler apparatus is adapted for decrypting, and comprises a counter module being identical to the counter module of the scrambler apparatus, and the input signal character block is generated by the counter module identically as by the scrambler apparatus, and the first character block is a decrypted character block of the second character block.

18. A scrambling method for scrambling a character block, in particular for cryptographic applications, in the course of the method generating, by scrambling, based on a first character block consisting of first character components, a scrambled second character block consisting of second character components, characterized in that scrambling is performed by means of a scrambler automaton without output signal, the scrambler automaton having a state set comprising the first character block and the second character block and an input signal set comprising an input signal character block consisting of input signal character components, and transitioning from the first character block into the second character block under the effect of the input signal character block, wherein

- the first character block, the second character block, and the input signal character block each have a basic block size,
- each of the state set and the input signal set consist of blocks having a basic block size, obtained from all possible combinations of an identical character set of the first character components and the second character components, as well as the input signal character components, respectively, and
- each second character component of the second character block is determined based on a first character component of the first character block having the position corresponding to the position of the given second character component in the second character block, at least one first character component and/or second character component from the first character components of the first character block and, in case one or more second character component of the second character block is available, the one or more second character component, and a single input signal character component of the input signal character block.

19. The scrambling method according to claim 18, characterized in that the scrambler automaton is defined as a permutation automaton.

20. A descrambling method for descrambling a scrambled character block, in particular for cryptographic applications, in the course of the method generating, by descrambling, the first character block based on a scrambled second character block generated by the scrambling method according to claim 19, characterized in that descrambling is performed by means of a descrambler automaton without output signal constituting inverse automaton of the scrambler automaton, transitioning from the second character block into the first character block under the effect of the input signal character block.

* * * * *